US005608865A

United States Patent [19]

Midgely et al.

[11] Patent Number: 5,608,865

[45] Date of Patent: Mar. 4, 1997

[54] STAND-IN COMPUTER FILE SERVER PROVIDING FAST RECOVERY FROM COMPUTER FILE SERVER FAILURES

[75] Inventors: Christopher W. Midgely, Framingham; Charles Holland, Northboro; Kenneth D. Holberger, Grafton, all of Mass.

[73] Assignee: Network Integrity, Inc., Marlborough, Mass.

[21] Appl. No.: 405,178

[22] Filed: Mar. 14, 1995

[51] Int. Cl.$^6$ .......... G06F 11/00

[52] U.S. Cl. .......... 395/180; 395/182.04; 395/616

[58] Field of Search .......... 395/180, 181, 395/182.04, 182.05, 182.8, 600, 650

[56] References Cited

U.S. PATENT DOCUMENTS

| | | | |
|---|---|---|---|
| 5,151,989 | 9/1992 | Johnson et al. | 395/600 |
| 5,210,866 | 5/1993 | Milligan et al. | 395/182.17 |
| 5,369,757 | 11/1994 | Spiro et al. | 395/182.17 |
| 5,410,691 | 4/1995 | Taylor | 395/600 |
| 5,459,863 | 10/1995 | Taylor | 395/600 |

FOREIGN PATENT DOCUMENTS

| | | |
|---|---|---|
| WO94/17473 | 8/1994 | WIPO . |
| WO94/17474 | 8/1994 | WIPO . |

*Primary Examiner*—Robert W. Beausoliel, Jr.
*Assistant Examiner*—Ly V. Hua
*Attorney, Agent, or Firm*—Fish & Richardson P.C.

[57] ABSTRACT

An Integrity Server computer for economically protecting the data of a computer network's servers, and providing hot standby access to up-to-date copies of the data of a failed server. As the servers' files are created or modified, they are copied to the Integrity Server. When one of the servers fails, the Integrity Server fills in for the failed server, transparently providing the file service of the failed server to network clients. The invention provides novel methods for managing the data stored on the Integrity Server, so that the standby files are stored on low-cost media such as tape, but are quickly copied to disk when a protected server fails. The invention also provides methods for re-establishing connections between clients and servers, and communicating packets between network nodes, to allow the Integrity Server to stand-in for a failed server without requiring reconfiguration of the network clients.

6 Claims, 8 Drawing Sheets

| | |
|---|---|
| integer | File ID |
| date/time: | file's creation date/time |
| date/time: | file's last access date/time |
| date/time: | file's last archive date/time |
| integer | object ID of owner |
| integer | object ID of file modifier |
| integer | object ID of file archiver |
| integer | file attributes (hidden, system, etc.) |
| integer | mask of maximum rights for object |
| location of the object in Integrity Server's cache | |
| integer | counter of the number of trustees |
| • • • 314 | |

| | |
|---|---|
| kind: is this a server, a volume, a directory, or file? | |
| location of the version in Integrity Server's disk/tape | |
| date/time: | date/time of file modification |
| integer | size of file version |
| integer | checksum of file contents |

| NCP description | NCP number | Server name/info | Volume name/number | File pathname | Extended Attributes | NDS information |
|---|---|---|---|---|---|---|
| Alloc Permanent Directory Handle | 22 18 | | X | X | | |
| Alloc Temporary Directory Handle | 22 19 | | X | X | | |
| Convert Path to Dir Entry | 23 244 | | X | X | | |
| Create File 510 | 67 | | X 512 | X 514 | | |
| Create New File | 77 | | X | X | | |
| Deallocate Directory Handle | 22 10 | | | | | |
| Duplicate Extended Attributes 520 | 86 05 | | X 522 | X 524 | X 526 | |
| Enumerate Extended Attribute | 86 04 | | X | X | X | |
| Get Effective Directory Rights | 87 29 | | X | X | | |
| Get Directory Information | 22 45 | | X | | | |
| Get Directory Path | 22 01 | | X | X | | |
| Get File Server Information | 23 17 | X | | | | |
| Ping NDS 530 | 104 | | | | | X 522 |
| Read Extended Attribute | 86 03 | | X | X | X | |
| Set File Attributes | 70 | | X | X | | |
| Set File Extended Attribute | 79 | | X | X | X | |

FIG. 5

STAND-IN COMPUTER FILE SERVER PROVIDING FAST RECOVERY FROM COMPUTER FILE SERVER FAILURES

REFERENCE TO SOURCE CODE APPENDIX

This application contains Appendix A and Appendix B. Appendices A and B are each arranged into two columns. The left column is a trace of packets exchanged in a network with all servers operational, and the right column juxtaposes the corresponding packets exchanged in a network with an Integrity Server standing-in for a failed server.

REFERENCE TO MICROFICHE APPENDIX

A microfiche appendix is attached to this application. The appendix, which includes a source code listing of an embodiment of the invention, includes 2,829 frames on 58 microfiche.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The invention relates to fault-tolerant storage of computer data.

Known computer backup methods copy files from a computer disk to tape. In a full backup, all files of the disk are copied to tape, often requiring that all users be locked out until the process completes. In an "incremental backup," only those disk files that have changed since the previous backup, are copied to tape. If a file is corrupted, or the disk or its host computer fails, the last version of the file that was backed-up to tape can be restored by mounting the backup tape and copying the backup tape's copy over the corrupted disk copy or to a good disk.

Data can also be protected against failure of its storage device by "disk mirroring," in which data are stored redundantly on two or more disks.

In both backup systems and disk mirroring systems, a program using a restored backup copy or mirror copy may have to be altered to refer to the restored copy at its new location.

In hierarchical storage systems, intensively-used and frequently-accessed data are stored in fast but expensive memory, and less-frequently-accessed data are stored in less-expensive but slower memory. A typical hierarchical storage system might have several levels of progressively-slower and -cheaper memories, including processor registers, cache memory, main storage (RAM), disk, and off-line tape storage.

SUMMARY OF THE INVENTION

The invention provides methods and apparatus for protecting computer data against failure of the storage devices holding the data. The invention provides this data protection using hardware and storage media that is less expensive than the redundant disks required for disk mirroring, and protects against more types of data loss (for instance, user or program error) while providing more rapid access to more-recent "snapshots" of the protected files than is typical of tape backup copies.

In general, in a first aspect, the invention features a hierarchical storage system for protecting and providing access to all protected data stored on file server nodes of a computer network. The system includes an integrity server node having a DASD (direct access storage device) of size much less than the sum of the sizes of the file servers' DASD's, a plurality of low-cost mass storage media, and a device for reading and writing the low-cost media; a storage manager configured to copy protected files from the file servers' DASD's to the integrity server's DASD and then from the integrity server's DASD to low-cost media, and a retrieval manager activated when the failure or unavailability of one of the file servers is detected. A retention time of a file version in the integrity server's DASD depends on characteristics of the external process' access to the file. The storage manager copies each protected file to the low-cost media shortly after it is created or altered on a file server's DASD to produce a new current version. The retrieval manager, when activated, copies current versions of protected files from the low-cost media to the integrity server's DASD, thereby to provide access to the copies of the files as a stand-in for the files of the failed file server.

In a preferred embodiment, the retrieval manager is configured to copy a current version of a file from the removable media to the integrity server's DASD when the file is demanded by a client of the unavailable server.

In a second aspect, the invention features a method for creating an image of a hierarchical file system on a direct access storage device (DASD). In the method, a copy of the files of the file system are provided on non-direct access storage media. When a file of the file system is demanded, as each directory of the file's access path is traversed, if an image of the traversed directory does not already exist on the DASD, an image of the traversed directory is created on the DASD, and the directory image populated with placeholders for the children files and directories of the traversed directory. The file demand is serviced using the created directory image. On the other hand, if an image of the traversed directory does already exist on the DASD, the file demand is serviced using the existing directory image.

In a preferred embodiment, a newly-created directory is populated with only those entries required to traverse the demanded pathname.

The invention has many advantages, listed in the following paragraphs.

The invention provides high-reliability access to the files of a computer network. When a server under the protection of the invention goes down, either because of failure, maintenance, or network reconfiguration, the invention provides a hot standby Integrity Server that can immediately stand in and provide access to up-to-date copies (or current to within a small latency) of the files of the downed server. The invention provides that one Integrity Server node can protect many network servers, providing cost-effective fault resilience. Users of clients of the protected servers can access the files protected by the Integrity Server without modifying software or procedures.

The invention combines the speed advantages of known disk mirroring systems with the cost advantages of known tape backup systems. Known tape backup systems can economically protect many gigabytes of data, but restore time is typically several hours: an operator must mount backup tapes and enter console commands to copy the data from the tapes to disk. Known disk mirroring systems allow access to protection copies of data in fractions of a second, but requires redundant storage of all data, doubling storage cost. The invention provides quick access (a few tens of seconds for the first access), at the storage cost of cartridge tape.

The invention provides a further advantage unknown to disk mirroring: access to historical snapshots of files, for instance to compare the current version of a file to a version for a specified prior time. An ordinary user can, in seconds, access any file snapshot that was stored on an unavailable server node, or can request a restore of any version snapshot available to the Integrity Server.

A further advantage of the invention is that it protects against a broader range of failure modes. For instance, access to the historical snapshots can provide recovery for software and human errors. Because the Integrity Server is an entire redundant computer node, it is still available even if the entire primary server is unavailable. The integrity sever can also protect against certain kinds of network failures.

The active set can replace daily incremental backup tapes, to restore the current or recent versions of files whose contents are corrupted or whose disk fails. Note, however, that the data on the active set has been sampled at a much finer rate than the data of a daily backup. Thus, a restore recovers much more recent data than the typical restore from backup.

Known backups are driven by a chronological schedule that is independent of the load on the server node. Thus, when the backup is in progress, it can further slow an already-loaded node. They also periodically retransmit all of the data on the server nodes, whether changed or not, to the off-line media. The software of the invention, in contrast, never retransmits data it already has, and thus transmits far less data. Furthermore, it transmits the data over longer periods of time and in smaller increments. Thus, the invention can provide better data protection with less interference with the actual load of the server.

The invention provides that a stand-in server can emulate a protected server while the protected server is down for planned maintenance. This allows testing of the invention's recovery mechanism to be tested easily and regularly.

The invention provides that a stand-in server can offer other functions of a failed server, for instance support for printers.

Other advantages and features of the invention will become apparent from the following description of preferred embodiments, from the drawings, and from the claims.

BRIEF DESCRIPTION OF THE DRAWING

FIG. 1 shows the flow of data through the network and the tapes of the Integrity Server, and FIGS. 2*a* and 2*b* show the network automatically reconfiguring itself as a server fails.

FIGS. 3*a* and 3*b* are block diagrams showing two of the data structures making up the Integrity Server catalog.

FIG. 5 is a table of some of the packet types in the NetWare Core Protocol and the actions that the File Server of the Integrity Server takes in rerouting and responding to each.

DESCRIPTION OF PREFERRED EMBODIMENTS

A commercial embodiment of the invention is available from Network Integrity, Inc. of Marlboro, Mass.

0.1 System and Operation Overview

Figure 1:
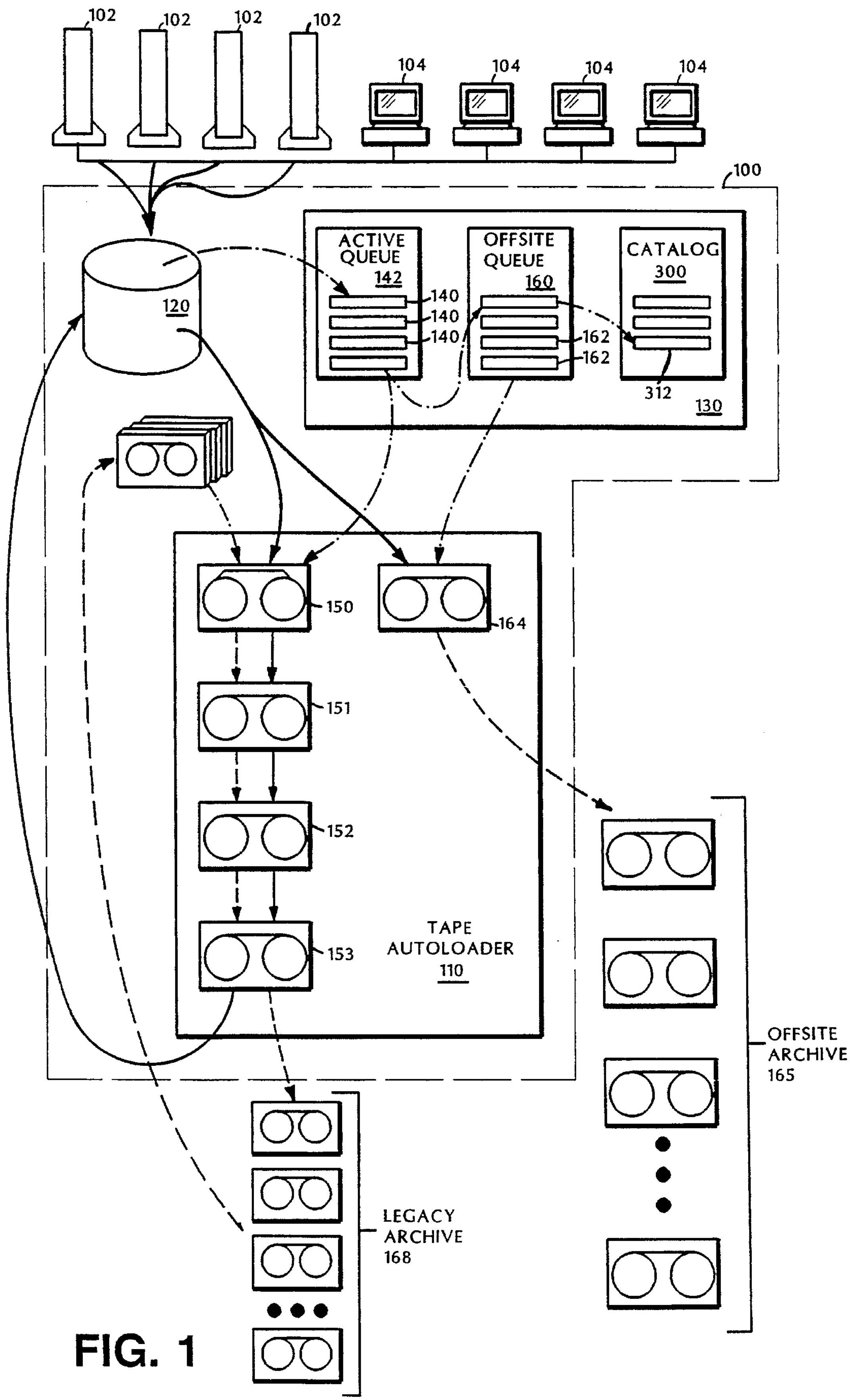
FIGS. 1, 2*a*, and 2*b* are block diagrams of a computer network, showing servers, client nodes, and an Integrity Server.

Referring to FIG. 1, the Integrity Server system operates in two main modes, protection mode and stand-in mode, described, respectively, in sections "2 Protection Mode" and "3 Stand-In Mode," below When all file servers 102 under the protection of Integrity Server 100 are operational, the system operates in protection mode: Integrity Server 100 receives up-to-date copies of the protected files of the servers 102. When any protected server 102 goes down, the system operates in stand-in mode: Integrity Server 100 provides the services of the failed server 102, while still protecting the remaining protected servers 102. The software is divided into three main components: the agent NLM (NetWare Loadable Module) that runs on the server nodes 102, the Integrity Server NLM that runs on the Integrity Server 100 itself, and a Management Interface that runs on a network manager's console as a Windows 3.1 application.

Integrity Server 100 is a conventional network computer node configured with a tape autoloader 110 (a tape "juke box" that automatically loads and unloads tape cartridges from a read/write head station), a disk 120, storage 130 (storage 130 is typically a portion of the disk, rather than RAM), and a programmed CPU (not shown).

After a client node 104 updates a file of a file server 102, producing a new version of the file, the agent process on that file server 102 copies the new version of the file to the Integrity Server's disk 120. As the file is copied, a history package 140 is enqueued at the tail of an active queue 142 in the Integrity Server's storage 130; this history package 140 holds the data required for the Integrity Server's bookkeeping, for instance telling the original server name and file pathname of the file, its timestamp, and where the Integrity Server's current version of the file is stored. History package 140 will be retained in one form or another, and in one location or another (for instance, in active queue 142, offsite queue 160, or catalog 300) for as long as the file version itself is managed by Integrity Server 100.

When history package 140 reaches the head of active queue 142, the file version itself is copied from disk 120 to the current tape 150 in autoloader 110. History package 140 is dequeued to two places. History package 140 is enqueued to off-site queue 160 (discussed below), and is also stored as history package 312 in the protected files catalog 300, in a format that allows ready lookup given a "\\server\file" pathname, to translate that file pathname into a tape and an address on that tape at which to find the associated file version.

As tape 150 approaches full, control software unloads current tape 150 from the autoloader read/write station, and loads a blank tape as the new current tape 150. The last few current tapes 151–153 (including the tape 150 recently removed, now known as tape 151) remain in the autoloader as the "active set" so that, if one of servers 102 fails, the data on active set 150–153 can be accessed as stand-in copies of the files of the failed server 102.

When a file version is written to active tape 150, its corresponding history package 140 is dequeued from active queue 142 and enqueued in off-site queue 160. When an off-site history package 162 reaches the head of off-site queue 160, the associated version of the file is copied from disk 120 to the current off-site tape 164, and the associated history package 312 is updated to reflect the storage of the data to offsite media in the protected file catalog 300. History package 312 could now be deleted from disk 120. When current off-site tape 164 is full, it is replaced with another blank tape, and the previous off-site tape is removed from the autoloader, typically for archival storage in a secure off-site archive, for disaster recovery, or recovery of file versions older than those available on the legacy tapes.

The size of the active tape set 150–153 is fixed, typically at three to four tapes in a six-tape autoloader. When a new current tape 150 is about to be loaded, and the oldest tape 153 in the set is about to be displaced from the set, the data on oldest tape 153 are compacted: any file versions on tape 153 that are up-to-date with the corresponding files on protected servers 102 are reclaimed to disk cache 120, from where the file will again be copied to the active and off-site tapes. Remaining file versions, those that have a more-recent version already on tapes 150–152 or on disk 120, are omitted from this reclamation. Once the data on tape 153 has been reclaimed to disk 120, tape 153 can be removed from the autoloader and stored as a legacy tape, typically either kept on-site for a few days or weeks before being considered blank and reused as a current active tape 150 or off-site tape 164, or retained for years as an archive. The data reclaimed from tape 153 are copied from disk 120 to now-current tape 150. The reclaimed data are then copied to tape 164 as previously described. This procedure not only maintains a compact number of active tapes, but also ensures that a complete set of data from servers 102 will appear in a short sequence of consecutive offsite tapes, without requiring recopying all of the data from the servers 102 or requiring access to the offsite tapes.

Figure 2A:
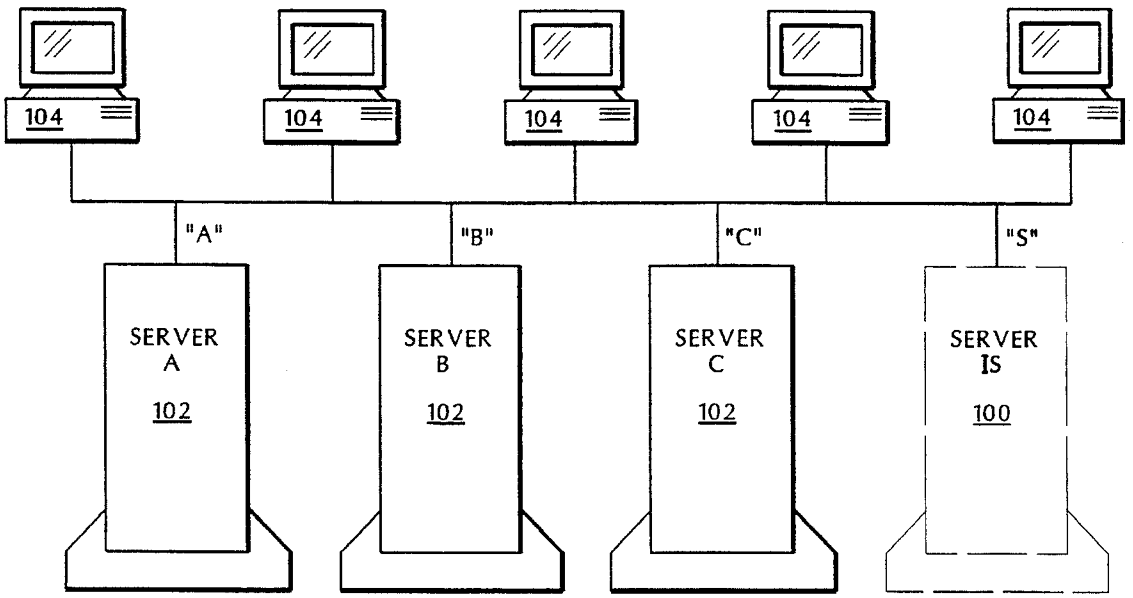

Referring to FIG. 2*a*, as noted earlier, as long as all servers 102 are functioning normally, all clients 104 simply read and write files using normal network protocols and requests, and agent processes on each of the servers 102 periodically copy all recently-modified files to Integrity Server 100. Integrity Server 100, at least in its role of protecting file servers 102, is essentially invisible to all clients 104.

Figure 2B:
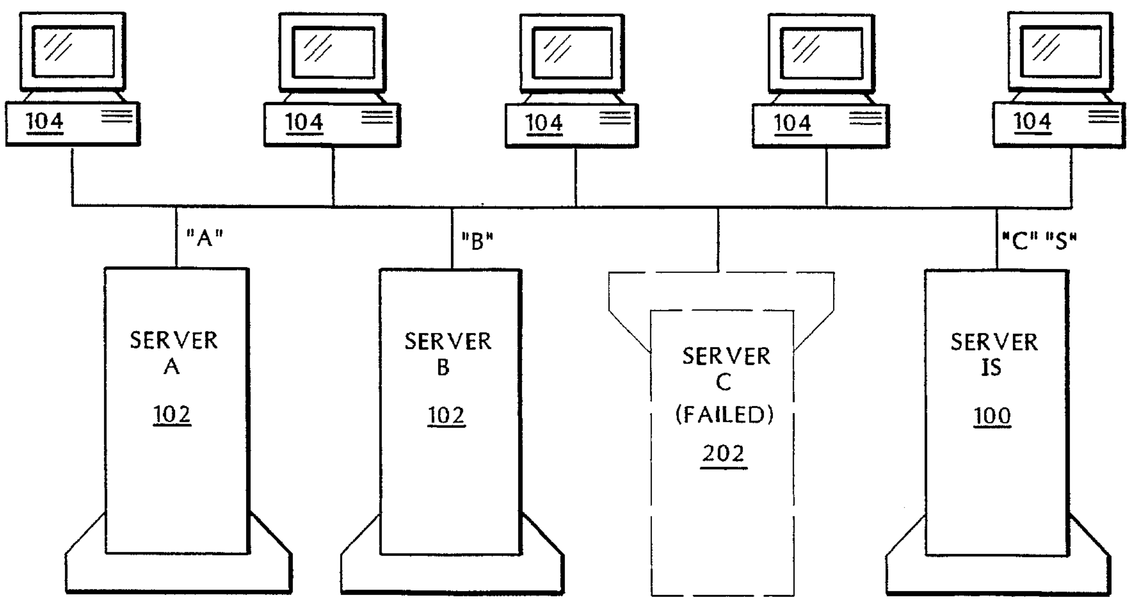

Referring to FIG. 2*b*, after one of servers 202 fails, Integrity Server 100 enters stand-in mode (either automatically or on operator command). Integrity Server 100 assumes the identity of failed server 202 during connect requests, intercepts network packets sent to failed server 202, and provides most of the services ordinarily provided by failed server 202. Clients 104 still request data from failed server 202 using unaltered protocols and requests. However, these requests are actually serviced by Integrity Server 100, using an image of the failed server's file system. This image is called the Emulated File System. This stand-in service is almost instantaneous, with immediate access to recently-used files, and a few seconds' delay (sometimes one or two seconds, usually within a minute, depending on how near the tape data are to the read/write head) for files not recently used. During the time that Integrity Server 100 is standing in for failed server 202, it continues to capture and manage protection copies of the files of other servers 102. When the failed server 202 is recovered and brought back on line, files are synchronized so that no data are lost.

Many of the operations of the invention can be controlled by the System Manager; his decisions are recorded in a database called the "Protection Policy." The Protection Policy includes a selection of which volumes and files are to be protected, schedules for protecting specific files and a default schedule for protecting the remaining files, message strings, configuration information, and expiration schedules for legacy and off-site tapes. The Protection Policy is discussed in more detail below in section "4.3 System Manager's Interface and Configuring the Protection Policy," below.

0.2 System configuration

Referring again to FIG. 1, Integrity Server 100 has a disk 120, a tape auto-loader, and runs Novell NetWare version 4.10 or later, a client/server communications system (TIRPC), and a file transport system (Novell SMS). An example tape auto-loader 110 is an HP 1553c, that holds six 8 GB tapes.

Each protected server 102 runs Novell NetWare, version 3.11 or later, TIRPC, Novell SMS components appropriate to the NetWare version, and runs an agent program for copying the modified files.

The clients 104 run a variety of operating systems, including Microsoft Windows, OS/2, NT, UNIX, and Macintosh. At least one client node runs Microsoft Windows and a System Manager's Interface for monitoring and controlling the Integrity Server software.

1 CATALOG

Referring to FIGS. 3*a* and 3*b*, the catalog is used to record where in the Integrity Server (e.g., on disk 120, active tapes 150–153, legacy tapes 168, or offsite tapes 164–165) a given file version is to be found. It contains detailed information about the current version of every file, such as its full filename, timestamp information, file size, security information, etc. Catalog entries are created during protection mode as each file version is copied from the protected server to the Integrity Server. Catalog entries are altered in form and storage location as the file version moves from disk cache 120 to tape and back. The catalog is used as a directory to the current tapes 150–153, legacy tapes, and off-site tapes 164 when a user requests restoration of or access to a given file version.

FIGS. 3*a* and 3*b* show two data structures that make up the catalog. The catalog has entries corresponding to each leaf file, each directory, each volume, and each protected server, connected in trees corresponding to the directory trees of the protected servers. Each leaf file is represented as a single "file package" data structure 310 holding the stable properties of the file. Each file package 310 has associated with it one or more "history package" data structures 312, each corresponding to a version of the file. A file package 310 records the file's creation, last access, last archive date/time, and protection rights. A history package 312 records the location in the Integrity Server's file system, the location 316 on tape of the file version, the date/time that this version was created, its size, and a data checksum of the file contents. Similarly, each protected directory and volume have a corresponding data structure. As a version moves within the Integrity Server (for instance, from disk cache 120 to tape 150–153), the location mark 316 in the history package is updated to track the files and versions.

The file packages and history packages together store all of the information required to present the "facade" of the file—that is, all of the information that can be observed about the file without actually opening the file. When this is true, during stand-in mode, any file access that does not require access to the contents of the file can be satisfied out of the catalog, without the need to actually copy the file's contents from tape to the Emulated File System.

Other events in the "life" of a file are recorded in the catalog by history packages associated with the file's file package. Delete packages record that the file was deleted from the protected server at a given time (even though one or more back versions of the file are retained by the Integrity Server).

2 PROTECTION MODE

Referring again to FIG. 1, in protection mode, Integrity Server 100 manages its data store to meet several objectives. The most actively used data are kept in the disk cache 120, so that when the Integrity Server is called on to stand in for a server 102, the most active files are available from disk cache 120. All current files from all protected servers 102 are kept on tape, available for automatic retrieval to the disk cache for use during stand-in, or for conventional file restoration. A set of tapes is created and maintained for off-site storage to permit recovery of the protected servers and the Integrity Server itself if both are destroyed or inaccessible. All files stored on tape are stored twice before the disk copy is removed, once on active tape 150 and once on offsite tape 164.

A continuously protected system usually has the following tapes in its autoloader(s): a current active tape 150, the rest of the filled active tapes 151–153 of the active set, possibly an active tape that the Integrity Server has asked the System Manager to dismount and file in legacy storage, one current offsite tape 164, possibly a recently-filled off-site tape, possibly a cleaning tape, and possibly blank tapes.

The server agents and Integrity Server 100 maintain continuous communication, with the agents polling the Integrity Server for instructions, and copying files. Based on a collection of rules and schedules collectively called the Protection Policy (established by the system manager using the System Manager Interface, discussed below) and stored on the Integrity Server, agents perform tasks on a continuous, scheduled, or demand basis. Each agent continuously scans the directories of its server looking for new or changed files, detected, for example, using the file's NetWare archive bit or its last modified date/time stamp. (Other updates to the file, for instance changes to the protection rights, are discovered and recorded with the Integrity Server during verification, as discussed below at section "4.1 Verification".) Similarly, newly-created files are detected and copied to the Integrity Server. In normal operation, a single scan of the directories of a server takes on the order of fifteen minutes. If a file changes several times within this protection interval, only the most recent change will be detected and copied to the Integrity Server. A changed file need not be closed to be copied to the Integrity Server, but it must be sharable. Changes made to non-sharable files are protected only when the file is closed.

In one embodiment, the protected server's protection agent registers with the NetWare file system's File System Monitor feature. This registration requests that the agent be notified when a client requests a file open operation, prior to the file system's execution of the open operation. When a Protected Server's protection agent opens a file, the file is opened in an exclusive mode so that no other process can alter the file before an integral snapshot is sent to the Integrity Server. Further, the agent maintains a list of those files held open by the agent, rather than, e.g., on behalf of a client. When a client opens a file, the protection agent is notified by the File System Monitor and consults the list to determine if the agent currently has the file open for snapshotting to the Integrity Server. While the agent has the file open, the client process is blocked (that is, the client is held suspended) until the agent completes its copy operation. When the agent completes its snapshot, the client is allowed to proceed. Similarly, if the agent does not currently have the file open, a client request to open a file proceeds normally.

When an agent process of one of the file servers detects a file update on a protected server 102, the agent copies the file new version of the changed file and related system data to the Integrity Server's disk cache 120. (As a special case, when protection is first activated, the agent walks the server's directory tree and copies all files designated for protection to the Integrity Server.) The Integrity Server queues the copied file in the active queue 142 and then off-site queue 160 for copying to the active tape 150 and off-site tape 164, respectively. Some files may be scheduled for automatic periodic copying from server 102 to Integrity Server 100, rather than continuous protection.

The population of files in the disk cache 120 is managed to meet several desired criteria. The inviolable criterion is that the most-recent version of a file sampled by the server's agent process always be available either in disk cache 120 or on one of the tapes 150–153, 164 of the autoloader. Secondary criteria include reducing the number of versions retained in the system, and maintaining versions of the most actively used files on the disk cache so that they will be rapidly ready for stand-in operation.

A given file version will be retained in disk cache 120 for at least the time that it takes for the version to work its way through active queue 142 to active tape 150, and through offsite queue 160 for copying to current off-site tape 164. Once a file version has been copied to both the active and off-site tapes, it may be kept on disk 120 simply to provide the quickest possible access in case of failure of the file's protected server. The version may be retained until the disk cache 120 approaches being full, and then the least active file versions that have already been saved to both tapes are purged.

Redundant versions of files are not required to be stored in cache 120. Thus, when a new version of a protected file is completely copied to disk cache 120, any previous version stored in cache 120 can be erased (unless, for instance, that version is still busy, for instance because it is currently being copied to tape). When a new version displaces a prior version, the new history package is left at the tail of the active queue so that the file will be retained in disk cache 120 for the maximum amount of time. As files are dequeued from active queue 142 for copying to active tape 150, the most-recent version of the file already in the disk cache is written to tape, and all older versions are removed from the queue.

The active tape set 150–153 and the data stored thereon is actively managed by software running on Integrity Server 100, to keep the most recent file versions readily available on a small number of tapes. Data are reclaimed from the oldest active tape 153 and compacted so that the oldest active tape can be removed from the autoloader for storage as a legacy tape 168. Compaction is triggered when the density of the data (the proportion of the versions on the active tape that have not been superseded by more-recent versions, e.g. in the disk cache or later in the active tape set), averaged across all active tapes 150–153 currently in the autoloader, falls below a predetermined threshold (e.g. 70%), or when the number of available blank (or overwritable) tapes in autoloader 110 falls below a threshold (e.g., 2). In the compaction process, the file versions on oldest active tape 153 that are up to date with the copy on the protected server, and thus which have no later versions in either disk cache 120 or on a newer active tape 150–152, are reclaimed by copying them from oldest active tape 153 to the disk cache 120 (unless the file version has been retained in disk cache 120). From disk cache 120, the version is re-queued for writing to a new active tape 150 and off-site tape 164, in the same manner as described above for newly-modified files. This re-queuing ensures that even read-active (and seldom-modified) data appear frequently enough on active tapes 150 and off-site tapes 165 to complete a restorable set of all protected files. Since all data on oldest active tape 153 are now either obsolete or replicated elsewhere 120, 150–152 on Integrity Server 100, the tape 153 itself may now be removed from the autoloader for retention as a legacy tape 168.

The compaction process ensures that every protected file has an up-to-date copy accessible from the active tape set. Once the active tape set has been compacted, i.e., current files have been copied from the oldest active tape 153 to the newest active tape 150 and an off-site tape 164, the oldest active tape is designated a legacy tape 168, and is ready to be removed from the autoloader. Its slot can be filled with a blank or expired tape.

The process of reclamation and compaction does not change the contents of the oldest active tape 153. All of its files remain intact and continue to be listed in the Integrity Server's catalog. A legacy tape and its files are kept available for restoration requests, according to a retention policy specified by the system manager. Legacy tapes are stored, usually on-site, under a user-defined rotation policy. When a legacy tape expires, the Integrity Server software removes all references to the tape's files from the catalog. The legacy tape can now be recycled as a blank tape for reuse as an active or off-site tape. The Integrity Server maintains a history of the number of times each tape is reused, and notifies the system manager when a particular tape should be discarded.

Note that the process of reclaiming data from the oldest active tape 153 to disk cache 120 and then compacting older, non-superseded versions to active tape 150 allows the Integrity Server 100 to maintain an up-to-date version of a large number of files, exploiting the low cost of tape storage, while keeping bounded the number of tapes required for such storage, without requiring periodic recopying of the files from protected servers 102. The current set of active tapes should remain in the autoloader at all times so that they can be used to reconstruct the stored files of a failed server, though the members of the active tape set change over time.

By ensuring that every protected file is copied to offsite tape 164 with a given minimum frequency (expressed either in time, or in length of tape between instances of the protected file), the process also ensures that the offsite tapes 165 can be compacted, without physically accessing the offsite tape volumes.

In an alternate tape management strategy, after reclaiming the still-current file versions from oldest active tape 153, this tape is immediately recycled as the new active tape 150. This forgoes the benefit of the legacy tapes' maintenance of recent file versions, but reduces human intervention required to load and unload tapes.

Writing files from the off-site queue 160 to off-site tape 164 is usually done at low priority, and the same version culling described for active queue 142 is applied to off-site queue 160. The relatively long delay before file versions are written to off-site tape 164 results in fewer versions of a rapidly-changing file being written to the off-site tape 164, because more of the queued versions are superseded by newer versions.

Whether it has been updated or not, at least one version of every protected file is written to an off-site tape with a maximum number of sequential off-site tapes between copies. This ensures that every file appears on at least every $n^{th}$ tape (for some small n), and ensures that any sequence of n consecutive off-site tapes contains at least one copy of every protected file, and thus that the sequence can serve the function of a traditional backup tape set, providing a recovery of the server's files as they stood at any given time.

Active queue 142 is written to current active tape 150 from time to time, for instance every ten minutes. Offsite queue 160 is written to off-site tape 164 at a lower frequency, such as every six hours.

Even though off-site tapes are individually removed from the autoloader and individually sent off-site for storage, successive tapes together form a "recovery set" that can be used to restore the state of the Integrity Server in case of disaster. The circularity of the tape compaction process ensures that at least one version of every file is written to an off-site tape with a maximum number of off-site tapes intervening between copies of the file, and thus that a small number of consecutive off-site tapes will contain at least one version of every protected file. To simplify the process of recovery, the set of off-site tapes that must be loaded to the Integrity Server to fully recover all protected data is dynamically calculated by the Integrity Server at each active tape compaction, and the tape ID numbers of the recovery set ending with each off-site tape can be printed on the label generated as the off-site tape is removed from the autoloader. When a recovery is required, the system manager simply pulls the latest off-site tape from the vault, and also the tapes listed on that tape's label, to obtain a set of off-site tapes for a complete recovery set.

Many tape read errors can be recovered from with no loss of data, because many file versions are redundantly stored on the tapes (e.g., a failure on an active tape may be recoverable from a copy stored on an off-site tape).

Policies for retention and expiration of off-site tapes may be configured by the system manager. For instance, all off-site tapes less than one month old may be retained. After that, one recovery set per month may be retained, and the other off-site tapes for the month expired for reuse as active or off-site tapes. After six months, two of every three recovery sets can be expired to retain a quarterly recovery set. After three years, three of every four quarterly recovery sets can be expired to retain a yearly recovery set.

Expired off-site tapes cannot be used to satisfy file restoration requests, because the history packages for the tape will have been purged from the catalog. But these tapes may still be used for Integrity Server recovery, as long as a full recovery set is available and all tapes in the set can be read without error.

The history packages are maintained on disk 120, rather than in the RAM of the Integrity Server, so that they will survive a reboot of the Integrity Server. The history packages are linked in two ways. Active queue 142 and off-site queue 160 are maintained as lists of history packages, and the history packages are also maintained in a tree structure isomorphic to the directory tree structure of the protected file systems. Using the tree structure, a history package can be accessed quickly if the file version needs to be retrieved from either the active tape set 150–153 or from an off-site tape, either because Integrity Server 100 has been called to stand in for a failed server, or because a user has requested a restore of a corrupted file.

File versions that have been copied to both active tape 150 and off-site tape 164 can be erased from disk cache 120. In one strategy, files are only purged from disk cache 120 when the disk approaches full. Files are purged in least-recently accessed order. It may also be desirable to keep a most-recent version of certain frequently-read (but infrequently-written) files in disk cache 120, to provide the fastest-possible access to these files in case of server failure.

Depending on which tape (an active tape 150 or an off-site tape 164) is loaded into the autoloader's read/write station and the current processing load of the Integrity Server, a given file version may take anywhere from a few minutes to hours to be stored to tape. The maximum time bound is controlled by the System Manager. Typically a file version is stored to active tape 150, as quickly as possible, and queued for the off-site tape at a lower priority.

Verification of tape writes may be enabled by the System Manager Interface. When tape write verification is enabled, each queue is fully written to tape, and then the data on the tape are verified against the data in disk cache 120. Files are not requeued from the active tape queue 142 to the off-site queue 160 until the complete active tape 150 is written and verified.

If Integrity Server 100 has multiple auto-loaders installed, a new active or offsite tape can be begun by simply switching auto-loaders. Tape head cleaning is automatically scheduled by the system.

2.1 Scheduled and demand file protection

In some embodiments, a System Manager can request that a specified file be protected within a specific time window, such as when there is no update in progress or when the file can be closed for protection purposes.

3 STANDING-IN FOR A FAILED SERVER

Referring to FIGS. 3*e*–3*g* and 4, if a protected server 202 becomes unavailable, whether for scheduled maintenance or failure, either a human system manager or an automatic initiation program may invoke the Integrity Server's stand-in mode for the failed server. In stand-in mode, the Integrity Server provides users with transparent access to the data normally stored on the unavailable server.

When Integrity Server 100 assumes stand-in mode for a failed server 202, Integrity Server 100 executes a previously-established policy to identify itself to the network as the failed server 202 and executes a Netware compatible instruction file defined by the system manager, and then services all requests for failed server 202 from the network. Users who lost their connection to failed server 202 are connected to Integrity Server 100 when they login again, either manually using the same login method they normally use, or automatically by their standard client software. Login requests and file server service requests are intercepted by Integrity Server 100 and serviced in a fully transparent manner to all users and server administrators. Integrity Server can provide more than file services; for instance, Integrity Server 100 can provide stand-in printing services and other common peripheral support services. The complete transition requires less than a minute and does not require the Integrity Server 100 to reboot. The only data or time lost is that the Integrity Server's stand-in version of a file will only be as recent as the last time the agent process snapshotted the file from file server 202 to the Integrity Server 100, the client node will have to re-login to the network to reestablish the node-to-server connection, and there may be a slight delay as older, inactive files are copied from tape to disk before being provided to the client.

When a protected server 202 goes down, NetWare detects the loss of communication and signals the Integrity Server. A message is immediately issued to the system manager identifying the unreachable protected server. The Integrity Server either waits a previously-defined amount of time and then begins to stand-in for the protected server, or waits for instructions from the system manager or an authorized administrator, depending on the configuration specified by the Protection Policy.

The Integrity Server immediately begins building a replica of the protected server's volume and directory structure, not including the data of the files themselves, in an area of the Integrity Server's file system called the Emulated File System (EFS). The construction of the EFS is described in more detail at section 3.1, below. An Agent NLM is activated to manage the protection of EFS file changes. This Agent operates exactly the same as a protected server's Agent-continuously scanning the EFS for file changes, replicating changed files to the cache for protection, etc.

Once the build of the EFS is in progress, Integrity Server 100 advertises the name of failed protected server 202 on the network via the Server Advertisement Protocol (SAP), and emulates the failed-server's 202 NetWare Core Protocol (NCP) connections with users (clients) as they login. This action causes other network members to "see" Integrity Server 100 as failed protected server 202. Packets from a client to the failed server are intercepted by the Integrity Server and renovated to the EFS for service. This is further described in section "3.2 Connection Management", below.

Users' requests for file access are given the highest system priority by Integrity Server 100. Requested files that are currently in cache 120 are moved to the EFS area for the duration of the stand-in period. During stand-in these files are stored and accessible as they were on the failed server.

Once a file is accessed, one of two strategies may be used: either the file may be retained in the EFS area for the duration of the stand-in period until the Integrity Server stands-down, i.e., until the failed protected server recovers and is synchronized, or in other cases, it may be desirable to delete from the EFS files that go unused for a time during stand-in to reclaim their disk space. The EFS area is managed as typical NetWare server storage.

The available cache area for protection activities is reduced as the EFS grows. During stand-in, Integrity Server 100 requires only a small amount of cache to maintain its protection activities (servicing the active and offsite queues, and providing file restoration services to the still operating servers). Because, in this implementation, only one failed server may be emulated at a time, reserve capacity to stand-in for another server need not be maintained, and thus the cache requirement is reduced immensely. Cache slot reclamations occur more frequently to manage the shrinking cache area.

The management of files in the EFS is further described in section "3.1 The Emulated File System", below.

When the failed protected server recovers, the data of the protected server are synchronized with the changes that took place while Integrity Server 100 stood in for the failed server. This is further described below in section "3.8 Recovery and Synchronization."

The Integrity Server can stand-in for services of a failed server other than file storage. For instance, if a failed server provided print services, Integrity Server can stand-in to provide those print services.

For each protected server, the system manager can assign a Netware compatible instruction file (.NCF) to be automatically executed as a part of stand-in initiation and a 58-character login message to be automatically sent to users who log in to the stand-in server. The instruction file can be used to provide queue initialization or other system-specific activity to expedite bringing up stand-in services. A second .NCF instruction file may be provided to provide "stand-down" instructions to reverse the original instructions and return the services to the original server.

Note that Stand-In Management requires in-depth knowledge of packet format and currently is specific to a given application and transport protocol, i.e., NCP over IPX. Support for other application/transport protocol pairs, such as AFP (AppleTalk Filing Protocol) over ATP (AppleTalk Transaction Protocol) and NFS (Network File System) over TCP/IP, follows the design provided here.

3.1 The Emulated File System

Referring to FIGS. 3*c*–3*g*, during stand-in, Integrity Server 100 builds an Emulated File System (EFS) 350 to provide access to the latest snapshots of the files of failed server 202 captured by the server agents. The EFS is an image of the failed server's file system, or at least those parts of the file system that have been accessed by client processes. The system uses hierarchical storage management techniques to get the most-frequently accessed files onto the disk cache 120, while leaving less-frequently accessed files on tape.

Figure 3C:
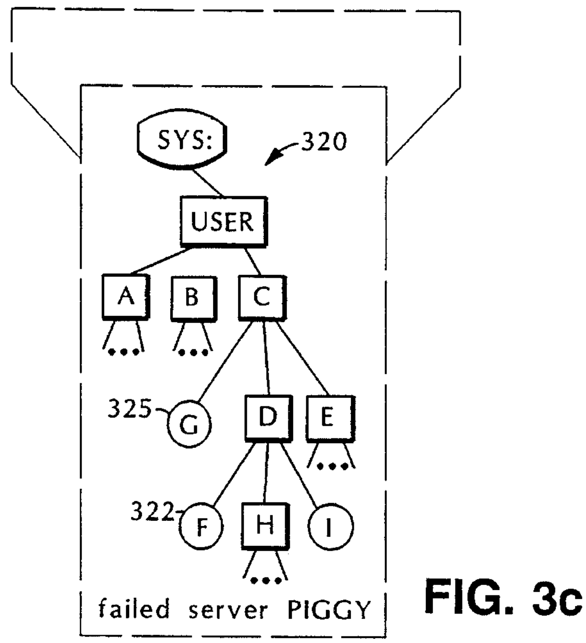
FIG. 3*c* shows a portion of a file system on a failed server.

Consider the example of FIG. 3*c*, in which the failed server was named PIGGY, the Integrity Server is named PIGGY2, and where failed server PIGGY 202 had a protected file system 320 on volume "sys:", including directories "user", "A", "B", "C", "D", "E", and "H", and files "F", "G" and "I". As shown in FIG. 3*d*, during protection mode, a catalog 300 isomorphic to the protected file system 302 is built up of packages 310 corresponding to the protected volume, directories and files. In the example of FIGS. 3*c* and 3*d*, there is a file package 321 for file 322 PIGGY\sys:\user\C\D\F with three history packages 323 for three snapshots of file F, and a file package 324 for file 325 PIGGY\sys:\user\C\G with one history package 326.

The EFS 350 is built up on the Integrity Server's disk 120 node by node, as demanded by client processes making requests of failed server 202.

Figure 3E:
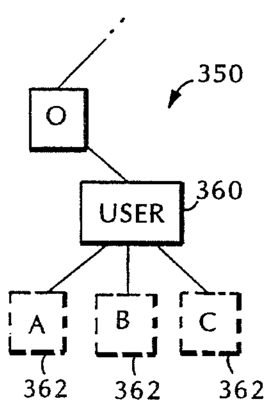
FIGS. 3*e*–3*g* form a time-sequence during the deployment of an Emulated File System corresponding to the file system of the failed server.
Figure 3F:
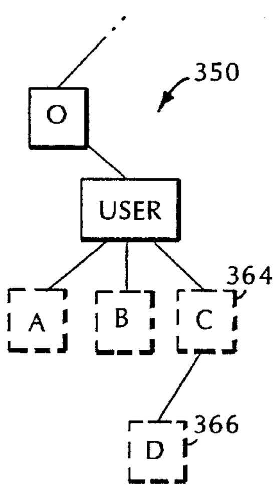
Figure 3G:
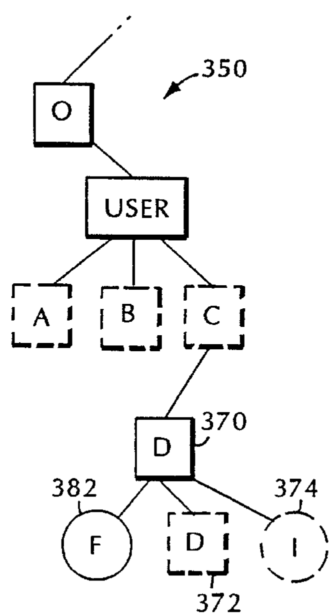
Figure 3D:
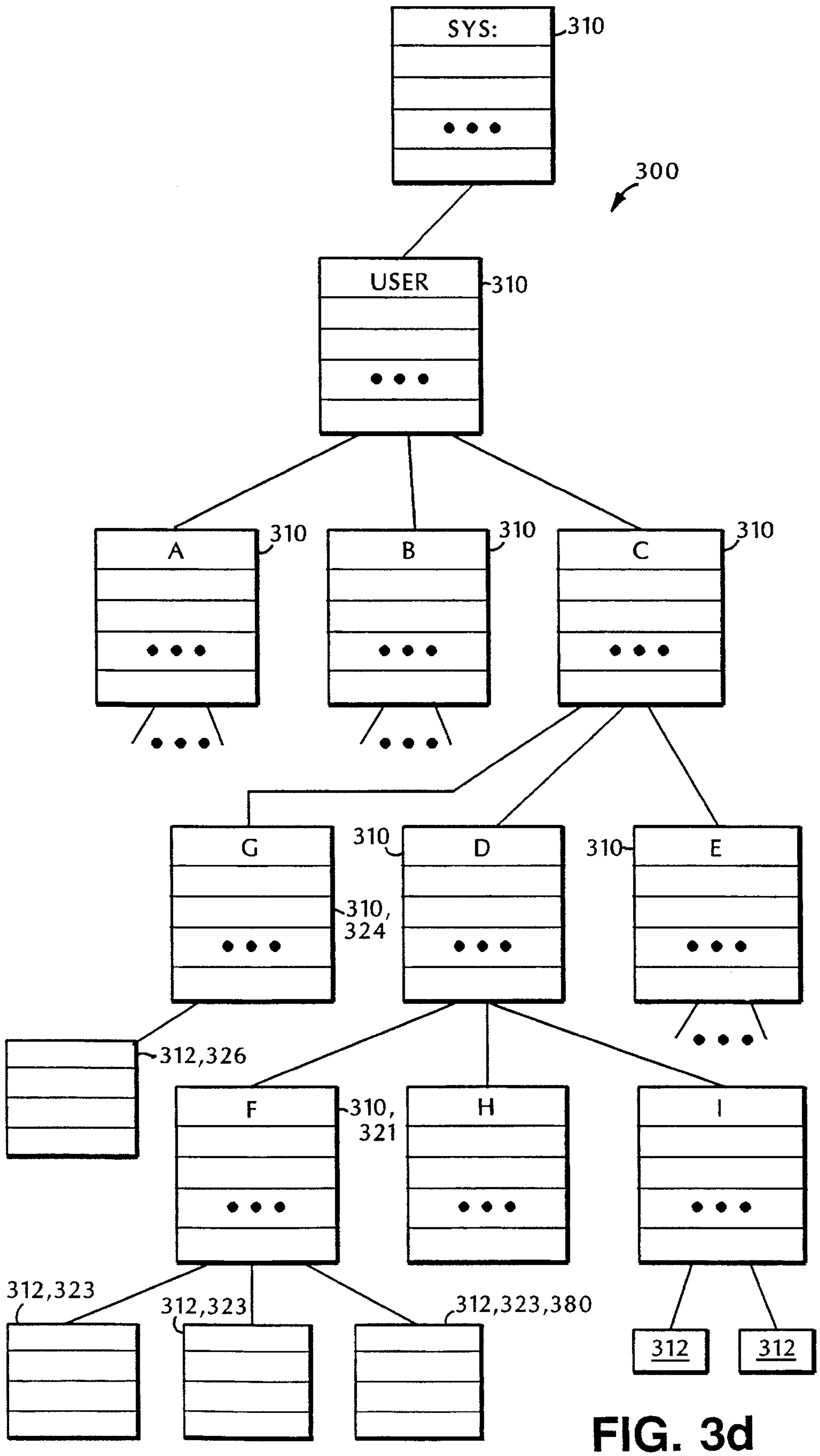
FIG. 3*d* shows a catalog of the files of the failed server.

Referring now to FIG. 3*e* and continuing with the example of FIGS. 3*c* and 3*d*, when PIGGY fails, Integrity Server 100 will create a directory in the EFS named "PIGGY2\cache:\lsdata\efs\PIGGY0" in which to emulate file system "PIGGY\sys:". (Directories in the EFS corresponding to volumes of protected server are named "0", "1", "2", etc. to ensure that name length limits are not exceeded.)

Consider an instance where the first client request is a directory listing of directory "PIGGY\sys:\user". A directory 360 "PIGGY2\cache:\lsdata\efs\PIGGY0\user" will be created in the EFS region of disk 120, with entries for the children of "PIGGY\sys:\user", in this case "A", "B", and "C". The information for seeding emulated directory 360 is extracted from catalog 300. Empty directories 362 will be created for "A", "B,", and "C" (as indicated in FIG. 3*e* by the dotted lines for directories 362 "A", "B", and "C"), and the directory entries for "A," "B," and "C" in directory 360 ". . . \PIGGY0\user\" will be marked to indicate that the A, B, and C directories 362 are empty and will need to be populated when they are demanded in the future.

Consider next the effect of a client request for file "PIGGY\sys:\user\C\D\F" following the first request that left the EFS in the state pictured in FIG. 3*e*.

Directory "PIGGY2\cache:\lsdata\efs\PIGGY0\user\C" already exists on Service Server PIGGY2, though as an empty shell 362. No further action is required. After traversing directory C, the state remains as shown in FIG. 3*e*.

As the file open traverses directory D, information about directory "PIGGY\sys:\user\C\D" is extracted from catalog 300, and used to create an empty directory 366 for D. In directory C 364, a single a directory entry for D is created; this directory entry indicates that directory D is empty. Directory C 364 is left otherwise unpopulated, as indicated by the dotted outline. After traversing directory D 366, the state is as shown in FIG. 3*f*.

Finally, the process constructing the EFS notes that node F is a file. First, the directory 370 in which the file will be resident is completely populated, as was directory "user" in FIG. 3*e*, with entries that present a facade of the children: the creation and last access dates, permissions, sizes, etc. of the children directories and files. The fact that directory D 370 is fully populated is indicated by the fact that box 370 is shown in solid lines. Even though D is fully populated, the children directories are empty 372, and directory entries for children files 374 are marked indicating that no actual file has been allocated in the EFS. The catalog history package 380 (FIG. 3*d*) for the most recent snapshot of file F is consulted to find where in disk cache 120 or on active tapes 150–153, the actual contents of the most recent snapshot of file F are stored. If necessary, the appropriate tape is loaded. The file contents are copied from disk cache 120 or the loaded tape into the EFS 350. This final copying step is indicted in FIG. 3*g* by the solid lines of box 382 for file F. The directory entry for F in directory D of the EFS will be unmarked, indicating the file F is populated.

Note that no disk structures are created for untraversed siblings (e.g., E and G) of traversed directories or opened files.

The following paragraphs discuss detailed features of one implementation of the Emulated File System.

The build of the EFS uses two threads: a foreground thread that intercepts client file requests and queues requests to build the demanded part of the EFS, and a background thread that dequeues these requests and actually constructs the requested portions of the EFS. Requests are handled in the order they are received, though requests that can be satisfied from the currently-loaded tape may be promoted in the queue over requests that would require mounting a different tape. Until the directories are constructed, the client's NCP request is blocked until the background thread has constructed the required EFS directories or files.

A placeholder directory entry is indicated by a reserved value, called the "magic cookie," stored in the archiver date and time fields of a directory entry. A placeholder directory entry may indicate the file's length, time stamp, extended attributes, and other file facade information. The magic cookie indicates that the child directory has at least one unformed child: in the example of FIGS. 3*e*–3*g*, in the case where directories C and D have been created, the directory entry for C in . . . \user has the magic cookie set, to indicate that C's children E and G are not yet fully populated.

Stand-in initiation inserts a hook into NetWare. This hook will notify the Integrity Server when a client accesses a directory. Emulation Services intercepts the directory access and gets a chance to check the current directory entry for the magic cookie value. When Emulation Services finds a magic cookie, it performs the creation of empty directories, or copying in of a file's contents, as described above.

Thus, for directories merely traversed on the way to a child file (or directory), the directory contains only entries for those children actually demanded, and the directory's magic cookie is set. For directories actually opened (for instance, for a directory listing), empty shells (directories or files) will be created for each child, each with their magic cookies set, and the opened directory will have a non-magic date/time stamp.

During the time Integrity Server 100 is standing in for a failed server 202, providing service to the server's files is the top priority task for the Integrity Server, and thus the files of the failed server are not purged from disk cache 120, whatever their age, until they are transferred to the Emulated File System. In another implementation, the files are purged from the EFS, using a least-recently-accessed or other algorithm.

During this time, files of all remaining protected servers remain continuously protected, though the frequency during the early phase of stand-in may be reduced.

3.2 Connection Management—Overview

Figure 4:
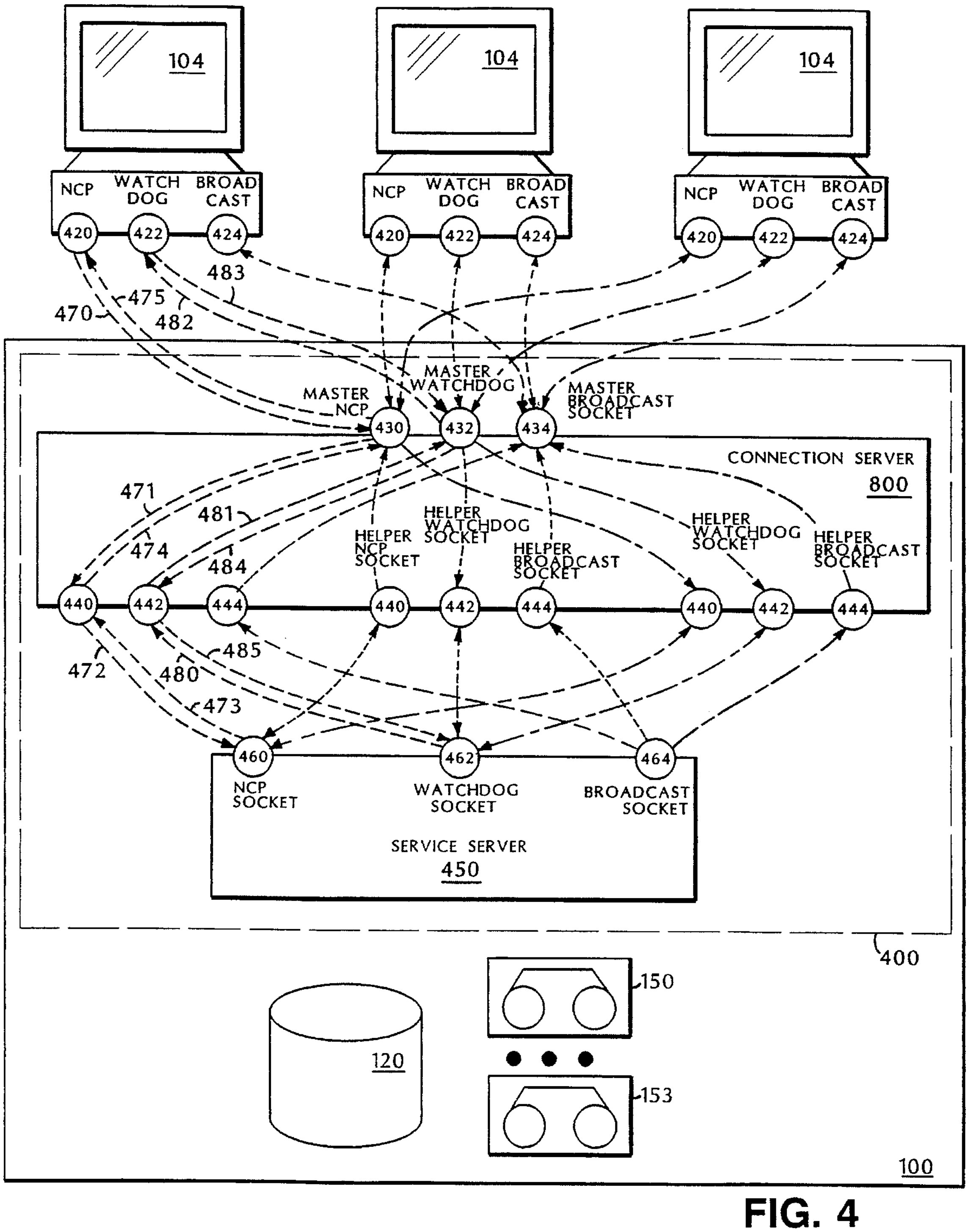
FIG. 4 is a block diagram showing the travel of several packets to/from client nodes from/to/through the Integrity Server.

Referring to FIG. 4, Connection Management 400 provides for the advertising and emulation of the low level connection-oriented functions of a Novell NetWare file server. Network services during stand-in are divided into two areas: Connection Server 800 and Service Server 450. Service Server 450 is an unmodified copy of NetWare, which provides the actual services to emulate those of failed server 202. Connection Server 800 is the Integrity Server software acting as a "forwarding post office" to reroute packets from client nodes to Service Server 450. Connection Server 800 appears to clients 104 to provide the NetWare services of failed server 202. In fact, for most service request packets, Connection Server 800 receives the packets, alters them, and forwards them to Service Server 450 for service. For other purposes, including testing and debugging, Connection Server 800 and Service Server 450 can be run on different physical NetWare servers, which permits easy analysis of packets that pass between them. However, normally they both run on the same machine, and therefore packets between them which are passed in software without ever being transmitted on a physical wire.

A normal NetWare connection between a client and a server uses three pairs of sockets: a pair of NCP sockets, a pair of Watchdog sockets, and a pair of Broadcast sockets. (A "socket" is a software equivalent of having multiple hardware network ports on the back panel of the computer. Though there may be only a single wire actually connecting two computers in a network, each message on that wire has tags identifying the sockets from which the message was sent and to which it is directed. Once the message is received, the destination socket number is used to route the message to the correct software destination within the receiving computer.) In a normal NetWare session, a client requests a service by sending a packet from its NetWare Core Protocol (NCP) socket to the server's NCP socket. The server performs the service and replies with a response packet (an acknowledgement is required even if no response per se is) from the server's NCP socket back to the client's. The server uses its Watchdog socket to poll the client and ensure that the client is healthy: the server sends a packet from its Watchdog socket to the client's Watchdog socket, and the client responds with an acknowledgement from the client's Watchdog socket to the server's. The server uses its Broadcast socket to send unsolicited messages to the clients that require no response; typically no messages are sent from clients to servers on Broadcast sockets. NCP, Watchdog, and Broadcast socket numbers in a group are assigned consecutive socket numbers.

In the Integrity Server's Stand-in Services Connection Management module 400, multiple triplets of sockets are used to manage packets. Each triplet includes an NCP, a Watchdog, and a Broadcast socket. Each client has an NCP 420, Watchdog 422, and Broadcast 424 socket; the client communicates with the Stand-in server using these in exactly the same manner that it would use if the original server had not failed. The Service Server's NCP 460, Watchdog 462, and Broadcast 464 sockets are the Integrity Server's normal NetWare three server's sockets. Connection Server 800 presents a server face to client 104, using Master NCP 430, Master Watchdog 432, and Master Broadcast 434 sockets, and a client face to Service Server 450, using Helper NCP 440, Helper Watchdog 442, and Helper Broadcast 444 sockets, one such triplet of helper sockets corresponding to each client 104. Connection Server 800 serves as a "forwarding Post Office," receiving client packets addressed to the virtual failed server and forwarding them through the client's corresponding helper sockets 440, 442, 444 to the Service Server 450, and receiving replies from the Service Server 450 at the client's corresponding helper sockets 440, 442, 444 and forwarding them through the Connection Server's sockets 430, 432, 434 back to client's sockets 420, 422, 424.

To establish a connection, Integrity Server 100 advertises itself as a server using the standard NetWare Service Advertising Protocol (SAP) functions, broadcasting the name of failed server 202 and the IPX socket number for its Master NCP socket 430. Once this SAP is broadcast to the rest of the network, it appears that the protected server is available for providing services, though the client will use the network address for the Connection Server's Master NCP socket 430 rather then the NCP socket of failed server 202.

When a client 104 requests a service, for instance opening a file, it sends a packet 470 from client NCP socket 420 to Master NCP socket 430. This request packet is indistinguishable from a packet that would have requested the same service from failed server 202, except for the destination address. The packet is received at Master NCP socket 430. Connection Server 800 optionally alters the contents of the packet 471, and forwards the altered packet 472 from Helper NCP socket 440 to the Service Server's NCP socket 460. Service Server 450 performs the requested service, and replies with a response packet 473 back to Helper NCP socket 440. When response packet 473 is received at Helper NCP socket 440, Connection Management optionally filters the packet and forward it 475 to the requesting client's NCP socket 420.

Some request packets 470 are serviced in Connection Server 800 and a reply packet 475 returned without passing the request on to Service Server 450. For example, if the client queries the stand-in server for a service that was available on the real protected server (even though it is down and may be emulated by the Integrity Server that does offer the requested services) Connection Server 800 will handle the query and return a denial without passing the request on to Service Server 450.

Each client 104 has a corresponding set of Helper sockets 440–444. This allows the Service Server 450 to believe that multiple clients are communicating on unique connections thought to be on different clients 104, when the connections are actually from multiple Helper triplets 440–444 of a single Connection Server 800. The single Connection Server, in turn, communicates with the real clients 104.

During stand-in, a poll from Service Server's Watchdog socket 462 will be received by Connection Management at Helper Watch Dog socket 442, which will subsequently forward the poll 482 to client 104 as if the poll had originated at Master Watch Dog socket 432. If client 104 is still alive, it will send a response 483 to Master Watch Dog socket 432. When Connection Management receives the response 483 at Master Watch Dog socket 432, it will forward the response packet 485 to the Service Server's Watchdog socket 462 as though the response had originated at the Connection Server's Helper Watchdog socket 442 corresponding to the client 104.

A NetWare broadcast is sent by a server to its clients by sending a message to a client's broadcast socket 424 indicating that a message is waiting. Client 104 responds by sending an NCP request, and the message itself is sent from the server to the client as the response to this NCP request. During stand-in, the Service Server will send the broadcast message to Helper Broadcast Socket 444 corresponding to client 104. Connection Management receives this, and forwards it to the client's Broadcast socket 424 as though the broadcast had originated at the Master Broadcast Socket 434.

3.3 Packet Redirection—accessing a file

Packet Management is a component that provides for the analysis and modification of NetWare NCP packets received via the IPX protocol, via IPX tunnelled through IP (Internet Protocol) or IP routed to IPX via NWIP. This allows a network client to believe that a server, with its volumes and files, actually exists when in fact it is being emulated by the Integrity Server. Packet Management is used by Connection Management to examine packets and change their contents so that the Integrity Server's server names, volume names, path names and other server specific information appear to be those of the protected server being emulated. The process of changing NCP requests and responses within Packet Management is called Packet Filtering.

Packet Management works in combination with Connection Management. Connection Management is responsible for maintaining the actual communications via IPX Sockets.

IPX packets contain source and destination addresses, each including the network number, the node number and the socket number. Within the IPX header there is a packet type. Only packet types of NCP, coming from an NCP socket, are processed by the packet filtering system.

NCP packets are communicated within IPX packets. NCP packets start with a two byte header that indicates the type of packet: a request, response, create service connection, or destroy service connection.

Most NCP packets contain a connection number. This connection number is recorded by Connection Management, along with the original IPX address, in a lookup table. The table is used to route packets through Connection Server 800. Each entry of the lookup table maintains the correspondence between the IPX net/node/socket address 420–424 of a client (for a request packet 470) and a set of helper sockets 440–444 (from which the forwarded request packet 472 is to be sent) and an NCP connection number. The lookup table is also used on the return trip, to map the helper socket number 440–444 at which a reply packet 473 is received to a destination socket 420–424 to forward the reply packet 475. The lookup table is also used when net/node/socket addresses must be altered in the contents of packets. As long as the NCP connection number is available, the IPX address can be retrieved.

When the Connection Server 800 receives a "Create Service Connection" packet, Connection Server 800 creates a new triplet of helper sockets facing the Service Server 450, and enters an entry into the lookup table.

Most packets contain a sequence number. The sequence number is used by the server to make sure that none of the requests/responses are lost. Since the Packet Management system will sometimes decide to send a packet back to the workstation without routing it to the server, the sequence number can be different between the workstation and the server. The packet filter code is responsible for altering the sequence number to maintain agreement between client and server. Packet sequence number information is also maintained in the table.

Request packets contain a function code, used by Packet Management to determine which filter should be used. Response packets do not contain the function code, so request packets are tracked such that the matching result packet (by sequence number) is identified as a response to a particular function.

The following types of information are filtered within NCP packets:

- Server Names: For NCP requests, the protected server Name will be changed to the Integrity Server's name within the packet. For responses, the Integrity Server's name will be changed back to the emulated protected server's name.
- File Path Names. A file path name in an NCP request will be changed to the corresponding path within the EFS (Emulated File System) which corresponds to that file path. Inverse transformations are performed on paths in NCP response packets which include the EFS path.
- Volume Numbers: All emulated volumes are maintained within the volume which contains the EFS on the Integrity Server. For NCP requests, volume numbers are changed to the volume number which contains the EFS. For NCP responses, the EFS volume number is changed back to the emulated volume number.
- other types of information: server statistics, bindery object ID's, etc.

FIG. 5 is a table listing some of the Netware Core Protocol packet types, and some of the attributes within each packet that Connection Server 800 modifies. For instance, the table entry 510 for "Create New File" shows that a "Create New File" request packet 470 has its volume name/number 512 and file pathname 514 changed by Connection Server 800 before the packet is forwarded 472 to the Service Server 450. Similarly, the volume name/number and file pathname may have to be altered by Connection Server 800 before a response packet 473 is forwarded 475 to client 104. Similarly, a request packet 470 of type "Duplicate Extended Attributes" 520 has its volume name/number 522, file pathname 524, and extended attributes altered before the packet is forwarded 472. A "Ping NDS" packet 530 has its Netware Directory Services information altered 532 by Connection Server 800 (specifically, when standing-in for a NetWare version 3 protected server, Connection Server 800 alters the response packet to state that the emulated server cannot provide NetWare Directory Services, even though Service Server 450, which is a NetWare version 4, initially responded that it could provide such services).

Generally, any packet that contains a server name, a volume name, or pathname referring to a failed protected server, or contains extended attribute information for a directory or file from the emulated server, or NDS (NetWare Directory Services), or bindery information, must potentially be modified, and a packet filter written for the packet type.

3.4 Locating a File Server

Figure 6:
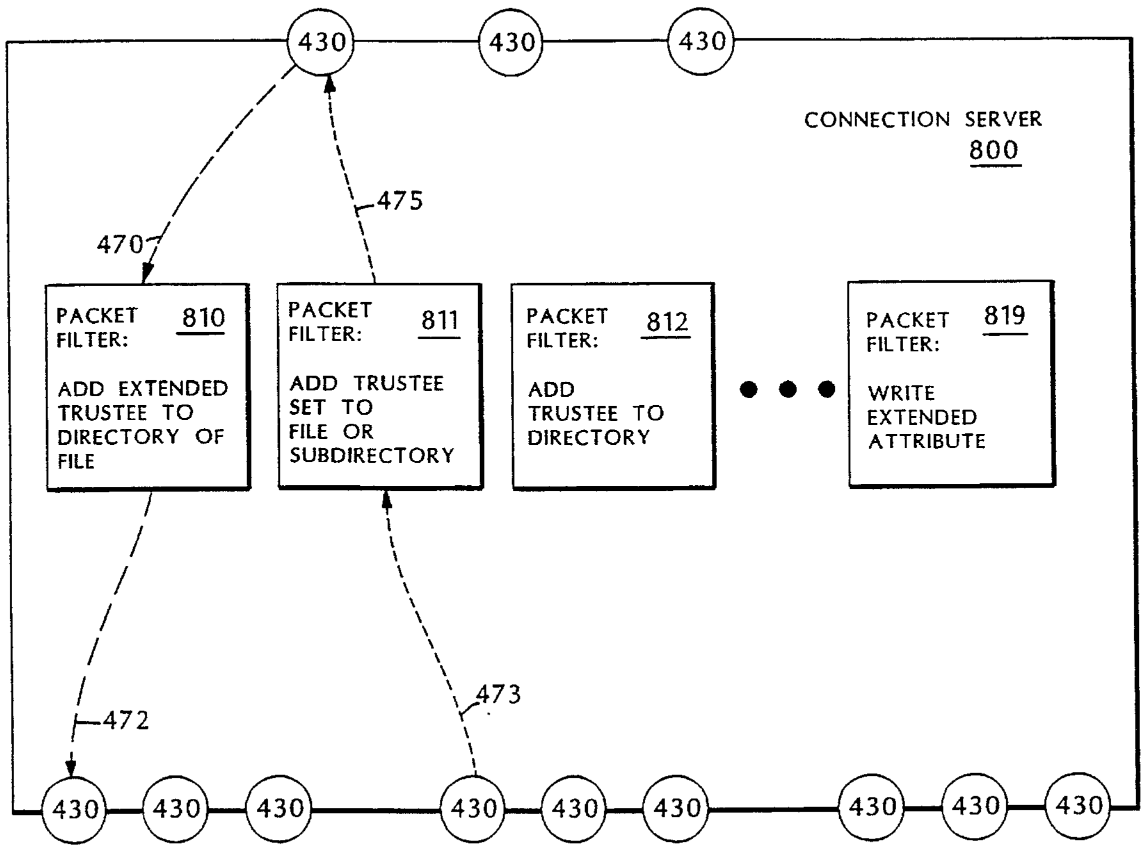
FIG. 6 is a block diagram of the Connection Server portion of an Integrity Server.

Referring to Appendix A, a protocol of exchanged messages is used to establish a communication link between client 104 and a server (either a file server 102 or Integrity Server 100). In the stand-in case, the Integrity Server's Connection Server (800 of FIG. 4) emulates the failed server's connection establishment protocol. FIG. 6 is in two columns: the left column shows a packet trace of a connection being established in a normal setting where all server nodes of a network are functional, and the right column shows the corresponding trace for establishing the same connection in a network where one of the file servers has failed, and the Integrity Server is emulating the services of the failed server. Corresponding packets are arranged next to each other.

To establish a connection, Novell NetWare uses two families of packets. The first family includes a "Service Advertising Protocol" (SAP) packet, periodically broadcast by each server in the network to advertise the server's name and the services that the server offers. A server typically broadcasts a SAP packet on a prearranged schedule, typically once per minute or so, or may broadcast a SAP in response to a ping broadcast by a client. (The Integrity Server broadcasts a SAP packet with the name of the emulated server when stand-in begins.) The second family includes the "Scan Bindery Object" requests and responses used by NetWare 3.x version servers, initiated by a client node to seek the nearest server nodes. The third family includes the NDS (NetWare Directory Services) requests and responses, initiated by a client node to scan an enterprise-wide "yellow pages" of network services.

Referring to Appendix A, in packet number 1 (602) of the regular protocol, protected server PIGGY advertises that it provides directory server (604) and file server (606) services. In packet 224 (610), Integrity Server 100 advertises that it is a directory server (612) and file server (614). Note here that PIGGY's is advertised as having a network/node address of "0000 3469 / 0050 4947 4759" (616) and BEAKER is advertised as having a network address of "0000 3559 / 4245 414B 4552" (618).

In the corresponding packet 620 of the trace taken from a network in which Integrity Server BEAKER is standing in for failed server PIGGY, BEAKER advertises that it is a file server named PIGGY (622), a directory server named BEAKER (624), and a file server named BEAKER (626). The network address for all of these services is advertised as "0000 3559 / 4245 414B 4552" (628). Thus, this same network/node address is advertised as having two different logical names. The different services are distinguished by their socket numbers. Note that normal file servers 102 are advertised at socket number 0x0453 (which the trace-generator recognizes as special, and shows as "NCP" (630)). Because BEAKER's NCP socket is already in use (626), the file services of PIGGY are advertised as having a unique socket address (0x0001 (632) in the example).

Before a user logs in, a client node has to inquire from the network what servers are available. In either the regular or stand-in case, the client workstation broadcasts a "Nearest Server Query" packet 640. This packet is an exception to the normal rule that broadcast packets are not replied to; any number of servers (including zero) may reply to the nearest server query packet. In the traces of Appendix A, servers ROBIN and SNUFFY reply (642,643) to the client's nearest server query in either case. In the normal case, servers BEAKER and PIGGY also reply (645,646). In the stand-in case, server PIGGY has failed, and thus only BEAKER responds (648). Each server responds with only one net/node/socket address, the last one in its service table, and thus BEAKER responds with the net/node/socket and name for emulated server PIGGY (649).

Each server has a local directory of local and network services, called the bindery. Thus, to obtain full information about all servers on the network, once the client has a name and net/node/socket for a single server, the client can query this single server for detailed information about all servers. The remainder of Appendix A shows the conversation between the client node and the first server to respond to the client's query, in this case ROBIN in both cases shown. The client sends a "Scan Bindery Object" request packet 660, with "last object seen" 662 equal to 0xFFFFFFFF to indicate that the query is beginning. ROBIN replies with a packet 664 describing server ROBIN 666. The client then queries 668 for the next server in the bindery, using the object ID 670 obtained in the previous response 664 to indicate 672 that the next server query should return the next server, in this case SNUFFY 674 in packet 676.

The next reply packets 678, 680, which tell the client node about server PIGGY 682, 684, might be expected to show a divergence between the normal case and the stand-in case. (Recall that PIGGY is the file server that is actually in service in the left column, and is being stood-in for by node BEAKER in the right column.) However, because the Scan Bindery Object reply packet 678, 680 does not contain the net/node/socket address of the server in question, the packets are the same. Packets 686 describe server BEAKER to the client node, and packets 688 show that the end of the server list has been reached.

3.5 Logging in

Appendix B shows a trace of some of the packets exchanged during a login sequence between a client (node 02-80-C8-00-00-05) and a protected server (PIGGY) in a normal network, and the corresponding packets exchanged between the client, Connection Server 800 (running on node BEAKER, network address 42-45-41-4B-45-52 in the example) and Service Server 450 (running on node PIGGY2, address 50-49-47-47-59-32 in the example). Note that for illustrative purposes, Connection Server 800 and Service Server 450 have been separated onto two separate nodes; in normal use, they would run on a single node. Appendix B is in two columns: the left column shows a packet trace in a normal setting where server PIGGY is functional, and the right column shows the corresponding trace in a network where PIGGY has failed, and the Integrity Server is emulating the services of server PIGGY. Corresponding packets are arranged next to each other.

In the regular case, packet 700 goes from the client node to the server and requests "Create Service Connection." Packet 700 is emulated by two packets 702 and 704, which respectively correspond to packets 471 and 472 of FIG. 4. Note that packet 702 from the client is identical to the regular packet 700, except that the destination address 706 has been replaced in the stand-in case 702 by the network/node/socket address 707 broadcast by node BEAKER in its role of standing-in for node PIGGY, 628, 632 of packet 620 of Appendix A. No software on client 104 was altered to detect and respond to this change of address for PIGGY. Connection Server 800 receives packet 702 and generates a new packet 704 to forward to Service Server 450 by altering the destination address.

In the regular case, server PIGGY responds with a "Create Service Connection Reply" packet 708. In the stand-in case, Service Server 450 responds with a "Create Service Connection Reply" packet 710 (corresponding to packet 473 of FIG. 4), which Connection Server 800 receives and forwards as packet 712 (corresponding to packet 474).

Packets 716–720 on pages 3–4 of FIG. 7 show the Connection Server 800 altering the contents of a packet to preserve the illusion of emulating PIGGY. Packet 718 is a reply giving information about file server PIGGY to the client. In the packet 718 generated by Service Server 450, the server's name 722 is the true name of the Service Server node, PIGGY2. But in packet 720, Connection Server 800 has altered the server name content 724 of the packet to read "PIGGY."

The remainder of Appendix B shows other packets exchanged between the client node and server PIGGY in the left column, and the corresponding packets exchanged among the client node and servers BEAKER and PIGGY2 in their role of standing-in for failed server PIGGY.

3.6 Implementation of NCP Packet Filters

Referring to FIG. 6, the Connection Server 800 portion of the Integrity Server has a packet filter 810–819 tailored to each type of packet in the protocol (for instance, many of the packets in the NCP protocol were listed in FIG. 5). Packet filters can be implemented either in C programs or in a script language specially designed for the purpose.

The upper layers of Packet Management route each packet (either request 470 or reply 473) received by Connection Server 800 to its Packet Filter 810–819, with a count of the packet length. The packet filter can look at the packet type to determine if the packet is a request or a response packet, and alter the packet data and/or length depending on the contents and whether the packet is a request or response, as shown in Appendix B. A filter provides routing information to higher layers of Packet Management. A request packet can have a routing code of PacketFilter (route data to the Service Server, but get response back through the filter), PacketRoute (route data, but don't send response through filter), or PacketReturnToSender (don't route data; return directly to sender without sending to server). All response packets are routed PacketRoute.

3.7 Support for Other Applications and Services

Immediately upon standing-in for a protected server, Emulation Services executes a batch file (if one exists). This batch file may contain server commands to start up services other than file services to be provided by the Integrity Server.

For instance, the batch file may start a printer queue for a printer accessible by the Integrity Server, or a network printer. The batch file is maintained in the file system of the Integrity Server and is specific to a protected server, i.e., its pathname can be obtained algorithmically or via a table lookup given the name of the protected server.

Upon termination of stand-in mode, another similarly named batch file is executed to terminate printing if it had been started upon the initiation of stand-in mode.

3.8 Exiting Emulation: Recovery and Synchronization

When failed server 202 is ready to resume its role as a network file server, its files are brought up to date with the changed file versions stored on the Integrity Server 100 during the time that the Integrity Server is standing in for failed server 202. A synchronization process copies files that are more current on the standing-in Integrity Server 100 (i.e., files that have changed since the server 102 failed) to the recovering server, so that the current files again appear on the original server. Users may continue to access files during the first pass, and their requests will be serviced by Integrity Server 100. The second pass requires that the Integrity Server's stand-in service be halted and all users logged off. The second pass may be scheduled and performed at any time by the System Manager and requires only a short downtime. Regardless of the total amount of data being transferred, only a short period of file unavailability is required to return the failed server to full operation.

When the failed server recovers and its hardware has been verified, it is not inserted into the network while the Integrity Server is publishing the failed server's name and emulating its services. To prevent a name conflict on the network, the Agent NLM asks the System Manager whether the recovering server had been "stood-in for" while it was down. This prompt appears each time the server is booted and before the network card driver is loaded. If the response is Yes, the agent immediately modifies the recovering server's AUTOEXEC.NCF file providing a different identity for the recovering server so that it can be tested and synchronized with the Integrity Server without interrupting user access to the stand-in files on the Integrity Server. The Agent then forces the recovering server to re-boot, so that it comes on-line with an alternate name that does not conflict with the name of any other server on the network.

The System Manager invokes the first synchronization pass, which walks the directory tree of recovering server 202, comparing the entries with the tree of history packages stored on Integrity Server 100. File versions of the emulated file system that are more recent than the corresponding version on the recovering server 202, or files of the emulated file system that have no corresponding file on the recovering server, are copied from the Integrity Server to the recovering server, and the recovering server's directory structure is updated to correspond with the directory structure of the emulated file system. The comparing-and-copying process runs, while the Integrity Server continues to provide user access to the files at high priority. If printers or other peripherals are attached to the Integrity Server during stand-in, their queues are not affected by the synchronization process.

If a file was modified on the protected server after the most-recent snapshot, but the file was not modified on Integrity Server, then no action is taken during synchronization, and the more-recent version on the protected server is left in place.

If the most-recent history package in the catalog is a delete package, and the delete occurred during stand-in, then the corresponding file is deleted from the protected server.

Because users may continue to update the files on the Integrity Server while recovery is in progress, a second synchronization pass may be invoked to transfer updates that occurred during the first pass to the recovering server 202.

The System Manager notifies all users of the Integrity Server's stand-in service that it will be unavailable for a short period of time during the second pass. (This may be scheduled for off hours.) Since the bulk of changed files were already copied during the first pass, the second synchronization pass takes only a short time.

Protection for data changes on the other protected servers continues throughout both synchronization passes.

When the recovered protected server has completely synchronized its file system with that of the Integrity Server, the protected server is ready to return to full operation. The protected server's Agent is instructed to restore the protected server's original name, and the Integrity Server stops advertising the protected server's name. The protected server is rebooted, and all user requests for that server will now be handled by the recovered protected server. It also causes the Integrity Server to process any stand-down instruction file specified in the Protection Policy. The Integrity Server 100 is instructed to ignore user requests for that protected server name, and returns to a protection mode relationship with that protected server 102. Users may now log back in.

To exit stand-in mode, the Integrity Server terminates the threads used for connection management, removes its file and directory open hooks, and terminates the thread used to populate directories (if it is still active). Resources used by connection management and directory population are released.

The stand-down routine starts a dedicated thread that cleans up the EFS. The thread walks the EFS depth-first, and periodically checks to see if the same protected server is again under emulation. If the same protected server is again under emulation, the thread terminates. If not, the thread deletes the directory from the EFS. When the EFS area for the PS is empty, the thread exits. Thus, the EFS space is freed for use by the protection mode cache.

During the stand-in period, all of the changed data versions stored at the Integrity Server for the failed server were also off-loaded to off-site tapes and protected as usual.

4 OTHER FEATURES OF THE INVENTION 4.1 Verification

The Integrity Server verifies its stored files against the original copies stored on the protected serves, either on demand or as scheduled by the Protection Policy. The comparison is initiated by the Integrity Server and managed by the local agent running on each protected server.

A full verification is performed by comparing the Integrity Server catalog against the corresponding files of a protected server. Up to two checks are performed for each file:

1. Directory information comparison, including comparing the file's last access date/time stamp to the date/time stamp stored by the Integrity Server, and the file's extended attributes (protection mode, owner, etc.).
2. The agent computes a checksum of the protected file and compares this against the checksum stored by the Integrity Server.

If all checks reveal no differences, the agent moves on to the next file. If differences are detected during the first two checks, the agent copies the file to the Integrity Server disk cache for protection. If a file or directory was deleted from the protected server since the previous full verification, the file or directory in the Integrity Server's catalog is marked deleted.

During verification, the NetWare bindery is protected to disk cache 120 without any checking.

The verification process compares the current file security and extended attributes of the files on the protected server against the information stored in the catalog. If a change is noted, an appropriate history package is added to the catalog.

Verification also detects recently-read files that are not recently-written, and notifies the Integrity Server. The Integrity Server gives recently-read files preferential retention in the disk cache 120 after they are written to off-site tape 162.

4.2 File restoration

The File Restore tool of the System Manager Interface allows an administrator to list file versions available for restoration. From the listed versions on disk cache 120 or tape 150–153, 164, the administrator can select a version to be restored, identify the restore destination location, and specify an action to take if a file of the same name already exists in this destination location.

4.3 System Manager's Interface and configuring the Protection Policy

To control most system operations, the system accepts commands and configuration information from the human system manager and requests actions from the system manager through a System Manager's Interface (SMI). The SMI runs on any Windows computer of the network and can be operated by system managers or administrators who have appropriate passwords.

The SMI is the means by which the system communicates with the operator to load and unload tapes from the autoloader, label the tapes, etc.

From the SMI, the System Manager can manage the Protection Policy, which includes the system-manager-configurable rules, schedules, and structure controlling the non-demand operation of the Integrity Server.

The Protection Policy data includes information such as rules to control loading of tapes during stand-in operation, message strings to be sent to users when they login to a stand-in node, file names of instruction files to be executed when the Integrity Server stands-in and stands-down for a protected server, the maximum time a file can remain unprotected before a message is generated, file wildcards for files or directories to be excluded from protection, schedules for when to protect files that are excluded from continuous protection, expiration schedules for legacy and off-site tapes, tape label information, a list of an Integrity Server's protected servers, and descriptive information about those protected servers. The Protection Policy data are sorted and organized by start time and stop time.

The default protection schedule is to continuously protect all files on the protected servers, with certain predefined exceptions (for instance, *.tmp, \tmp*, and print queues). Entries in the Protection Policy database can specify that selected files, directories, or file types are to be excluded from continuous protection, or specify alternate protection schedules. Using the SMI, the System Manager can request jobs to be performed at specific times or with specific frequencies. For instance, if a file or set of files changes very frequently, is continuously open, is very large, or must remain in exact synchronization with other files, the System Manager can force its protection to a specific time window and frequency. Other schedulable jobs include full verifications and specific protection requests. The Integrity Server will direct the server agents to perform the specific tasks as scheduled by the System Manager. Completion of scheduled tasks is reported to the System Manager Interface.

5 ALTERNATE EMBODIMENTS

Other embodiments of the invention are within the following claims.

One alternate embodiment uses two different computer nodes, one that functions as a Storage Server, and one that functions as a hot standby server. During Protection Mode, the Storage Server performs the steps described above in Section 2. The hot standby is kept nearly empty, with only a minimum set of files required to reboot. At the beginning of stand-in mode, the hot standby server automatically creates volumes corresponding to the volumes of the failed server, and reboots under the name of the failed server. During stand-in mode, the hot-standby server does no packet re-routing; instead, file open hooks intercept requests to open files on the hot stand-by server so that an image of the protected file server's file system can be built on the hot stand-by server, using techniques similar to those described above for building the Emulated File System. As a directory is traversed, a directory image is incrementally built on the hot stand-by server using information from the catalog (stored on the storage server). At each file open, if necessary, the contents of the file is copied from the storage server to the hot stand-by server.

An alternate embodiment for synchronization uses the hot-standby concept. The failed server is placed back in service with its proper name, even though its files are out of date. During a interim synchronization period, file hooks are installed. The file hook, on every file open, consults the Integrity Server to see if a more-recent version of the file exists on the Integrity Server. If the restored server's version is more recent, then that version is opened for the client. Otherwise, if the Integrity Server's version is more recent, then that more-recent version is copied to the restored server, and opened for the client. Meanwhile, as a background process, the recovered server's files are brought up to date with those of the Integrity Server; when this completes, the file hooks are removed.

One alternate embodiment for establishing communications between client 104 and the integrity server 100, acting as a failed server 202, uses a NetWare hook into the existing NCP communications socket. When one of servers 202 fails, the Integrity Server inserts a hook into the Net Ware operating system to receive all NCP communications, and publishes the name of the failed server using the same socket as the NCP socket of the Integrity Server. All NCP communications received in the NCP socket are forwarded to Packet Management for filtering by the Integrity Server, and are then forwarded to the NewWare operating system by returning from the NetWare hook (in contrast to sending the new packet using a communications socket). The alternate approach eliminates the requirement for publishing the address of the failed server at an alternate socket, as well as eliminating the requirement for transmitting the packet to the Service Server.

```
Packet Number : 101        4:50:59 PM                602
Length : 242 bytes
802.3: ============ IEEE 802.3 Datalink Layer ============
    Station: PIGGY ---> Broadcast
    Length: 224
ipx: ============ Internetwork Packet Exchange ============
    Checksum: 0xFFFF
    Length: 224
    Hop Count: 0
    Packet Type: 0(Unknown)
    Network: 00 00 34 69         ---> 00 00 03 00
    Node:   00-50-49-47-47-59 ---> FF-FF-FF-FF-FF-FF
    Socket: SAP                  ---> SAP
sap: ============ NetWare Service Advertising Protocol ============
    Type: 2 (General Service Response)
    Server Name: PIGGY                                   ┐
        Server Type: 0x0278 (Directory Server)           │
        Network: 00 00 34 69         ┐                   ├ 604
        Node:   00-50-49-47-47-59   ┘├ 616               │
        Socket: 0x4005                                   │
        Intermediate Networks: 1                         ┘
    Server Name: PIGGY
        Server Type: 0x023F
        Network: 00 00 34 69         ┐
        Node:   00-50-49-47-47-59   ┘├ 616
        Socket: 0x907B
        Intermediate Networks: 1
    Server Name: PIGGY                                   ┐
        Server Type: 0x0004 (File Server)                │
        Network: 00 00 34 69         ┐                   ├ 606
        Node:   00-50-49-47-47-59   ┘├ 616               │
        Socket: NCP ── 630                               │
        Intermediate Networks: 1                         ┘
Packet Number : 224        4:51:50 PM                610
Length : 242 bytes
802.3: ============ IEEE 802.3 Datalink Layer ============
    Station: BEAKER---> Broadcast
    Length: 224
ipx: ============ Internetwork Packet Exchange ============
    Checksum: 0xFFFF
    Length: 224
    Hop Count: 0
    Packet Type: 0(Unknown)
    Network: 00 00 35 59         ---> 00 00 03 00
    Node:   42-45-41-4B-45-52 ---> FF-FF-FF-FF-FF-FF
    Socket: SAP                  ---> SAP
sap: ============ NetWare Service Advertising Protocol ============
    Type: 2 (General Service Response)
```

```
Packet Number : 461        3:50:17 PM                620
Length : 306 bytes
802.3: ============ IEEE 802.3 Datalink Layer ============
    Station: BEAKER---> Broadcast
    Length: 288
ipx: ============ Internetwork Packet Exchange ============
    Checksum: 0xFFFF
    Length: 288
    Hop Count: 0
    Packet Type: 0(Unknown)
    Network: 00 00 35 59         ---> 00 00 03 00
    Node:   42-45-41-4B-45-52 ---> FF-FF-FF-FF-FF-FF
    Socket: SAP                  ---> SAP
sap: ============ NetWare Service Advertising Protocol ============
    Type: 2 (General Service Response)
    Server Name: PIGGY                                   ┐
        Server Type: 0x0004 (File Server)                │
        Network: 00 00 35 59         ┐                   ├ 622
        Node:   42-45-41-4B-45-52   ┘├ 628               │
        Socket: 0x0001 ── 632                            │
        Intermediate Networks: 1                         ┘
    Server Name: BEAKER                                  ┐
        Server Type: 0x0278 (Directory Server)           │
        Network: 00 00 35 59         ┐                   ├ 624
        Node:   42-45-41-4B-45-52   ┘├ 628               │
        Socket: 0x4005                                   │
        Intermediate Networks: 1                         ┘
    Server Name: BEAKER
        Server Type: 0x023F
        Network: 00 00 35 59         ┐
        Node:   42-45-41-4B-45-52   ┘├ 628
        Socket: 0x907B
        Intermediate Networks: 1
    Server Name: BEAKER                                  ┐
        Server Type: 0x0004 (File Server)                │
        Network: 00 00 35 59         ┐                   ├ 626
        Node:   42-45-41-4B-45-52   ┘├ 628               │
        Socket: NCP ── 630                               │
        Intermediate Networks: 1                         ┘
```

Appendix A: page 1

```
Server Name: BEAKER                                   ┐
    Server Type: 0x0278 (Directory Server)            ├ 612
    Network: 00 00 35 59           ┐                  │
    Node:   42-45-41-4B-45-52      ┘ 618              ┘
    Socket:  0x4005
    Intermediate Networks: 1
Server Name: BEAKER
    Server Type: 0x023F
    Network: 00 00 35 59           ┐
    Node:   42-45-41-4B-45-52      ├ 618
    Socket:  0x907B                ┘
    Intermediate Networks: 1
Server Name: BEAKER                                   ┐
    Server Type: 0x0004 (File Server)                 │
    Network: 00 00 35 59           ┐                  │
    Node:   42-45-41-4B-45-52      ┘ 618              ├ 614
    Socket:  NCP —— 630                               │
    Intermediate Networks: 1                          ┘
```

2
```
Packet Number : 399        4:52:56 PM                 640
Length : 64 bytes
802.3: ============ IEEE 802.3 Datalink Layer ============
     Station: This_Workstation----> Broadcast
     Length: 34
 ipx: ============ Internetwork Packet Exchange ============
     Checksum: 0xFFFF
     Length: 34
     Hop Count:  0
     Packet Type: 17(NCP)
     Network: 00 00 00 00       ---> 00 00 00 00
     Node:   00-00-C0-DE-26-5F ---> FF-FF-FF-FF-FF-FF
     Socket:  0x400A            ---> SAP
 sap: ============ NetWare Service Advertising Protocol ============
     Type: 3 (Nearest Service Query)
     Server Type: 0x0004(File Server)
```

3
```
Packet Number : 405        4:52:56 PM                 642
Length : 114 bytes
802.3: ============ IEEE 802.3 Datalink Layer ============
     Station: ROBIN----> This_Workstation
     Length: 96
 ipx: ============ Internetwork Packet Exchange ============
     Checksum: 0xFFFF
     Length: 96
     Hop Count:  0
     Packet Type: 0(Unknown)
     Network: 00 00 03 00       ---> 00 00 03 00
     Node:   00-00-C0-12-41-5E ---> 00-00-C0-DE-26-5F
     Socket:  SAP               ---> 0x400A
 sap: ============ NetWare Service Advertising Protocol ============
     Type: 4 (Nearest Service Response)
     Server Name: ROBIN
        Server Type: 0x0004 (File Server)
        Network: 00 00 30 10
```

```
Packet Number : 774        3:52:45 PM                 640
Length : 64 bytes
802.3: ============ IEEE 802.3 Datalink Layer ============
     Station: This_Workstation----> Broadcast
     Length: 34
 ipx: ============ Internetwork Packet Exchange ============
     Checksum: 0xFFFF
     Length: 34
     Hop Count:  0
     Packet Type: 17(NCP)
     Network: 00 00 03 00       ---> 00 00 03 00
     Node:   00-00-C0-DE-26-5F ---> FF-FF-FF-FF-FF-FF
     Socket:  0x400A            ---> SAP
 sap: ============ NetWare Service Advertising Protocol ============
     Type: 3 (Nearest Service Query)
     Server Type: 0x0004(File Server)
```

```
Packet Number : 776        3:52:45 PM                 642
Length : 114 bytes
802.3: ============ IEEE 802.3 Datalink Layer ============
     Station: ROBIN----> This_Workstation
     Length: 96
 ipx: ============ Internetwork Packet Exchange ============
     Checksum: 0xFFFF
     Length: 96
     Hop Count:  0
     Packet Type: 0(Unknown)
     Network: 00 00 03 00       ---> 00 00 03 00
     Node:   00-00-C0-12-41-5E ---> 00-00-C0-DE-26-5F
     Socket:  SAP               ---> 0x400A
 sap: ============ NetWare Service Advertising Protocol ============
     Type: 4 (Nearest Service Response)
     Server Name: ROBIN
        Server Type: 0x0004 (File Server)
        Network: 00 00 30 10
```

```
        Node:   00-00-00-00-00-01
        Socket:  NCP
        Intermediate Networks: 1
                                                        643
Packet Number : 406        4:52:56 PM
Length : 114 bytes
802.3: ============== IEEE 802.3 Datalink Layer ==============
     Station: SNUFFY----> This_Workstation
     Length: 96
 ipx: ============= Internetwork Packet Exchange ============
     Checksum: 0xFFFF
     Length: 96
     Hop Count:  0
     Packet Type: 0(Unknown)
     Network: 00 00 03 00        ---> 00 00 03 00
     Node:    00-00-C0-49-83-4D ---> 00-00-C0-DE-26-5F
     Socket:  SAP            ---> 0x400A
 sap: ========== NetWare Service Advertising Protocol =========
     Type: 4 (Nearest Service Response)
     Server Name: SNUFFY
        Server Type: 0x0004 (File Server)
        Network: 00 00 30 27
        Node:    00-00-00-00-00-01
        Socket:  NCP
        Intermediate Networks: 1
                                                        645
Packet Number : 407        4:52:56 PM
Length : 114 bytes
802.3: ============== IEEE 802.3 Datalink Layer ==============
     Station: BEAKER----> This_Workstation
     Length: 96
 ipx: ============= Internetwork Packet Exchange ============
     Checksum: 0xFFFF
     Length: 96
     Hop Count:  0
     Packet Type: 0(Unknown)
     Network: 00 00 35 59        ---> 00 00 03 00
     Node:    42-45-41-4B-45-52 ---> 00-00-C0-DE-26-5F
     Socket:  SAP            ---> 0x400A
 sap: ========== NetWare Service Advertising Protocol =========
     Type: 4 (Nearest Service Response)
     Server Name: BEAKER
        Server Type: 0x0004 (File Server)
        Network: 00 00 35 59
        Node:    42-45-41-4B-45-52
        Socket:  NCP
        Intermediate Networks: 1
                                                        646
Packet Number : 408        4:52:56 PM
Length : 114 bytes
802.3: ============== IEEE 802.3 Datalink Layer ==============
     Station: PIGGY---> This_Workstation
     Length: 96
 ipx: ============= Internetwork Packet Exchange ============
```

```
        Node:   00-00-00-00-00-01
        Socket:  NCP
        Intermediate Networks: 1

Packet Number : 777        3:52:45 PM                   643
Length : 114 bytes
802.3: ============== IEEE 802.3 Datalink Layer ==============
     Station: SNUFFY----> This_Workstation
     Length: 96
 ipx: ============= Internetwork Packet Exchange ============
     Checksum: 0xFFFF
     Length: 96
     Hop Count:  0
     Packet Type: 0(Unknown)
     Network: 00 00 03 00        ---> 00 00 03 00
     Node:    00-00-C0-49-83-4D ---> 00-00-C0-DE-26-5F
     Socket:  SAP            ---> 0x400A
 sap: ========== NetWare Service Advertising Protocol =========
     Type: 4 (Nearest Service Response)
     Server Name: SNUFFY
        Server Type: 0x0004 (File Server)
        Network: 00 00 30 27
        Node:    00-00-00-00-00-01
        Socket:  NCP
        Intermediate Networks: 1

Packet Number : 778        3:52:45 PM                   648
Length : 114 bytes
802.3: ============== IEEE 802.3 Datalink Layer ==============
     Station: BEAKER----> This_Workstation
     Length: 96
 ipx: ============= Internetwork Packet Exchange ============
     Checksum: 0xFFFF
     Length: 96
     Hop Count:  0
     Packet Type: 0(Unknown)
     Network: 00 00 35 59        ---> 00 00 03 00
     Node:    42-45-41-4B-45-52 ---> 00-00-C0-DE-26-5F
     Socket:  SAP            ---> 0x400A
 sap: ========== NetWare Service Advertising Protocol =========
     Type: 4 (Nearest Service Response)
     Server Name: PIGGY
        Server Type: 0x0004 (File Server)
        Network: 00 00 35 59
        Node:    42-45-41-4B-45-52                  649
        Socket:  0x0001
        Intermediate Networks: 1
```

Appendix A: page 3

```
    Checksum: 0xFFFF
    Length: 96
    Hop Count: 0
    Packet Type: 0(Unknown)
    Network: 00 00 34 69        ---> 00 00 03 00
    Node:   00-50-49-47-47-59 ---> 00-00-C0-DE-26-5F
    Socket: SAP                ---> 0x400A
  sap: ========== NetWare Service Advertising Protocol ==========
    Type: 4 (Nearest Service Response)
    Server Name: PIGGY
      Server Type: 0x0004 (File Server)
      Network: 00 00 34 69
      Node:   00-50-49-47-47-59
      Socket: NCP
      Intermediate Networks: 1

Packet Number : 479        4:53:06 PM           660
Length : 66 bytes
802.3: ========== IEEE 802.3 Datalink Layer ==========
    Station: This_Workstation----> ROBIN
    Length: 48
  ipx: ========== Internetwork Packet Exchange ==========
    Checksum: 0xFFFF
    Length: 48
    Hop Count: 0
    Packet Type: 17(NCP)
    Network: 00 00 03 00        ---> 00 00 31 10
    Node:   00-00-C0-DE-26-5F ---> 00-00-00-00-00-01
    Socket: 0x4003             ---> NCP
  ncp: ========== NetWare Core Protocol ==========
    NCP Request: Scan Bindery Object
    Request Type: 0x2222 (Request)
    Sequence Number: 7
    Connection Number Low: 6
    Task Number: 1
    Connection Number High: 0
    Function Code: 23
    Subfunction Length: 9 bytes
    Subfunction Code: 55              662
    Last Object Seen: 0xFFFFFFFF
    Search Object Type: 4 (File Server)
    Search Object Name: Length: 1
                 Value : *

Packet Number : 480        4:53:06 PM           664
Length : 114 bytes
802.3: ========== IEEE 802.3 Datalink Layer ==========
    Station: ROBIN----> This_Workstation
    Length: 96
  ipx: ========== Internetwork Packet Exchange ==========
    Checksum: 0xFFFF
    Length: 95
    Hop Count: 0
    Packet Type: 17(NCP)
```

```
Packet Number : 852        3:52:56 PM           660
Length : 66 bytes
802.3: ========== IEEE 802.3 Datalink Layer ==========
    Station: This_Workstation----> ROBIN
    Length: 48
  ipx: ========== Internetwork Packet Exchange ==========
    Checksum: 0xFFFF
    Length: 48
    Hop Count: 0
    Packet Type: 17(NCP)
    Network: 00 00 03 00        ---> 00 00 31 10
    Node:   00-00-C0-DE-26-5F ---> 00-00-00-00-00-01
    Socket: 0x4003             ---> NCP
  ncp: ========== NetWare Core Protocol ==========
    NCP Request: Scan Bindery Object
    Request Type: 0x2222 (Request)
    Sequence Number: 7
    Connection Number Low: 2
    Task Number: 1
    Connection Number High: 0
    Function Code: 23
    Subfunction Length: 9 bytes
    Subfunction Code: 55              662
    Last Object Seen: 0xFFFFFFFF
    Search Object Type: 4 (File Server)
    Search Object Name: Length: 1
                 Value : *

Packet Number : 853        3:52:56 PM           664
Length : 114 bytes
802.3: ========== IEEE 802.3 Datalink Layer ==========
    Station: ROBIN----> This_Workstation
    Length: 96
  ipx: ========== Internetwork Packet Exchange ==========
    Checksum: 0xFFFF
    Length: 95
    Hop Count: 0
    Packet Type: 17(NCP)
```

```
Network: 00 00 31 10      ---> 00 00 03 00
Node:   00-00-00-00-00-01 ---> 00-00-C0-DE-26-5F
Socket: NCP               ---> 0x4003
ncp: ============ NetWare Core Protocol ============
  NCP Reply: Scan Bindery Object
  Reply Type: 0x3333 (Reply)
  Sequence Number: 7
  Connection Number Low: 6
  Task Number: 1
  Connection Number High: 0
  Completion Code: 0 (Success)
  Connection Status: 0x00
  Object ID: 0xAC000035      670
  Object Type: 4 (File Server)
  Object Name: ROBIN         666
  Object Flag: 0x01 (Dynamic)
  Security: 64 (Anyone read, File Server write)
  Object has Properties: 255 (Yes)

Packet Number : 481      4:53:06 PM      668
Length : 66 bytes
802.3: ============ IEEE 802.3 Datalink Layer ============
  Station: This_Workstation----> ROBIN
  Length: 48
ipx: ============ Internetwork Packet Exchange ============
  Checksum: 0xFFFF
  Length: 48
  Hop Count: 0
  Packet Type: 17(NCP)
  Network: 00 00 03 00      ---> 00 00 31 10
  Node:   00-00-C0-DE-26-5F ---> 00-00-00-00-00-01
  Socket: 0x4003            ---> NCP
ncp: ============ NetWare Core Protocol ============
  NCP Request: Scan Bindery Object
  Request Type: 0x2222 (Request)
  Sequence Number: 8
  Connection Number Low: 6
  Task Number: 1
  Connection Number High: 0
  Function Code: 23
  Subfunction Length: 9 bytes
  Subfunction Code: 55
  Last Object Seen: 0xAC000035      672
  Search Object Type: 4 (File Server)
  Search Object Name: Length: 1
                      Value : *

Packet Number : 482      4:53:06 PM      676
Length : 114 bytes
802.3: ============ IEEE 802.3 Datalink Layer ============
  Station: ROBIN----> This_Workstation
  Length: 96
ipx: ============ Internetwork Packet Exchange ============
  Checksum: 0xFFFF
```

```
Network: 00 00 31 10      ---> 00 00 03 00
Node:   00-00-00-00-00-01 ---> 00-00-C0-DE-26-5F
Socket: NCP               ---> 0x4003
ncp: ============ NetWare Core Protocol ============
  NCP Reply: Scan Bindery Object
  Reply Type: 0x3333 (Reply)
  Sequence Number: 7
  Connection Number Low: 2
  Task Number: 1
  Connection Number High: 0
  Completion Code: 0 (Success)
  Connection Status. 0x00
  Object ID: 0xAA00003B      670
  Object Type: 4 (File Server)
  Object Name: ROBIN         666
  Object Flag: 0x01 (Dynamic)
  Security: 64 (Anyone read, File Server write)
  Object has Properties: 255 (Yes)

Packet Number : 854      3:52:56 PM      668
Length : 66 bytes
802.3: ============ IEEE 802.3 Datalink Layer ============
  Station: This_Workstation----> ROBIN
  Length: 48
ipx: ============ Internetwork Packet Exchange ============
  Checksum: 0xFFFF
  Length: 48
  Hop Count: 0
  Packet Type: 17(NCP)
  Network: 00 00 03 00      ---> 00 00 31 10
  Node:   00-00-C0-DE-26-5F ---> 00-00-00-00-00-01
  Socket: 0x4003            ---> NCP
ncp: ============ NetWare Core Protocol ============
  NCP Request: Scan Bindery Object
  Request Type: 0x2222 (Request)
  Sequence Number: 8
  Connection Number Low: 2
  Task Number: 1
  Connection Number High: 0
  Function Code: 23
  Subfunction Length: 9 bytes
  Subfunction Code: 55
  Last Object Seen: 0xAA00003B      672
  Search Object Type: 4 (File Server)
  Search Object Name: Length: 1
                      Value : *

Packet Number : 855      3:52:56 PM      676
Length : 114 bytes
802.3: ============ IEEE 802.3 Datalink Layer ============
  Station: ROBIN----> This_Workstation
  Length: 96
ipx: ============ Internetwork Packet Exchange ============
  Checksum: 0xFFFF
```

```
      Length: 95
      Hop Count: 0
      Packet Type: 17(NCP)
      Network: 00 00 31 10      ---> 00 00 03 00
      Node:   00-00-00-00-00-01 ---> 00-00-C0-DE-26-5F
      Socket:  NCP              ---> 0x4003
   ncp: ============== NetWare Core Protocol ==============
      NCP Reply: Scan Bindery Object
      Reply Type: 0x3333 (Reply)
      Sequence Number: 8
      Connection Number Low: 6
      Task Number: 1
      Connection Number High: 0
      Completion Code: 0 (Success)
      Connection Status: 0x00
      Object ID: 0xA6000015
      Object Type: 4 (File Server)  674
      Object Name: SNUFFY
      Object Flag: 0x01 (Dynamic)
      Security: 64 (Anyone read, File Server write)
      Object has Properties: 255 (Yes)

Packet Number : 483        4:53:06 PM
Length : 66 bytes
802.3: ============== IEEE 802.3 Datalink Layer ==============
      Station: This_Workstation----> ROBIN
      Length: 48
   ipx: ============== Internetwork Packet Exchange ==============
      Checksum: 0xFFFF
      Length: 48
      Hop Count: 0
      Packet Type: 17(NCP)
      Network: 00 00 03 00      ---> 00 00 31 10
      Node:   00-00-C0-DE-26-5F ---> 00-00-00-00-00-01
      Socket:  0x4003           ---> NCP
   ncp: ============== NetWare Core Protocol ==============
      NCP Request: Scan Bindery Object
      Request Type: 0x2222 (Request)
      Sequence Number: 9
      Connection Number Low: 6
      Task Number: 1
      Connection Number High: 0
      Function Code: 23
      Subfunction Length: 9 bytes
      Subfunction Code: 55
      Last Object Seen: 0xA6000015
      Search Object Type: 4 (File Server)
      Search Object Name: Length: 1
                   Value : *

Packet Number : 484        4:53:06 PM        678
Length : 114 bytes
802.3: ============== IEEE 802.3 Datalink Layer ==============
      Station: ROBIN---> This_Workstation
```

```
      Length: 95
      Hop Count: 0
      Packet Type: 17(NCP)
      Network: 00 00 31 10      ---> 00 00 03 00
      Node:   00-00-00-00-00-01 ---> 00-00-C0-DE-26-5F
      Socket:  NCP              ---> 0x4003
   ncp: ============== NetWare Core Protocol ==============
      NCP Reply: Scan Bindery Object
      Reply Type: 0x3333 (Reply)
      Sequence Number: 8
      Connection Number Low: 2
      Task Number: 1
      Connection Number High: 0
      Completion Code: 0 (Success)
      Connection Status: 0x00
      Object ID: 0xB2000012
      Object Type: 4 (File Server)  674
      Object Name: SNUFFY
      Object Flag: 0x01 (Dynamic)
      Security: 64 (Anyone read, File Server write)
      Object has Properties: 255 (Yes)

Packet Number : 856        3:52:56 PM
Length : 66 bytes
802.3: ============== IEEE 802.3 Datalink Layer ==============
      Station: This_Workstation----> ROBIN
      Length: 48
   ipx: ============== Internetwork Packet Exchange ==============
      Checksum: 0xFFFF
      Length: 48
      Hop Count: 0
      Packet Type: 17(NCP)
      Network: 00 00 03 00      ---> 00 00 31 10
      Node:   00-00-C0-DE-26-5F ---> 00-00-00-00-00-01
      Socket:  0x4003           ---> NCP
   ncp: ============== NetWare Core Protocol ==============
      NCP Request: Scan Bindery Object
      Request Type: 0x2222 (Request)
      Sequence Number: 9
      Connection Number Low: 2
      Task Number: 1
      Connection Number High: 0
      Function Code: 23
      Subfunction Length: 9 bytes
      Subfunction Code: 55
      Last Object Seen: 0xB2000012
      Search Object Type: 4 (File Server)
      Search Object Name: Length: 1
                   Value : *

Packet Number : 857        3:52:56 PM        680
Length : 114 bytes
802.3: ============== IEEE 802.3 Datalink Layer ==============
      Station: ROBIN----> This_Workstation
```

```
    Length: 96
  ipx: =============== Internetwork Packet Exchange ===============
    Checksum: 0xFFFF
    Length: 95
    Hop Count: 0
    Packet Type: 17(NCP)
    Network: 00 00 31 10       ---> 00 00 03 00
    Node:   00-00-00-00-00-01 ---> 00-00-C0-DE-26-5F
    Socket: NCP               ---> 0x4003
  ncp: =============== NetWare Core Protocol ===============
    NCP Reply: Scan Bindery Object
    Reply Type: 0x3333 (Reply)
    Sequence Number: 9
    Connection Number Low: 6
    Task Number: 1
    Connection Number High: 0
    Completion Code: 0 (Success)
    Connection Status: 0x00
    Object ID: 0xA1000074
    Object Type: 4 (File Server) ]- 682
    Object Name: PIGGY           ]
    Object Flag: 0x01 (Dynamic)
    Security: 64 (Anyone read, File Server write)
    Object has Properties: 255 (Yes)

Packet Number : 485       4:53:06 PM
Length : 66 bytes
802.3: =============== IEEE 802.3 Datalink Layer ===============
    Station: This_Workstation----> ROBIN
    Length: 48
  ipx: =============== Internetwork Packet Exchange ===============
    Checksum: 0xFFFF
    Length: 48
    Hop Count: 0
    Packet Type: 17(NCP)
    Network: 00 00 03 00       ---> 00 00 31 10
    Node:   00-00-C0-DE-26-5F ---> 00-00-00-00-00-01
    Socket: 0x4003            ---> NCP
  ncp: =============== NetWare Core Protocol ===============
    NCP Request: Scan Bindery Object
    Request Type: 0x2222 (Request)
    Sequence Number: 10
    Connection Number Low: 6
    Task Number: 1
    Connection Number High: 0
    Function Code: 23
    Subfunction Length: 9 bytes
    Subfunction Code: 55
    Last Object Seen: 0xA1000074
    Search Object Type: 4 (File Server)
    Search Object Name: Length: 1
                 Value : *

Packet Number : 486       4:53:06 PM
```

```
    Length: 96
  ipx: =============== Internetwork Packet Exchange ===============
    Checksum: 0xFFFF
    Length: 95
    Hop Count: 0
    Packet Type: 17(NCP)
    Network: 00 00 31 10       ---> 00 00 03 00
    Node:   00-00-00-00-00-01 ---> 00-00-C0-DE-26-5F
    Socket: NCP               ---> 0x4003
  ncp: =============== NetWare Core Protocol ===============
    NCP Reply: Scan Bindery Object
    Reply Type: 0x3333 (Reply)
    Sequence Number: 9
    Connection Number Low: 2
    Task Number: 1
    Connection Number High: 0
    Completion Code: 0 (Success)
    Connection Status: 0x00
    Object ID: 0xA2000038
    Object Type: 4 (File Server) ]- 684
    Object Name: PIGGY           ]
    Object Flag: 0x01 (Dynamic)
    Security: 64 (Anyone read, File Server write)
    Object has Properties: 255 (Yes)

Packet Number : 858       3:52:56 PM
Length : 66 bytes
802.3: =============== IEEE 802.3 Datalink Layer ===============
    Station: This_Workstation----> ROBIN
    Length: 48
  ipx: =============== Internetwork Packet Exchange ===============
    Checksum: 0xFFFF
    Length: 48
    Hop Count: 0
    Packet Type: 17(NCP)
    Network: 00 00 03 00       ---> 00 00 31 10
    Node:   00-00-C0-DE-26-5F ---> 00-00-00-00-00-01
    Socket: 0x4003            ---> NCP
  ncp: =============== NetWare Core Protocol ===============
    NCP Request: Scan Bindery Object
    Request Type: 0x2222 (Request)
    Sequence Number: 10
    Connection Number Low: 2
    Task Number: 1
    Connection Number High: 0
    Function Code: 23
    Subfunction Length: 9 bytes
    Subfunction Code: 55
    Last Object Seen: 0xA2000038
    Search Object Type: 4 (File Server)
    Search Object Name: Length: 1
                 Value : *

Packet Number : 859       3:52:56 PM
```

```
Length : 114 bytes
802.3: ==================== IEEE 802.3 Datalink Layer ====================
     Station: ROBIN----> This_Workstation
     Length: 96
  ipx: ==================== Internetwork Packet Exchange ====================
     Checksum: 0xFFFF
     Length: 95
     Hop Count: 0
     Packet Type: 17(NCP)
     Network: 00 00 31 10       ---> 00 00 03 00
     Node:   00-00-00-00-00-01 ---> 00-00-C0-DE-26-5F
     Socket: NCP              ---> 0x4003
  ncp: ==================== NetWare Core Protocol ====================
     NCP Reply: Scan Bindery Object
     Reply Type: 0x3333 (Reply)
     Sequence Number: 10
     Connection Number Low: 6
     Task Number: 1
     Connection Number High: 0
     Completion Code: 0 (Success)
     Connection Status: 0x00
     Object ID: 0xB300002A
     Object Type: 4 (File Server)
     Object Name: BEAKER
     Object Flag: 0x01 (Dynamic)
     Security: 64 (Anyone read, File Server write)
     Object has Properties: 255 (Yes)
```

686

```
Packet Number : 487        4:53:06 PM
Length : 66 bytes
802.3: ==================== IEEE 802.3 Datalink Layer ====================
     Station: This_Workstation----> ROBIN
     Length: 48
  ipx: ==================== Internetwork Packet Exchange ====================
     Checksum: 0xFFFF
     Length: 48
     Hop Count: 0
     Packet Type: 17(NCP)
     Network: 00 00 03 00       ---> 00 00 31 10
     Node:   00-00-C0-DE-26-5F ---> 00-00-00-00-00-01
     Socket: 0x4003            ---> NCP
  ncp: ==================== NetWare Core Protocol ====================
     NCP Request: Scan Bindery Object
     Request Type: 0x2222 (Request)
     Sequence Number: 11
     Connection Number Low: 6
     Task Number: 1
     Connection Number High: 0
     Function Code: 23
     Subfunction Length: 9 bytes
     Subfunction Code: 55
     Last Object Seen: 0xB300002A
     Search Object Type: 4 (File Server)
     Search Object Name: Length: 1
```

```
Length : 114 bytes
802.3: ==================== IEEE 802.3 Datalink Layer ====================
     Station: ROBIN----> This_Workstation
     Length: 96
  ipx: ==================== Internetwork Packet Exchange ====================
     Checksum: 0xFFFF
     Length: 95
     Hop Count: 0
     Packet Type: 17(NCP)
     Network: 00 00 31 10       ---> 00 00 03 00
     Node:   00-00-00-00-00-01 ---> 00-00-C0-DE-26-5F
     Socket: NCP              ---> 0x4003
  ncp: ==================== NetWare Core Protocol ====================
     NCP Reply: Scan Bindery Object
     Reply Type: 0x3333 (Reply)
     Sequence Number: 10
     Connection Number Low: 2
     Task Number: 1
     Connection Number High: 0
     Completion Code: 0 (Success)
     Connection Status: 0x00
     Object ID: 0x9F000051
     Object Type: 4 (File Server)
     Object Name: BEAKER
     Object Flag: 0x01 (Dynamic)
     Security: 64 (Anyone read, File Server write)
     Object has Properties: 255 (Yes)
```

686

```
Packet Number : 861        3:52:56 PM
Length : 66 bytes
802.3: ==================== IEEE 802.3 Datalink Layer ====================
     Station: This_Workstation----> ROBIN
     Length: 48
  ipx: ==================== Internetwork Packet Exchange ====================
     Checksum: 0xFFFF
     Length: 48
     Hop Count: 0
     Packet Type: 17(NCP)
     Network: 00 00 03 00       ---> 00 00 31 10
     Node:   00-00-C0-DE-26-5F ---> 00-00-00-00-00-01
     Socket: 0x4003            ---> NCP
  ncp: ==================== NetWare Core Protocol ====================
     NCP Request: Scan Bindery Object
     Request Type: 0x2222 (Request)
     Sequence Number: 11
     Connection Number Low: 2
     Task Number: 1
     Connection Number High: 0
     Function Code: 23
     Subfunction Length: 9 bytes
     Subfunction Code: 55
     Last Object Seen: 0x9F000051
     Search Object Type: 4 (File Server)
     Search Object Name: Length: 1
```

```
Value : *

Packet Number : 488        4:53:06 PM
Length : 64 bytes                                   688
802.3: ============== IEEE 802.3 Datalink Layer ==============
    Station: ROBIN----> This_Workstation
    Length: 38
ipx: ============== Internetwork Packet Exchange ==============
    Checksum: 0xFFFF
    Length: 38
    Hop Count: 0
    Packet Type: 17(NCP)
    Network: 00 00 31 10       ---> 00 00 03 00
    Node:  00-00-00-00-00-01 ---> 00-00-C0-DE-26-5F
    Socket: NCP               ---> 0x4003
ncp: ============== NetWare Core Protocol ==============
    NCP Reply: Scan Bindery Object
    Reply Type: 0x3333 (Reply)
    Sequence Number: 11
    Connection Number Low: 6
    Task Number: 1
    Connection Number High: 0
    Completion Code: 252 (No Such Object)
    Connection Status: 0x00
```

```
Value : *

Packet Number : 862        3:52:56 PM
Length : 64 bytes                                   688
802.3: ============== IEEE 802.3 Datalink Layer ==============
    Station: ROBIN----> This_Workstation
    Length: 38
ipx: ============== Internetwork Packet Exchange ==============
    Checksum: 0xFFFF
    Length: 38
    Hop Count: 0
    Packet Type: 17(NCP)
    Network: 00 00 31 10       ---> 00 00 03 00
    Node:  00-00-00-00-00-01 ---> 00-00-C0-DE-26-5F
    Socket: NCP               ---> 0x4003
ncp: ============== NetWare Core Protocol ==============
    NCP Reply: Scan Bindery Object
    Reply Type: 0x3333 (Reply)
    Sequence Number: 11
    Connection Number Low: 2
    Task Number: 1
    Connection Number High: 0
    Completion Code: 252 (No Such Object)
    Connection Status: 0x00
```

1

```
Packet Number : 2        8:56:10 PM                    700
Length : 64 bytes
802.3: ============ IEEE 802.3 Datalink Layer ============
    Station: 02-80-C8-00-00-05----> PIGGY
    Length: 38
 ipx: ============ Internetwork Packet Exchange ============
    Checksum: 0xFFFF
    Length: 37
    Hop Count: 0
    Packet Type: 17(NCP)
    Network: 00 00 03 00       ---> 00 00 34 69          ┐
    Node:    02-80-C8-00-00-05 ---> 00-50-49-47-47-59    ┘- 706
    Socket:  0x4003            ---> NCP
 ncp: ============ NetWare Core Protocol ============
    NCP Request: Create Service Connection
    Request Type: 0x1111 (Create Service Connection)
    Sequence Number: 0
    Connection Number: 255
```

2

```
Packet Number : 3        8:56:10 PM                    708
Length : 64 bytes
802.3: ============ IEEE 802.3 Datalink Layer ============
    Station: PIGGY----> 02-80-C8-00-00-05
    Length: 38
 ipx: ============ Internetwork Packet Exchange ============
    Checksum: 0xFFFF
    Length: 38
    Hop Count: 0
    Packet Type: 17(NCP)
    Network: 00 00 34 69       ---> 00 00 03 00
    Node:    00-50-49-47-47-59 ---> 02-80-C8-00-00-05
    Socket:  NCP               ---> 0x4003
 ncp: ============ NetWare Core Protocol ============
    NCP Reply: Create Service Connection
    Reply Type: 0x3333 (Reply)
```

```
Packet Number : 2        9:08:31 PM                    702
Length : 64 bytes
802.3: ============ IEEE 802.3 Datalink Layer ============
    Station: 02-80-C8-00-00-05----> BEAKER
    Length: 38
 ipx: ============ Internetwork Packet Exchange ============
    Checksum: 0xFFFF
    Length: 37
    Hop Count: 0
    Packet Type: 17(NCP)
    Network: 00 00 03 00       ---> 00 00 35 59          ┐
    Node:    02-80-C8-00-00-05 ---> 42-45-41-4B-45-52    ┘- 707
    Socket:  0x4003            ---> 0x0001
 ncp: ============ NetWare Core Protocol ============
    NCP Request: Create Service Connection
    Request Type: 0x1111 (Create Service Connection)
    Sequence Number: 0
    Connection Number: 255

Packet Number : 3        9:08:31 PM                    704
Length : 64 bytes
802.3: ============ IEEE 802.3 Datalink Layer ============
    Station: BEAKER----> PIGGY2
    Length: 38
 ipx: ============ Internetwork Packet Exchange ============
    Checksum: 0xFFFF
    Length: 37
    Hop Count: 1
    Packet Type: 17(NCP)
    Network: 00 00 35 59       ---> 00 00 34 69
    Node:    42-45-41-4B-45-52 ---> 50-49-47-47-59-32
    Socket:  0x40A9            ---> NCP
 ncp: ============ NetWare Core Protocol ============
    NCP Request: Create Service Connection
    Request Type: 0x1111 (Create Service Connection)
    Sequence Number: 0
    Connection Number: 255

Packet Number : 4        9:08:31 PM                    710
Length : 64 bytes
802.3: ============ IEEE 802.3 Datalink Layer ============
    Station: PIGGY2----> BEAKER
    Length: 38
 ipx: ============ Internetwork Packet Exchange ============
    Checksum: 0xFFFF
    Length: 38
    Hop Count: 0
    Packet Type: 17(NCP)
    Network: 00 00 34 69       ---> 00 00 35 59
    Node:    50-49-47-47-59-32 ---> 42-45-41-4B-45-52
    Socket:  NCP               ---> 0x40A9
 ncp: ============ NetWare Core Protocol ============
    NCP Reply: Create Service Connection
    Reply Type: 0x3333 (Reply)
```

Appendix B: page 1

```
Sequence Number: 0
Connection Number Low: 1
Task Number: 1
Connection Number High: 0
Completion Code: 0 (Success)
Connection Status: 0x00
```

3

```
Packet Number : 4          8:56:10 PM
Length : 64 bytes
802.3: ============ IEEE 802.3 Datalink Layer ============
    Station: 02-80-C8-00-00-05----> PIGGY
    Length: 40
 ipx: ============ Internetwork Packet Exchange ============
    Checksum: 0xFFFF
    Length: 40
    Hop Count: 0
    Packet Type: 17(NCP)
    Network: 00 00 03 00     ---> 00 00 34 69
    Node:   02-80-C8-00-00-05 ---> 00-50-49-47-47-59
    Socket: 0x4003           ---> NCP
 ncp: ============ NetWare Core Protocol ============
    NCP Request: Get File Server Info
    Request Type: 0x2222 (Request)
    Sequence Number: 1
    Connection Number Low: 1
    Task Number: 2
    Connection Number High: 0
    Function Code: 23
    Subfunction Length: 1 bytes
    Subfunction Code: 17
```

```
    Sequence Number: 0
    Connection Number Low: 2
    Task Number: 1
    Connection Number High: 0
    Completion Code: 0 (Success)
    Connection Status: 0x00
```

712

```
Packet Number . 5          9:08:31 PM
Length : 64 bytes
802.3: ============ IEEE 802.3 Datalink Layer ============
    Station: BEAKER----> 02-80-C8-00-00-05
    Length: 38
 ipx: ============ Internetwork Packet Exchange ============
    Checksum: 0xFFFF
    Length: 38
    Hop Count: 1
    Packet Type: 17(NCP)
    Network: 00 00 35 59     ---> 00 00 03 00
    Node:   42-45-41-4B-45-52 ---> 02-80-C8-00-00-05
    Socket: 0x0001           ---> 0x4003
 ncp: ============ NetWare Core Protocol ============
    NCP Reply: Create Service Connection
    Reply Type: 0x3333 (Reply)
    Sequence Number: 0
    Connection Number Low: 2
    Task Number: 1
    Connection Number High: 0
    Completion Code: 0 (Success)
    Connection Status: 0x00
```

```
Packet Number : 6          9:08:31 PM
Length : 64 bytes
802.3: ============ IEEE 802.3 Datalink Layer ============
    Station: 02-80-C8-00-00-05----> BEAKER
    Length: 40
 ipx: ============ Internetwork Packet Exchange ============
    Checksum: 0xFFFF
    Length: 40
    Hop Count: 0
    Packet Type: 17(NCP)
    Network: 00 00 03 00     ---> 00 00 35 59
    Node:   02-80-C8-00-00-05 ---> 42-45-41-4B-45-52
    Socket: 0x4003           ---> 0x0001
 ncp: ============ NetWare Core Protocol ============
    NCP Request: Get File Server Info
    Request Type: 0x2222 (Request)
    Sequence Number: 1
    Connection Number Low: 2
    Task Number: 2
    Connection Number High: 0
    Function Code: 23
    Subfunction Length: 1 bytes
    Subfunction Code: 17
```

4

```
Packet Number : 5          8:56:10 PM
Length : 184 bytes
802.3: ============ IEEE 802.3 Datalink Layer ============
     Station: PIGGY----> 02-80-C8-00-00-05
     Length: 166
 ipx: ============ Internetwork Packet Exchange ============
     Checksum: 0xFFFF
     Length: 166
     Hop Count: 0
     Packet Type: 17(NCP)
     Network: 00 00 34 69       ---> 00 00 03 00
     Node:    00-50-49-47-47-59 ---> 02-80-C8-00-00-05
     Socket:  NCP               ---> 0x4003
 ncp: ============ NetWare Core Protocol ============
     NCP Reply: Get File Server Info
     Reply Type: 0x3333 (Reply)
     Sequence Number: 1
     Connection Number Low: 1
     Task Number: 1
     Connection Number High: 0
     Completion Code: 0 (Success)
     Connection Status: 0x00
     Server Name: PIGGY
     Major NetWare Version: 3
     Minor NetWare Version: 11
     Maximum Number of Service Connections: 1
     Connections in Use: 0
     Number of Mounted Volumes: 64
     Revision Level: 0
     SFT Level: 2
```

716

```
Packet Number : 7          9:08:31 PM
Length : 64 bytes
802.3: ============ IEEE 802.3 Datalink Layer ============
     Station: BEAKER----> PIGGY2
     Length: 40
 ipx: ============ Internetwork Packet Exchange ============
     Checksum: 0xFFFF
     Length: 40
     Hop Count: 1
     Packet Type: 17(NCP)
     Network: 00 00 35 59       ---> 00 00 34 69
     Node:    42-45-41-4B-45-52 ---> 50-49-47-47-59-32
     Socket:  0x40A9            ---> NCP
 ncp: ============ NetWare Core Protocol ============
     NCP Request: Get File Server Info
     Request Type: 0x2222 (Request)
     Sequence Number: 1
     Connection Number Low: 2
     Task Number: 2
     Connection Number High: 0
     Function Code: 23
     Subfunction Length: 1 bytes
     Subfunction Code: 17
```

718

```
Packet Number : 8          9:08:31 PM
Length : 184 bytes
802.3: ============ IEEE 802.3 Datalink Layer ============
     Station: PIGGY2----> BEAKER
     Length: 166
 ipx: ============ Internetwork Packet Exchange ============
     Checksum: 0xFFFF
     Length: 166
     Hop Count: 0
     Packet Type: 17(NCP)
     Network: 00 00 34 69          ---> 00 00 35 59
     Node:    50-49-47-47-59-32    ---> 42-45-41-4B-45-52
     Socket:  NCP                  ---> 0x40A9
 ncp: ============ NetWare Core Protocol ============
     NCP Reply: Get File Server Info
     Reply Type: 0x3333 (Reply)
     Sequence Number: 1
     Connection Number Low: 2
     Task Number: 1
     Connection Number High: 0
     Completion Code: 0 (Success)
     Connection Status: 0x00
     Server Name: PIGGY2
     Major NetWare Version: 4
     Minor NetWare Version: 1
     Maximum Number of Service Connections: 2
     Connections in Use: 0
     Number of Mounted Volumes: 64
     Revision Level: 0
     SFT Level: 2
```

722

```
TTS Level: 1
Max Connections Used: 1
Accounting Version: 1
VAP Version: 1
Queuing Version: 1
Print Server Version: 0
Virtual Console Version: 1
Security Restriction Version: 1
Internet Bridge Support Version: 1

Packet Number : 6          8:56:10 PM
Length : 74 bytes
802.3: ============ IEEE 802.3 Datalink Layer ============
    Station: 02-80-C8-00-00-05---> PIGGY
```

```
TTS Level: 1
Max Connections Used: 1
Accounting Version: 1
VAP Version: 1
Queuing Version: 1
Print Server Version: 0
Virtual Console Version: 1
Security Restriction Version: 1
Internet Bridge Support Version: 1

Packet Number : 9          9:08:31 PM          <- 720
Length : 184 bytes
802.3: ============ IEEE 802.3 Datalink Layer ============
    Station: BEAKER----> 02-80-C8-00-00-05
    Length: 166
 ipx: ============ Internetwork Packet Exchange ============
    Checksum: 0xFFFF
    Length: 166
    Hop Count: 1
    Packet Type: 17(NCP)
    Network: 00 00 35 59       ---> 00 00 03 00
    Node:    00-50-49-47-47-59 ---> 02-80-C8-00-00-05
    Socket:  0x0001            ---> 0x4003
 ncp: ============ NetWare Core Protocol ============
    NCP Reply: Get File Server Info
    Reply Type: 0x3333 (Reply)
    Sequence Number: 1
    Connection Number Low: 2
    Task Number: 1
    Connection Number High: 0
    Completion Code: 0 (Success)
    Connection Status: 0x00
    Server Name: PIGGY -- 724
    Major NetWare Version: 3
    Minor NetWare Version: 11
    Maximum Number of Service Connections: 2
    Connections in Use: 0
    Number of Mounted Volumes: 64
    Revision Level: 0
    SFT Level: 2
    TTS Level: 1
    Max Connections Used: 1
    Accounting Version: 1
    VAP Version: 1
    Queuing Version: 1
    Print Server Version: 0
    Virtual Console Version: 1
    Security Restriction Version: 1
    Internet Bridge Support Version: 1

Packet Number : 10          9:08:31 PM
Length : 74 bytes
802.3: ============ IEEE 802.3 Datalink Layer ============
    Station: 02-80-C8-00-00-05---> BEAKER
```

Appendix B: page 4

```
   Length: 56
 ipx: ============ Internetwork Packet Exchange ============
   Checksum: 0xFFFF
   Length: 55
   Hop Count: 0
   Packet Type: 17(NCP)
   Network: 00 00 03 00        ---> 00 00 34 69
   Node:   02-80-C8-00-00-05 ---> 00-50-49-47-47-59
   Socket: 0x4003             ---> NCP
 ncp: ============ NetWare Core Protocol ============
   NCP Request: Packet Burst Connection
   Request Type: 0x2222 (Request)
   Sequence Number: 2
   Connection Number Low: 1
   Task Number: 2
   Connection Number High: 0
   Function Code: 101
   Local Connection ID: 0x9305BF1B
   Local Max Packet Size: 610
   Local Target Socket: 0x4007
   Local Max Send Size: 65535
   Local Max Receive Size: 65535

6 Packet Number : 7        8:56:10 PM
Length : 64 bytes
802.3: ============ IEEE 802.3 Datalink Layer ============
   Station: PIGGY----> 02-80-C8-00-00-05
   Length: 46
 ipx: ============ Internetwork Packet Exchange ============
   Checksum: 0xFFFF
   Length: 46
   Hop Count: 0
   Packet Type: 17(NCP)
   Network: 00 00 34 69        ---> 00 00 03 00
   Node:   00-50-49-47-47-59 ---> 02-80-C8-00-00-05
   Socket: NCP                ---> 0x4003
 ncp: ============ NetWare Core Protocol ============
   NCP Reply: Packet Burst Connection
   Reply Type: 0x3333 (Reply)
   Sequence Number: 2
   Connection Number Low: 1
   Task Number: 1
   Connection Number High: 0
   Completion Code: 0 (Success)
   Connection Status: 0x00
   Remote Target ID: 0x01000100
   Remote Max Packet Size: 610

7 Packet Number : 8        8:56:10 PM
Length : 64 bytes
802.3: ============ IEEE 802.3 Datalink Layer ============
   Station: 02-80-C8-00-00-05----> PIGGY
   Length: 40
```

```
   Length: 56
 ipx: ============ Internetwork Packet Exchange ============
   Checksum: 0xFFFF
   Length: 55
   Hop Count: 0
   Packet Type: 17(NCP)
   Network: 00 00 03 00        ---> 00 00 35 59
   Node:   02-80-C8-00-00-05 ---> 42-45-41-4B-45-52
   Socket: 0x4003             ---> 0x0001
 ncp: ============ NetWare Core Protocol ============
   NCP Request: Packet Burst Connection
   Request Type: 0x2222 (Request)
   Sequence Number: 2
   Connection Number Low: 2
   Task Number: 2
   Connection Number High: 0
   Function Code: 101
   Local Connection ID: 0x7A04561A
   Local Max Packet Size: 610
   Local Target Socket: 0x4007
   Local Max Send Size: 65535
   Local Max Receive Size: 65535

Packet Number : 11        9:08:31 PM
Length : 74 bytes
802.3: ============ IEEE 802.3 Datalink Layer ============
   Station: BEAKER----> 02-80-C8-00-00-05
   Length: 56
 ipx: ============ Internetwork Packet Exchange ============
   Checksum: 0xFFFF
   Length: 55
   Hop Count: 1
   Packet Type: 17(NCP)
   Network: 00 00 35 59        ---> 00 00 03 00
   Node:   42-45-41-4B-45-52 ---> 02-80-C8-00-00-05
   Socket: 0x0001             ---> 0x4003
 ncp: ============ NetWare Core Protocol ============
   NCP Reply: Packet Burst Connection
   Reply Type: 0x3333 (Reply)
   Sequence Number: 2
   Connection Number Low: 2
   Task Number: 2
   Connection Number High: 0
   Completion Code: 251 (No Such Property)
   Connection Status: 0x00
Data:
 0: 00 02 4D 00 00 00 00 00 07 00 00 FF FF 00 00 FF |..M............
10: FF                                              |.

Packet Number : 12        9:08:31 PM
Length : 64 bytes
802.3: ============ IEEE 802.3 Datalink Layer ============
   Station: 02-80-C8-00-00-05----> BEAKER
   Length: 40
```

```
ipx: ============== Internetwork Packet Exchange ==============
    Checksum: 0xFFFF
    Length: 40
    Hop Count: 0
    Packet Type: 17(NCP)
    Network: 00 00 03 00      ---> 00 00 34 69
    Node:    02-80-C8-00-00-05 ---> 00-50-49-47-47-59
    Socket:  0x4003            ---> NCP
ncp: ============== NetWare Core Protocol ==============
    NCP Request: Get Big Packet NCP Max Packet Size
    Request Type: 0x2222 (Request)
    Sequence Number: 3
    Connection Number Low: 1
    Task Number: 2
    Connection Number High: 0
    Function Code: 97
    Proposed Max Size: 1500
    Security Flags: 0x00

8 Packet Number : 9          8:56:10 PM
Length : 64 bytes
802.3: ============== IEEE 802.3 Datalink Layer ==============
    Station: PIGGY----> 02-80-C8-00-00-05
    Length: 44
ipx: ============== Internetwork Packet Exchange ==============
    Checksum: 0xFFFF
    Length: 43
    Hop Count: 0
    Packet Type: 17(NCP)
    Network: 00 00 34 69      ---> 00 00 03 00
```

```
ipx: ============== Internetwork Packet Exchange ==============
    Checksum: 0xFFFF
    Length: 40
    Hop Count: 0
    Packet Type: 17(NCP)
    Network: 00 00 03 00      ---> 00 00 35 59
    Node:    02-80-C8-00-00-05 ---> 42-45-41-4B-45-52
    Socket:  0x4003            ---> 0x0001
ncp: ============== NetWare Core Protocol ==============
    NCP Request: Get Big Packet NCP Max Packet Size
    Request Type: 0x2222 (Request)
    Sequence Number: 3
    Connection Number Low: 2
    Task Number: 2
    Connection Number High: 0
    Function Code: 97
    Proposed Max Size: 1500
    Security Flags: 0x00

Packet Number : 13          9:08:31 PM
Length : 64 bytes
802.3: ============== IEEE 802.3 Datalink Layer ==============
    Station: BEAKER----> PIGGY2
    Length: 40
ipx: ============== Internetwork Packet Exchange ==============
    Checksum: 0xFFFF
    Length: 40
    Hop Count: 1
    Packet Type: 17(NCP)
    Network: 00 00 35 59      ---> 00 00 34 69
    Node:    42-45-41-4B-45-52 ---> 50-49-47-47-59-32
    Socket:  0x40A9            ---> NCP
ncp: ============== NetWare Core Protocol ==============
    NCP Request: Get Big Packet NCP Max Packet Size
    Request Type: 0x2222 (Request)
    Sequence Number: 2
    Connection Number Low: 2
    Task Number: 2
    Connection Number High: 0
    Function Code: 97
    Proposed Max Size: 1500
    Security Flags: 0x00

Packet Number : 14          9:08:31 PM
Length : 64 bytes
802.3: ============== IEEE 802.3 Datalink Layer ==============
    Station: PIGGY2----> BEAKER
    Length: 44
ipx: ============== Internetwork Packet Exchange ==============
    Checksum: 0xFFFF
    Length: 43
    Hop Count: 0
    Packet Type: 17(NCP)
    Network: 00 00 34 69      ---> 00 00 35 59
```

```
        Node:   00-50-49-47-47-59 ---> 02-80-C8-00-00-05
        Socket: NCP              ---> 0x4003
ncp: ================= NetWare Core Protocol =================
        NCP Reply: Get Big Packet NCP Max Packet Size
        Reply Type: 0x3333 (Reply)
        Sequence Number: 3
        Connection Number Low: 1
        Task Number: 1
        Connection Number High: 0
        Completion Code: 0 (Success)
        Connection Status: 0x00
        Accepted Max Size: 1500
        Echo Socket: 0x4002
        Security Flags: 0x00
```

17

```
Packet Number : 18          8:56:10 PM
Length : 1518 bytes
802.3: ================= IEEE 802.3 Datalink Layer =================
        Station: PIGGY----> 02-80-C8-00-00-05
        Length: 1500
  ipx: ================= Internetwork Packet Exchange =================
        Checksum: 0xFFFF
        Length: 1500
        Hop Count: 0
        Packet Type: 17(NCP)
        Network: 00 00 34 69      ---> 00 00 03 00
        Node:   00-50-49-47-47-59 ---> 02-80-C8-00-00-05
        Socket: 0x4002            ---> 0x4006
```

```
        Node:   50-49-47-47-59-32 ---> 42-45-41-4B-45-52
        Socket: NCP              ---> 0x40A9
ncp: ================= NetWare Core Protocol =================
        NCP Reply: Get Big Packet NCP Max Packet Size
        Reply Type: 0x3333 (Reply)
        Sequence Number: 2
        Connection Number Low: 2
        Task Number: 1
        Connection Number High: 0
        Completion Code: 0 (Success)
        Connection Status: 0x00
        Accepted Max Size: 1500
        Echo Socket: 0x4002
        Security Flags: 0x00

Packet Number : 15          9:08:31 PM
Length : 64 bytes
802.3: ================= IEEE 802.3 Datalink Layer =================
        Station: BEAKER----> 02-80-C8-00-00-05
        Length: 44
  ipx: ================= Internetwork Packet Exchange =================
        Checksum: 0xFFFF
        Length: 43
        Hop Count: 1
        Packet Type: 17(NCP)
        Network: 00 00 35 59      ---> 00 00 03 00
        Node:   42-45-41-4B-45-52 ---> 02-80-C8-00-00-05
        Socket: 0x0001            ---> 0x4003
  ncp: ================= NetWare Core Protocol =================
        NCP Reply: Get Big Packet NCP Max Packet Size
        Reply Type: 0x3333 (Reply)
        Sequence Number: 3
        Connection Number Low: 2
        Task Number: 1
        Connection Number High: 0
        Completion Code: 0 (Success)
        Connection Status: 0x00
        Accepted Max Size: 1500
        Echo Socket: 0x4002
        Security Flags: 0x00

Packet Number : 24          9:08:31 PM
Length : 1518 bytes
802.3: ================= IEEE 802.3 Datalink Layer =================
        Station: BEAKER----> 02-80-C8-00-00-05
        Length: 1500
  ipx: ================= Internetwork Packet Exchange =================
        Checksum: 0xFFFF
        Length: 1500
        Hop Count: 0
        Packet Type: 17(NCP)
        Network: 00 00 35 59      ---> 00 00 03 00
        Node:   42-45-41-4B-45-52 ---> 02-80-C8-00-00-05
        Socket: 0x4002            ---> 0x4006
```

```
ncp: ============== NetWare Core Protocol ==============
  Unknown type = 0x3
Data:
   0: F4 06 70 00 52 09 CC 02 F4 06 70 00 F4 06 70 00 |..p.R.....p...p.
  10: 54 FF 00 F0 9C 7E 00 F0 6F EF 00 F0 9F 2A FB 27 |T....~..o....*.'
  20: 5A 18 38 DC 6F EF 00 F0 6F EF 00 F0 6F EF 00 F0 |Z.8.o...o...o...
  30: CB 01 3E 17 57 EF 00 F0 F4 06 70 00 D5 16 EA 2D |..>.W.....p....-
  40: 4D F8 00 F0 41 F8 00 F0 FC 17 38 DC 39 E7 00 F0 |M...A.....8.9...
  50: D7 18 38 DC 2E E8 00 F0 41 00 10 24 B0 8D 00 F0 |..8.....A..$....
  60: C7 18 38 DC 9C 00 7F 05 EE 06 70 00 53 FF 00 F0 |..8.......p.S...
  70: F6 70 00 F0 22 05 00 00 00 00 00 00 94 10 16 01 |.p.."...........
  80: C6 0A BC 24 B1 02 06 15 87 12 C4 3F 55 01 06 15 |...$.......?U...
  90: 15 19 38 DC 5E 19 38 DC BC 10 16 01 67 02 10 24 |..8.^.8.....g..$
  A0: 62 07 70 00 0A 01 10 24 DA 10 16 01 DA 10 16 01 |b.p....$........
  B0: DA 10 16 01 3F 01 06 15 85 02 D7 D3 EA D0 10 16 |....?...........
  C0: 01 FF 00 F0 DA 10 16 01 EE 08 FB 27 DA 10 16 01 |...........'....
  D0: DA 10 16 01 DA 10 16 01 DA 10 16 01 DA 10 16 01 |................
  E0: DA 10 16 01 DA 10 16 01 DA 10 16 01 DA 10 16 01 |................
  F0: DA 10 16 01 DA 10 16 01 DA 10 16 01 59 EC 00 F0 |............Y...
 100: B0 FE 00 F0 65 F0 00 F0 53 FF 00 F0 53 FF 00 F0 |....e...S...S...
 110: 53 FF 00 F0 B0 FE 00 F0 53 FF 00 F0 53 FF 00 F0 |S.......S...S...
 120: 53 FF 00 F0 53 FF 00 F0 F7 10 01 C6 53 FF 00 F0 |S...S.......S...
 130: 53 FF 00 F0 53 FF 00 F0 53 FF 00 F0 53 FF 00 F0 |S...S...S...S...
 140: 53 FF 00 F0 53 FF 00 F0 53 FF 00 F0 53 FF 00 F0 |S...S...S...S...
 150: 53 FF 00 F0 53 FF 00 F0 53 FF 00 F0 53 FF 00 F0 |S...S...S...S...
 160: 53 FF 00 F0 53 FF 00 F0 53 FF 00 F0 53 FF 00 F0 |S...S...S...S...
 170: 53 FF 00 F0 53 FF 00 F0 53 FF 00 F0 00 00 00 00 |S...S...S.......
 180: 00 00 00 00 00 00 00 00 00 00 00 00 EE 06 75 18 |..............u.
 190: 00 00 00 00 00 00 00 00 B0 02 CC 02 53 FF 00 F0 |............S...
 1A0: 53 FF 00 F0 53 FF 00 F0 53 FF 00 F0 53 FF 00 F0 |S...S...S...S...
 1B0: 53 FF 00 F0 53 FF 00 F0 53 FF 00 F0 EA 96 00 F0 |S...S...S.......
 1C0: EA FE 00 F0 C0 03 7F 05 6F EF 00 F0 8F 00 DA 2C |........o......,
 1D0: F4 FE 00 F0 02 FF 00 F0 6F EF 00 F0 00 00 00 00 |........o.......
 1E0: 00 00 00 00 EE 06 75 18 00 00 00 00 00 00 00 00 |......u.........
 1F0: 00 00 00 00 00 00 00 00 00 00 00 00 00 00 00 00 |................
 200: 00 00 00 00 00 00 00 00 00 00 00 00 00 00 00 00 |................
 210: 00 00 00 00 00 00 00 00 00 00 00 00 00 00 00 00 |................
 220: 00 00 00 00 00 00 00 00 00 00 00 00 00 00 00 00 |................
 230: 00 00 00 00 00 00 00 00 00 00 00 00 00 00 00 00 |................
 240: 00 00 00 00 00 00 00 00 00 00 00 00 00 00 00 00 |................
 250: 00 00 00 00 00 00 00 00 00 00 00 00 00 00 00 00 |................
 260: 00 00 00 00 00 00 00 00 00 00 00 00 00 00 00 00 |................
 270: 00 00 00 00 00 00 00 00 00 00 00 00 00 00 00 00 |................
 280: 00 00 00 00 00 00 00 00 00 00 00 00 00 00 00 00 |................
 290: 00 00 00 00 00 00 00 00 00 00 00 00 00 00 00 00 |................
 2A0: 00 00 00 00 00 00 00 00 00 00 00 00 00 00 00 00 |................
 2B0: 00 00 00 00 00 00 00 00 00 00 00 00 00 00 00 00 |................
 2C0: 00 00 00 00 00 00 00 00 00 00 00 00 00 00 00 00 |................
 2D0: 00 00 00 00 00 00 00 00 00 00 00 00 00 00 00 00 |................
 2E0: 00 00 00 00 00 00 00 00 00 00 00 00 00 00 00 00 |................
 2F0: 00 00 00 00 00 00 00 00 00 00 00 00 00 00 00 00 |................
 300: 00 00 00 00 00 00 00 00 00 00 00 00 00 00 00 00 |................
 310: 00 00 00 00 00 00 00 00 00 00 00 00 00 00 00 00 |................
 320: 00 00 00 00 00 00 00 00 00 00 00 00 00 00 00 00 |................
```

```
ncp: ============== NetWare Core Protocol ==============
  Unknown type = 0x3
Data:
   0: F4 06 70 00 52 09 CC 02 F4 06 70 00 F4 06 70 00 |..p.R.....p...p.
  10: 54 FF 00 F0 9C 7E 00 F0 6F EF 00 F0 9F 2A FB 27 |T....~..o....*.'
  20: 5A 18 38 DC 6F EF 00 F0 6F EF 00 F0 6F EF 00 F0 |Z.8.o...o...o...
  30: CB 01 3E 17 57 EF 00 F0 F4 06 70 00 D5 16 EA 2D |..>.W.....p....-
  40: 4D F8 00 F0 41 F8 00 F0 FC 17 38 DC 39 E7 00 F0 |M...A.....8.9...
  50: D7 18 38 DC 2E E8 00 F0 41 00 10 24 B0 8D 00 F0 |..8.....A..$....
  60: C7 18 38 DC 9C 00 7F 05 EE 06 70 00 53 FF 00 F0 |..8.......p.S...
  70: F6 70 00 F0 22 05 00 00 00 00 00 00 94 10 16 01 |.p.."...........
  80: C6 0A BC 24 B1 02 06 15 87 12 C4 3F 55 01 06 15 |...$.......?U...
  90: 15 19 38 DC 5E 19 38 DC BC 10 16 01 67 02 10 24 |..8.^.8.....g..$
  A0: 62 07 70 00 0A 01 10 24 DA 10 16 01 DA 10 16 01 |b.p....$........
  B0: DA 10 16 01 3F 01 06 15 85 02 D7 D3 EA D0 10 16 |....?...........
  C0: 01 FF 00 F0 DA 10 16 01 EE 08 FB 27 DA 10 16 01 |...........'....
  D0: DA 10 16 01 DA 10 16 01 DA 10 16 01 DA 10 16 01 |................
  E0: DA 10 16 01 DA 10 16 01 DA 10 16 01 DA 10 16 01 |................
  F0: DA 10 16 01 DA 10 16 01 DA 10 16 01 59 EC 00 F0 |............Y...
 100: B0 FE 00 F0 65 F0 00 F0 53 FF 00 F0 53 FF 00 F0 |....e...S...S...
 110: 53 FF 00 F0 B0 FE 00 F0 53 FF 00 F0 53 FF 00 F0 |S.......S...S...
 120: 53 FF 00 F0 53 FF 00 F0 F7 10 01 C6 53 FF 00 F0 |S...S.......S...
 130: 53 FF 00 F0 53 FF 00 F0 53 FF 00 F0 53 FF 00 F0 |S...S...S...S...
 140: 53 FF 00 F0 53 FF 00 F0 53 FF 00 F0 53 FF 00 F0 |S...S...S...S...
 150: 53 FF 00 F0 53 FF 00 F0 53 FF 00 F0 53 FF 00 F0 |S...S...S...S...
 160: 53 FF 00 F0 53 FF 00 F0 53 FF 00 F0 53 FF 00 F0 |S...S...S...S...
 170: 53 FF 00 F0 53 FF 00 F0 53 FF 00 F0 00 00 00 00 |S...S...S.......
 180: 00 00 00 00 00 00 00 00 00 00 00 00 EE 06 75 18 |..............u.
 190: 00 00 00 00 00 00 00 00 B0 02 CC 02 53 FF 00 F0 |............S...
 1A0: 53 FF 00 F0 53 FF 00 F0 53 FF 00 F0 53 FF 00 F0 |S...S...S...S...
 1B0: 53 FF 00 F0 53 FF 00 F0 53 FF 00 F0 EA 96 00 F0 |S...S...S.......
 1C0: EA FE 00 F0 C0 03 7F 05 6F EF 00 F0 8F 00 DA 2C |........o......,
 1D0: F4 FE 00 F0 02 FF 00 F0 6F EF 00 F0 00 00 00 00 |........o.......
 1E0: 00 00 00 00 EE 06 75 18 00 00 00 00 00 00 00 00 |......u.........
 1F0: 00 00 00 00 00 00 00 00 00 00 00 00 00 00 00 00 |................
 200: 00 00 00 00 00 00 00 00 00 00 00 00 00 00 00 00 |................
 210: 00 00 00 00 00 00 00 00 00 00 00 00 00 00 00 00 |................
 220: 00 00 00 00 00 00 00 00 00 00 00 00 00 00 00 00 |................
 230: 00 00 00 00 00 00 00 00 00 00 00 00 00 00 00 00 |................
 240: 00 00 00 00 00 00 00 00 00 00 00 00 00 00 00 00 |................
 250: 00 00 00 00 00 00 00 00 00 00 00 00 00 00 00 00 |................
 260: 00 00 00 00 00 00 00 00 00 00 00 00 00 00 00 00 |................
 270: 00 00 00 00 00 00 00 00 00 00 00 00 00 00 00 00 |................
 280: 00 00 00 00 00 00 00 00 00 00 00 00 00 00 00 00 |................
 290: 00 00 00 00 00 00 00 00 00 00 00 00 00 00 00 00 |................
 2A0: 00 00 00 00 00 00 00 00 00 00 00 00 00 00 00 00 |................
 2B0: 00 00 00 00 00 00 00 00 00 00 00 00 00 00 00 00 |................
 2C0: 00 00 00 00 00 00 00 00 00 00 00 00 00 00 00 00 |................
 2D0: 00 00 00 00 00 00 00 00 00 00 00 00 00 00 00 00 |................
 2E0: 00 00 00 00 00 00 00 00 00 00 00 00 00 00 00 00 |................
 2F0: 00 00 00 00 00 00 00 00 00 00 00 00 00 00 00 00 |................
 300: 00 00 00 00 00 00 00 00 00 00 00 00 00 00 00 00 |................
 310: 00 00 00 00 00 00 00 00 00 00 00 00 00 00 00 00 |................
 320: 00 00 00 00 00 00 00 00 00 00 00 00 00 00 00 00 |................
```

```
330: 00 00 00 00 00 00 00 00 00 00 00 00 00 00 00 00 ¦................
340: 00 00 00 00 00 00 00 00 00 00 00 00 00 00 00 00 ¦................
350: 00 00 00 00 00 00 00 00 00 00 00 00 00 00 00 00 ¦................
360: 00 00 00 00 00 00 00 00 00 00 00 00 00 00 00 00 ¦................
370: 00 00 00 00 00 00 00 00 00 00 00 00 00 00 00 00 ¦................
380: 00 00 00 00 00 00 00 00 00 00 00 00 00 00 00 00 ¦................
390: 00 00 00 00 00 00 00 00 00 00 4B FF 00 F0 4B FF ¦..........K...K.
3A0: 00 F0 82 02 00 00 30 80 C9 93 00 00 19 FF 19 FF ¦......0.........
3B0: 00 F0 46 02 00 00 30 FF C9 93 00 F0 00 00 DA 6F ¦..F...0........o
3C0: 18 6E 4B 6C 50 00 FF 05 50 00 50 BF 46 00 77 06 ¦.nKlP...P.P.F.w.
3D0: 06 02 00 7C EE 34 01 00 18 6C 32 7E 00 00 50 D1 ¦...¦.4...l2~..P.
3E0: 32 FF 00 00 78 03 33 00 A5 04 00 F0 02 02 23 00 ¦2...x.3.......#.
3F0: 88 13 00 00 F2 7D 31 03 00 F0 46 02 F8 03 00 00 ¦.....}1...F.....
400: 00 00 00 00 78 03 BC 03 BC 03 C4 03 27 C2 00 80 ¦....x.......'...
410: 02 00 00 A0 00 00 36 00 36 00 E0 4D E0 4D 69 17 ¦......6.6..M.Mi.
420: 67 22 67 22 79 15 E0 53 E0 53 E0 53 E0 53 E0 53 ¦g"g"y..S.S.S.S.S
430: 0D 1C E0 4B E0 4B E0 4B E0 4D 00 00 00 01 80 00 ¦...K.K.K.M......
440: 00 00 00 00 00 03 50 00 00 10 00 00 00 0A 00 00 ¦......P.........
450: 00 00 00 00 00 00 00 00 00 00 00 00 07 06 00 D4 ¦................
460: 03 29 00 76 07 06 1A 00 B6 5D 08 00 00 00 00 00 ¦.).v.....]......
470: 00 01 80 00 14 14 14 34 01 01 01 01 1E 00 3E 00 ¦.......4......>.
480: 18 13 00 60 09 13 0D 00 50 01 00 07 0F 07 00 00 ¦...'....P.......
490: 00 00 10 12 B2 07 27 1F 50 E8 F8 FF 00 00 00 00 ¦......'.P.......
4A0: 00 00 00 00 32 00 00 C0 00 00 00 00 00 00 00 00 ¦....2...........
4B0: 00 00 00 00 00 00 00 00 00 00 00 00 00 00 00 00 ¦................
4C0: 00 00 00 00 00 00 00 00 00 00 00 00 00 00 00 00 ¦................
4D0: 00 00 00 00 00 00 00 00 00 00 00 00 00 00 00 00 ¦................
4E0: 00 00 00 00 00 00 00 00 00 00 00 00 00 00 00 00 ¦................
4F0: 00 00 00 00 00 00 00 00 00 00 00 00 00 00 20 20 ¦..............
500: 00 00 20 20 53 59 53 27 00 00 00 00 00 00 00 00 ¦..  SYS'........
510: 00 00 00 88 E8 1A 02 00 56 9F 00 00 4D 53 DF 02 ¦........V...MS..
520: 25 02 26 1B FF 6C F6 0F 08 00 00 00 00 00 00 00 ¦%.&..l..........
530: 00 00 00 00 6A 1A 0C 00 FA 94 00 00 33 38 36 53 ¦....j.......386S
540: 50 41 52 54 50 41 52 26 00 00 00 00 00 00 00 00 ¦PARTPAR&........
550: 00 00 36 79 12 1D F5 AA 00 10 77 01 7E 30 30 32 ¦..6y......w.~002
560: 36 36 31 30 44 4F 43 20 00 00 00 00 00 00 00 00 ¦6610DOC ........
570: 00 00 93 5B 59 1B 19 00 C4 6C 00 00 45 4C 56 5F ¦...[Y....l..ELV_
580: 32 43 43 33 31 20 20 20 00 00 00 00 00 00 00 00 ¦2CC31   ........
590: 00 00 D0 05 7A 1B 40 00 00 30 00 00 44 42 4C 53 ¦....z.@..0..DBLS
5A0: 50 41 43 45 42 49 4E 07 00 00 00 00 00 00 00 00 ¦PACEBIN.........
5B0: 00 00 00 30 6A 1A 6F 00 0E C8 00 00             ¦...0j.o.....
```

18

Packet Number : 19        8:56:10 PM
Length : 1454 bytes
802.3: ============ IEEE 802.3 Datalink Layer ============
    Station: PIGGY----> 02-80-C8-00-00-05
    Length: 1436
ipx: ============ Internetwork Packet Exchange ============
    Checksum: 0xFFFF
    Length: 1436
    Hop Count: 0
    Packet Type: 17(NCP)
    Network: 00 00 34 69     ---> 00 00 03 00
    Node: 00-50-49-47-47-59 ---> 02-80-C8-00-00-05

```
330: 00 00 00 00 00 00 00 00 00 00 00 00 00 00 00 00 ¦................
340: 00 00 00 00 00 00 00 00 00 00 00 00 00 00 00 00 ¦................
350: 00 00 00 00 00 00 00 00 00 00 00 00 00 00 00 00 ¦................
360: 00 00 00 00 00 00 00 00 00 00 00 00 00 00 00 00 ¦................
370: 00 00 00 00 00 00 00 00 00 00 00 00 00 00 00 00 ¦................
380: 00 00 00 00 00 00 00 00 00 00 00 00 00 00 00 00 ¦................
390: 00 00 00 00 00 00 00 00 00 00 4B FF 00 F0 4B FF ¦..........K...K.
3A0: 00 F0 82 02 00 00 30 80 C9 93 00 00 19 FF 19 FF ¦......0.........
3B0: 00 F0 46 02 00 00 20 FF C9 93 00 F0 00 00 DA 6F ¦..F... ........o
3C0: 18 6E 4B 6C 50 00 FF 05 50 00 50 BF 46 00 77 06 ¦.nKlP...P.P.F.w.
3D0: 06 02 00 7C EE 34 01 00 18 6C 32 7E 00 00 50 D1 ¦...¦.4...l2~..P.
3E0: 32 FF 00 00 78 03 33 00 A5 04 00 F0 02 02 33 00 ¦2...x.3.......3.
3F0: 88 13 00 00 F2 7D 31 03 00 F0 46 02 F8 03 00 00 ¦.....}1...F.....
400: 00 00 00 00 78 03 BC 03 BC 03 C4 03 27 C2 00 80 ¦....x.......'...
410: 02 00 00 A0 00 00 32 00 32 00 2F 35 61 1E 64 20 ¦......2.2./5a.d
420: 6D 32 69 17 6E 31 20 39 2F 35 62 30 0D 1C 20 39 ¦m2i.n1 9/5b0.. 9
430: 70 19 69 17 67 22 67 22 79 15 00 00 00 01 80 00 ¦p.i.g"g"y.......
440: 00 00 00 00 00 03 50 00 00 10 00 00 00 07 00 00 ¦......P.........
450: 00 00 00 00 00 00 00 00 00 00 00 00 07 06 00 D4 ¦................
460: 03 29 00 76 07 06 1A 00 CF 52 0D 00 00 00 00 00 ¦.).v.....R......
470: 00 01 80 00 14 14 14 34 01 01 01 01 1E 00 3E 00 ¦.......4......>.
480: 18 13 00 60 09 13 0D 00 50 01 00 07 0F 07 00 00 ¦...'....P.......
490: 00 00 10 12 B2 07 27 1F 80 E4 F8 FF 00 00 00 00 ¦......'.........
4A0: 00 00 00 00 32 00 00 C0 00 00 00 00 00 00 00 00 ¦....2...........
4B0: 00 00 00 00 00 00 00 00 00 00 00 00 00 00 00 00 ¦................
4C0: 00 00 00 00 00 00 00 00 00 00 00 00 00 00 00 00 ¦................
4D0: 00 00 00 00 00 00 00 00 00 00 00 00 00 00 00 00 ¦................
4E0: 00 00 00 00 00 00 00 00 00 00 00 00 00 00 00 00 ¦................
4F0: 00 00 00 00 00 00 00 00 00 00 00 00 00 00 20 20 ¦..............
500: 00 00 20 20 53 59 53 27 00 00 00 00 00 00 00 00 ¦..  SYS'........
510: 00 00 00 88 E8 1A 02 00 56 9F 00 00 4D 53 DF 02 ¦........V...MS..
520: 25 02 26 1B FF 6C F6 0F 08 00 00 00 00 00 00 00 ¦%.&..l..........
530: 00 00 00 00 6A 1A 0C 00 FA 94 00 00 33 38 36 53 ¦....j.......386S
540: 50 41 52 54 50 41 52 26 00 00 00 00 00 00 00 00 ¦PARTPAR&........
550: 00 00 36 79 12 1D F5 AA 00 10 77 01 7E 30 30 32 ¦..6y......w.~002
560: 36 36 31 30 44 4F 43 20 00 00 00 00 00 00 00 00 ¦6610DOC ........
570: 00 00 93 5B 59 1B 19 00 C4 6C 00 00 45 4C 56 5F ¦...[Y....l..ELV_
580: 32 43 43 33 31 20 20 20 00 00 00 00 00 00 00 00 ¦2CC31   ........
590: 00 00 D0 05 7A 1B 40 00 00 30 00 00 44 42 4C 53 ¦....z.@..0..DBLS
5A0: 50 41 43 45 42 49 4E 07 00 00 00 00 00 00 00 00 ¦PACEBIN.........
5B0: 00 00 00 30 6A 1A 6F 00 0E C8 00 00             ¦...0j.o.....
```

Packet Number : 25        9:08:31 PM
Length : 1454 bytes
802.3: ============ IEEE 802.3 Datalink Layer ============
    Station: BEAKER---> 02-80-C8-00-00-05
    Length: 1436
ipx: ============ Internetwork Packet Exchange ============
    Checksum: 0xFFFF
    Length: 1436
    Hop Count: 0
    Packet Type: 17(NCP)
    Network: 00 00 35 59     ---> 00 00 03 00
    Node: 42-45-41-4B-45-52 ---> 02-80-C8-00-00-05

```
Socket: 0x4002        ---> 0x4006
ncp: ============ NetWare Core Protocol ============
   Unknown type = 0x4
Data:
  0: F4 06 70 00 52 09 CC 02 F4 06 70 00 F4 06 70 00 |..p.R.....p...p.
 10: 54 FF 00 F0 9C 7E 00 F0 6F EF 00 F0 9F 2A FB 27 |T....~..o....*.'
 20: 5A 18 38 DC 6F EF 00 F0 6F EF 00 F0 6F EF 00 F0 |Z.8.o...o...o...
 30: CB 01 3E 17 57 EF 00 F0 F4 06 70 00 D5 16 EA 2D |..>.W.....p....-
 40: 4D F8 00 F0 41 F8 00 F0 FC 17 38 DC 39 E7 00 F0 |M...A.....8.9...
 50: D7 18 38 DC 2E E8 00 F0 41 00 10 24 B0 8D 00 F0 |..8.....A..$....
 60: C7 18 38 DC 9C 00 7F 05 EE 06 70 00 53 FF 00 F0 |..8.......p.S...
 70: F6 70 00 F0 22 05 00 00 00 00 00 00 94 10 16 01 |.p.."...........
 80: C6 0A BC 24 B1 02 06 15 87 12 C4 3F 55 01 06 15 |...$.......?U...
 90: 15 19 38 DC 5E 19 38 DC BC 10 16 01 67 02 10 24 |..8.^.8.....g..$
 A0: 62 07 70 00 0A 01 10 24 DA 10 16 01 DA 10 16 01 |b.p....$........
 B0: DA 10 16 01 3F 01 06 15 85 02 D7 D3 EA D0 10 16 |....?...........
 C0: 01 FF 00 F0 DA 10 16 01 EE 08 FB 27 DA 10 16 01 |...........'....
 D0: DA 10 16 01 DA 10 16 01 DA 10 16 01 DA 10 16 01 |................
 E0: DA 10 16 01 DA 10 16 01 DA 10 16 01 DA 10 16 01 |................
 F0: DA 10 16 01 DA 10 16 01 DA 10 16 01 59 EC 00 F0 |............Y...
100: B0 FE 00 F0 65 F0 00 F0 53 FF 00 F0 53 FF 00 F0 |....e...S...S...
110: 53 FF 00 F0 B0 FE 00 F0 53 FF 00 F0 53 FF 00 F0 |S.......S...S...
120: 53 FF 00 F0 53 FF 00 F0 F7 10 01 C6 53 FF 00 F0 |S...S.......S...
130: 53 FF 00 F0 53 FF 00 F0 53 FF 00 F0 53 FF 00 F0 |S...S...S...S...
140: 53 FF 00 F0 53 FF 00 F0 53 FF 00 F0 53 FF 00 F0 |S...S...S...S...
150: 53 FF 00 F0 53 FF 00 F0 53 FF 00 F0 53 FF 00 F0 |S...S...S...S...
160: 53 FF 00 F0 53 FF 00 F0 53 FF 00 F0 53 FF 00 F0 |S...S...S...S...
170: 53 FF 00 F0 53 FF 00 F0 53 FF 00 F0 00 00 00 00 |S...S...S.......
180: 00 00 00 00 00 00 00 00 00 00 00 00 EE 06 75 18 |..............u.
190: 00 00 00 00 00 00 00 00 B0 02 CC 02 53 FF 00 F0 |............S...
1A0: 53 FF 00 F0 53 FF 00 F0 53 FF 00 F0 53 FF 00 F0 |S...S...S...S...
1B0: 53 FF 00 F0 53 FF 00 F0 53 FF 00 F0 EA 96 00 F0 |S...S...S.......
1C0: EA FE 00 F0 C0 03 7F 05 6F EF 00 F0 8F 00 DA 2C |........o......,
1D0: F4 FE 00 F0 02 FF 00 F0 6F EF 00 F0 00 00 00 00 |........o.......
1E0: 00 00 00 00 EE 06 75 18 00 00 00 00 00 00 00 00 |......u.........
1F0: 00 00 00 00 00 00 00 00 00 00 00 00 00 00 00 00 |................
200: 00 00 00 00 00 00 00 00 00 00 00 00 00 00 00 00 |................
210: 00 00 00 00 00 00 00 00 00 00 00 00 00 00 00 00 |................
220: 00 00 00 00 00 00 00 00 00 00 00 00 00 00 00 00 |................
230: 00 00 00 00 00 00 00 00 00 00 00 00 00 00 00 00 |................
240: 00 00 00 00 00 00 00 00 00 00 00 00 00 00 00 00 |................
250: 00 00 00 00 00 00 00 00 00 00 00 00 00 00 00 00 |................
260: 00 00 00 00 00 00 00 00 00 00 00 00 00 00 00 00 |................
270: 00 00 00 00 00 00 00 00 00 00 00 00 00 00 00 00 |................
280: 00 00 00 00 00 00 00 00 00 00 00 00 00 00 00 00 |................
290: 00 00 00 00 00 00 00 00 00 00 00 00 00 00 00 00 |................
2A0: 00 00 00 00 00 00 00 00 00 00 00 00 00 00 00 00 |................
2B0: 00 00 00 00 00 00 00 00 00 00 00 00 00 00 00 00 |................
2C0: 00 00 00 00 00 00 00 00 00 00 00 00 00 00 00 00 |................
2D0: 00 00 00 00 00 00 00 00 00 00 00 00 00 00 00 00 |................
2E0: 00 00 00 00 00 00 00 00 00 00 00 00 00 00 00 00 |................
2F0: 00 00 00 00 00 00 00 00 00 00 00 00 00 00 00 00 |................
300: 00 00 00 00 00 00 00 00 00 00 00 00 00 00 00 00 |................
310: 00 00 00 00 00 00 00 00 00 00 00 00 00 00 00 00 |................
```

```
Socket: 0x4002        ---> 0x4006
ncp: ============ NetWare Core Protocol ============
   Unknown type = 0x4
Data:
  0: F4 06 70 00 52 09 CC 02 F4 06 70 00 F4 06 70 00 |..p.R.....p...p.
 10: 54 FF 00 F0 9C 7E 00 F0 6F EF 00 F0 9F 2A FB 27 |T....~..o....*.'
 20: 5A 18 38 DC 6F EF 00 F0 6F EF 00 F0 6F EF 00 F0 |Z.8.o...o...o...
 30: CB 01 3E 17 57 EF 00 F0 F4 06 70 00 D5 16 EA 2D |..>.W.....p....-
 40: 4D F8 00 F0 41 F8 00 F0 FC 17 38 DC 39 E7 00 F0 |M...A.....8.9...
 50: D7 18 38 DC 2E E8 00 F0 41 00 10 24 B0 8D 00 F0 |..8.....A..$....
 60: C7 18 38 DC 9C 00 7F 05 EE 06 70 00 53 FF 00 F0 |..8.......p.S...
 70: F6 70 00 F0 22 05 00 00 00 00 00 00 94 10 16 01 |.p.."...........
 80: C6 0A BC 24 B1 02 06 15 87 12 C4 3F 55 01 06 15 |...$.......?U...
 90: 15 19 38 DC 5E 19 38 DC BC 10 16 01 67 02 10 24 |..8.^.8.....g..$
 A0: 62 07 70 00 0A 01 10 24 DA 10 16 01 DA 10 16 01 |b.p....$........
 B0: DA 10 16 01 3F 01 06 15 85 02 D7 D3 EA D0 10 16 |....?...........
 C0: 01 FF 00 F0 DA 10 16 01 EE 08 FB 27 DA 10 16 01 |...........'....
 D0: DA 10 16 01 DA 10 16 01 DA 10 16 01 DA 10 16 01 |................
 E0: DA 10 16 01 DA 10 16 01 DA 10 16 01 DA 10 16 01 |................
 F0: DA 10 16 01 DA 10 16 01 DA 10 16 01 59 EC 00 F0 |............Y...
100: B0 FE 00 F0 65 F0 00 F0 53 FF 00 F0 53 FF 00 F0 |....e...S...S...
110: 53 FF 00 F0 B0 FE 00 F0 53 FF 00 F0 53 FF 00 F0 |S.......S...S...
120: 53 FF 00 F0 53 FF 00 F0 F7 10 01 C6 53 FF 00 F0 |S...S.......S...
130: 53 FF 00 F0 53 FF 00 F0 53 FF 00 F0 53 FF 00 F0 |S...S...S...S...
140: 53 FF 00 F0 53 FF 00 F0 53 FF 00 F0 53 FF 00 F0 |S...S...S...S...
150: 53 FF 00 F0 53 FF 00 F0 53 FF 00 F0 53 FF 00 F0 |S...S...S...S...
160: 53 FF 00 F0 53 FF 00 F0 53 FF 00 F0 53 FF 00 F0 |S...S...S...S...
170: 53 FF 00 F0 53 FF 00 F0 53 FF 00 F0 00 00 00 00 |S...S...S.......
180: 00 00 00 00 00 00 00 00 00 00 00 00 EE 06 75 18 |..............u.
190: 00 00 00 00 00 00 00 00 B0 02 CC 02 53 FF 00 F0 |............S...
1A0: 53 FF 00 F0 53 FF 00 F0 53 FF 00 F0 53 FF 00 F0 |S...S...S...S...
1B0: 53 FF 00 F0 53 FF 00 F0 53 FF 00 F0 EA 96 00 F0 |S...S...S.......
1C0: EA FE 00 F0 C0 03 7F 05 6F EF 00 F0 8F 00 DA 2C |........o......,
1D0: F4 FE 00 F0 02 FF 00 F0 6F EF 00 F0 00 00 00 00 |........o.......
1E0: 00 00 00 00 EE 06 75 18 00 00 00 00 00 00 00 00 |......u.........
1F0: 00 00 00 00 00 00 00 00 00 00 00 00 00 00 00 00 |................
200: 00 00 00 00 00 00 00 00 00 00 00 00 00 00 00 00 |................
210: 00 00 00 00 00 00 00 00 00 00 00 00 00 00 00 00 |................
220: 00 00 00 00 00 00 00 00 00 00 00 00 00 00 00 00 |................
230: 00 00 00 00 00 00 00 00 00 00 00 00 00 00 00 00 |................
240: 00 00 00 00 00 00 00 00 00 00 00 00 00 00 00 00 |................
250: 00 00 00 00 00 00 00 00 00 00 00 00 00 00 00 00 |................
260: 00 00 00 00 00 00 00 00 00 00 00 00 00 00 00 00 |................
270: 00 00 00 00 00 00 00 00 00 00 00 00 00 00 00 00 |................
280: 00 00 00 00 00 00 00 00 00 00 00 00 00 00 00 00 |................
290: 00 00 00 00 00 00 00 00 00 00 00 00 00 00 00 00 |................
2A0: 00 00 00 00 00 00 00 00 00 00 00 00 00 00 00 00 |................
2B0: 00 00 00 00 00 00 00 00 00 00 00 00 00 00 00 00 |................
2C0: 00 00 00 00 00 00 00 00 00 00 00 00 00 00 00 00 |................
2D0: 00 00 00 00 00 00 00 00 00 00 00 00 00 00 00 00 |................
2E0: 00 00 00 00 00 00 00 00 00 00 00 00 00 00 00 00 |................
2F0: 00 00 00 00 00 00 00 00 00 00 00 00 00 00 00 00 |................
300: 00 00 00 00 00 00 00 00 00 00 00 00 00 00 00 00 |................
310: 00 00 00 00 00 00 00 00 00 00 00 00 00 00 00 00 |................
```

```
320: 00 00 00 00 00 00 00 00 00 00 00 00 00 00 00 00 ¦................
330: 00 00 00 00 00 00 00 00 00 00 00 00 00 00 00 00 ¦................
340: 00 00 00 00 00 00 00 00 00 00 00 00 00 00 00 00 ¦................
350: 00 00 00 00 00 00 00 00 00 00 00 00 00 00 00 00 ¦................
360: 00 00 00 00 00 00 00 00 00 00 00 00 00 00 00 00 ¦................
370: 00 00 00 00 00 00 00 00 00 00 00 00 00 00 00 00 ¦................
380: 00 00 00 00 00 00 00 00 00 00 00 00 00 00 00 00 ¦................
390: 00 00 00 00 00 00 00 00 00 00 4B FF 00 F0 4B FF ¦..........K...K.
3A0: 00 F0 82 02 00 00 30 80 C9 93 00 00 19 FF 19 FF ¦......0.........
3B0: 00 F0 46 02 00 00 30 FF C9 93 00 F0 00 00 DA 6F ¦..F...0........o
3C0: 18 6E 4B 6C 50 00 FF 05 50 00 50 BF 46 00 77 06 ¦.nKlP...P.P.F.w.
3D0: 06 02 00 7C EE 34 01 00 18 6C 32 7E 00 00 50 D1 ¦...¦.4...l2~..P.
3E0: 32 FF 00 00 78 03 33 00 A5 04 00 F0 02 02 23 00 ¦2...x.3.......#.
3F0: 88 13 00 00 F2 7D 31 03 00 F0 46 02 F8 03 00 00 ¦.....}1...F.....
400: 00 00 00 00 78 03 BC 03 BC 03 C4 03 27 C2 00 80 ¦....x.......'...
410: 02 00 00 A0 00 00 36 00 36 00 E0 4D E0 4D 69 17 ¦......6.6..M.Mi.
420: 67 22 67 22 79 15 E0 53 E0 53 E0 53 E0 53 E0 53 ¦g"g"y..S.S.S.S.S
430: 0D 1C E0 4B E0 4B E0 4B E0 4D 00 00 00 01 80 00 ¦...K.K.K.M......
440: 00 00 00 00 00 03 50 00 00 10 00 00 00 0A 00 00 ¦......P.........
450: 00 00 00 00 00 00 00 00 00 00 00 07 06 00 D4 ¦...............
460: 03 29 00 76 07 06 1A 00 B6 5D 08 00 00 00 00 00 ¦.).v.....]......
470: 00 01 80 00 14 14 14 34 01 01 01 01 1E 00 3E 00 ¦.......4......>.
480: 18 13 00 60 09 13 0D 00 50 01 00 07 0F 07 00 00 ¦...'....P.......
490: 00 00 10 12 B2 07 27 1F 70 F7 FF FF 01 00 00 00 ¦......'.p.......
4A0: 00 00 00 00 32 00 00 C0 00 00 00 00 00 00 00 00 ¦....2...........
4B0: 00 00 00 00 00 00 00 00 00 00 00 00 00 00 00 00 ¦................
4C0: 00 00 00 00 00 00 00 00 00 00 00 00 00 00 00 00 ¦................
4D0: 00 00 00 00 00 00 00 00 00 00 00 00 00 00 00 00 ¦................
4E0: 00 00 00 00 00 00 00 00 00 00 00 00 00 00 00 00 ¦................
4F0: 00 00 00 00 00 00 00 00 00 00 00 00 00 00 20 20 ¦..............
500: 00 00 20 20 53 59 53 27 00 00 00 00 00 00 00 00 ¦..  SYS'........
510: 00 00 00 88 E8 1A 02 00 56 9F 00 00 4D 53 DF 02 ¦........V...MS..
520: 25 02 26 1B FF 6C F6 0F 08 00 00 00 00 00 00 00 ¦%.&..l..........
530: 00 00 00 00 6A 1A 0C 00 FA 94 00 00 33 38 36 53 ¦....j.......386S
540: 50 41 52 54 50 41 52 26 00 00 00 00 00 00 00 00 ¦PARTPAR&........
550: 00 00 36 79 12 1D F5 AA 00 10 77 01 7E 30 30 32 ¦..6y......w.~002
560: 36 36 31 30 44 4F 43 20 00 00 00 00 00 00 00 00 ¦6610DOC ........
570: 00 00 93 5B 59 1B 19 00 C4 6C 00 00             ¦...[Y....l..
```

19 Packet Number : 20 8:56:10 PM
Length : 64 bytes
802.3: ══════════ IEEE 802.3 Datalink Layer ══════════
  Station: 02-80-C8-00-00-05---> PIGGY
  Length: 42
ipx: ══════════ Internetwork Packet Exchange ══════════
  Checksum: 0xFFFF
  Length: 41
  Hop Count: 0
  Packet Type: 17(NCP)
  Network: 00 00 03 00 ---> 00 00 34 69
  Node: 02-80-C8-00-00-05 ---> 00-50-49-47-47-59
  Socket: 0x4003 ---> NCP
ncp: ══════════ NetWare Core Protocol ══════════
  NCP Request: Ping for NDS

```
320: 00 00 00 00 00 00 00 00 00 00 00 00 00 00 00 00 ¦................
330: 00 00 00 00 00 00 00 00 00 00 00 00 00 00 00 00 ¦................
340: 00 00 00 00 00 00 00 00 00 00 00 00 00 00 00 00 ¦................
350: 00 00 00 00 00 00 00 00 00 00 00 00 00 00 00 00 ¦................
360: 00 00 00 00 00 00 00 00 00 00 00 00 00 00 00 00 ¦................
370: 00 00 00 00 00 00 00 00 00 00 00 00 00 00 00 00 ¦................
380: 00 00 00 00 00 00 00 00 00 00 00 00 00 00 00 00 ¦................
390: 00 00 00 00 00 00 00 00 00 00 4B FF 00 F0 4B FF ¦..........K...K.
3A0: 00 F0 82 02 00 00 30 80 C9 93 00 00 19 FF 19 FF ¦......0.........
3B0: 00 F0 46 02 00 00 20 FF C9 93 00 F0 00 00 DA 6F ¦..F...  ........o
3C0: 18 6E 4B 6C 50 00 FF 05 50 00 50 BF 46 00 77 06 ¦.nKlP...P.P.F.w.
3D0: 06 02 00 7C EE 34 01 00 18 6C 32 7E 00 00 50 D1 ¦...¦.4...l2~..P.
3E0: 32 FF 00 00 78 03 33 00 A5 04 00 F0 02 02 33 00 ¦2...x.3.......3.
3F0: 88 13 00 00 F2 7D 31 03 00 F0 46 02 F8 03 00 00 ¦.....}1...F.....
400: 00 00 00 00 78 03 BC 03 BC 03 C4 03 27 C2 00 80 ¦....x.......'...
410: 02 00 00 A0 00 00 32 00 32 00 2F 35 61 1E 64 20 ¦......2.2./5a.d
420: 6D 32 69 17 6E 31 20 39 2F 35 62 30 0D 1C 20 39 ¦m2i.n1 9/5b0.. 9
430: 70 19 69 17 67 22 67 22 79 15 00 00 00 01 80 00 ¦p.i.g"g"y.......
440: 00 00 00 00 00 03 50 00 00 10 00 00 00 07 00 00 ¦......P.........
450: 00 00 00 00 00 00 00 00 00 00 00 07 06 00 D4 ¦...............
460: 03 29 00 76 07 06 1A 00 CF 52 0D 00 00 00 00 00 ¦.).v.....R......
470: 00 01 80 00 14 14 14 34 01 01 01 01 1E 00 3E 00 ¦.......4......>.
480: 18 13 00 60 09 13 0D 00 50 01 00 07 0F 07 00 00 ¦...'....P.......
490: 00 00 10 12 B2 07 27 1F 70 F7 FF FF 01 00 00 00 ¦......'.p.......
4A0: 00 00 00 00 32 00 00 C0 00 00 00 00 00 00 00 00 ¦....2...........
4B0: 00 00 00 00 00 00 00 00 00 00 00 00 00 00 00 00 ¦................
4C0: 00 00 00 00 00 00 00 00 00 00 00 00 00 00 00 00 ¦................
4D0: 00 00 00 00 00 00 00 00 00 00 00 00 00 00 00 00 ¦................
4E0: 00 00 00 00 00 00 00 00 00 00 00 00 00 00 00 00 ¦................
4F0: 00 00 00 00 00 00 00 00 00 00 00 00 00 00 20 20 ¦..............
500: 00 00 20 20 53 59 53 27 00 00 00 00 00 00 00 00 ¦..  SYS'........
510: 00 00 00 88 E8 1A 02 00 56 9F 00 00 4D 53 DF 02 ¦........V...MS..
520: 25 02 26 1B FF 6C F6 0F 08 00 00 00 00 00 00 00 ¦%.&..l..........
530: 00 00 00 00 6A 1A 0C 00 FA 94 00 00 33 38 36 53 ¦....j.......386S
540: 50 41 52 54 50 41 52 26 00 00 00 00 00 00 00 00 ¦PARTPAR&........
550: 00 00 36 79 12 1D F5 AA 00 10 77 01 7E 30 30 32 ¦..6y......w.~002
560: 36 36 31 30 44 4F 43 20 00 00 00 00 00 00 00 00 ¦6610DOC ........
570: 00 00 93 5B 59 1B 19 00 C4 6C 00 00             ¦...[Y....l..
```

Packet Number : 26 9:08:32 PM
Length : 64 bytes
802.3: ══════════ IEEE 802.3 Datalink Layer ══════════
  Station: 02-80-C8-00-00-05---> BEAKER
  Length: 42
ipx: ══════════ Internetwork Packet Exchange ══════════
  Checksum: 0xFFFF
  Length: 41
  Hop Count: 0
  Packet Type: 17(NCP)
  Network: 00 00 03 00 ---> 00 00 35 59
  Node: 02-80-C8-00-00-05 ---> 42-45-41-4B-45-52
  Socket: 0x4003 ---> 0x0001
ncp: ══════════ NetWare Core Protocol ══════════
  NCP Request: Ping for NDS

```
Request Type: 0x2222 (Request)
Sequence Number: 4
Connection Number Low: 1
Task Number: 2
Connection Number High: 0
Function Code: 104
Subfunction Code: 1

Packet Number : 21        8:56:10 PM
Length : 156 bytes
802.3: ============= IEEE 802.3 Datalink Layer =============
    Station: PIGGY----> 02-80-C8-00-00-05
    Length: 138
 ipx: ============= Internetwork Packet Exchange =============
    Checksum: 0xFFFF
    Length: 138
    Hop Count: 0
    Packet Type: 17(NCP)
    Network: 00 00 34 69      ---> 00 00 03 00
    Node:    00-50-49-47-47-59 ---> 02-80-C8-00-00-05
    Socket:  NCP              ---> 0x4003
 ncp: ============= NetWare Core Protocol =============
    NCP Reply:
    Reply Type: 0x3333 (Reply)
    Sequence Number: 4
    Connection Number Low: 1
    Task Number: 1
    Connection Number High: 0
    Completion Code: 0 (Success)
    Connection Status: 0x00
    Version: 9
```

```
    Request Type: 0x2222 (Request)
    Sequence Number: 4
    Connection Number Low: 2
    Task Number: 2
    Connection Number High: 0
    Function Code: 104
    Subfunction Code: 1

Packet Number : 27        9:08:32 PM
Length : 64 bytes
802.3: ============= IEEE 802.3 Datalink Layer =============
    Station: BEAKER----> PIGGY2
    Length: 42
 ipx: ============= Internetwork Packet Exchange =============
    Checksum: 0xFFFF
    Length: 41
    Hop Count: 1
    Packet Type: 17(NCP)
    Network: 00 00 35 59      ---> 00 00 34 69
    Node:    42-45-41-4B-45-52 ---> 50-49-47-47-59-32
    Socket:  0x40A9           ---> NCP
 ncp: ============= NetWare Core Protocol =============
    NCP Request: Ping for NDS
    Request Type: 0x2222 (Request)
    Sequence Number: 3
    Connection Number Low: 2
    Task Number: 2
    Connection Number High: 0
    Function Code: 104
    Subfunction Code: 1

Packet Number : 28        9:08:32 PM
Length : 156 bytes
802.3: ============= IEEE 802.3 Datalink Layer =============
    Station: PIGGY2----> BEAKER
    Length: 138
 ipx: ============= Internetwork Packet Exchange =============
    Checksum: 0xFFFF
    Length: 138
    Hop Count: 0
    Packet Type: 17(NCP)
    Network: 00 00 34 69      ---> 00 00 35 59
    Node:    50-49-47-47-59-32 ---> 42-45-41-4B-45-52
    Socket:  NCP              ---> 0x40A9
 ncp: ============= NetWare Core Protocol =============
    NCP Reply:
    Reply Type: 0x3333 (Reply)
    Sequence Number: 3
    Connection Number Low: 2
    Task Number: 1
    Connection Number High: 0
    Completion Code: 0 (Success)
    Connection Status: 0x00
    Version: 9
```

```
    Tree Name:
OUT OF DATA. DECODE ABORTED.
Data:
  0: 21 00 00 00 50 49 47 47 59 5F 44 53 5F 5F 5F 5F |!...PIGGY_DS____
 10: 5F 5F 5F 5F 5F 5F 5F 5F 5F 5F 5F 5F 5F 5F 5F 5F |________________
 20: 5F 5F 5F 5F 00 00 00 00 00 00 00 00 22 01 00 00 |____........"...
 30: 00 00 00 00 00 00 00 00 00 00 00 00 00 00 00 00 |................
 40: 00 00 00 00 00 00 00 00 00 00 00 00 00 00 00 00 |................
 50: 00 00 00 00 00 00 00 00 00 00 00 00 00 00 00 00 |................

21 Packet Number : 22          8:56:10 PM
Length : 64 bytes
802.3: ================ IEEE 802.3 Datalink Layer ================
      Station: 02-80-C8-00-00-05----> PIGGY
      Length: 38
  ipx: ================ Internetwork Packet Exchange ================
      Checksum: 0xFFFF
      Length: 37
      Hop Count: 0
      Packet Type: 17(NCP)
      Network: 00 00 03 00      ---> 00 00 34 69

    Tree Name:
OUT OF DATA. DECODE ABORTED.
Data:
  0: 21 00 00 00 50 49 47 47 59 5F 44 53 5F 5F 5F 5F |!...PIGGY_DS____
 10: 5F 5F 5F 5F 5F 5F 5F 5F 5F 5F 5F 5F 5F 5F 5F 5F |________________
 20: 5F 5F 5F 5F 00 00 00 00 00 00 00 00 22 01 00 00 |____........"...
 30: 00 00 00 00 00 00 00 00 00 00 00 00 00 00 00 00 |................
 40: 00 00 00 00 00 00 00 00 00 00 00 00 00 00 00 00 |................
 50: 00 00 00 00 00 00 00 00 00 00 00 00 00 00 00 00 |................

Packet Number : 29          9:08:32 PM
Length : 156 bytes
802.3: ================ IEEE 802.3 Datalink Layer ================
      Station: BEAKER----> 02-80-C8-00-00-05
      Length: 138
  ipx: ================ Internetwork Packet Exchange ================
      Checksum: 0xFFFF
      Length: 138
      Hop Count: 1
      Packet Type: 17(NCP)
      Network: 00 00 35 59      ---> 00 00 03 00
      Node:   42-45-41-4B-45-52 ---> 02-80-C8-00-00-05
      Socket: 0x0001            ---> 0x4003
  ncp: ================ NetWare Core Protocol ================
      NCP Reply:
      Reply Type: 0x3333 (Reply)
      Sequence Number: 4
      Connection Number Low: 2
      Task Number: 1
      Connection Number High: 0
      Completion Code: 0 (Success)
      Connection Status: 0x00
      Version: 9
      Tree Name:
OUT OF DATA. DECODE ABORTED.
Data:
  0: 21 00 00 00 50 49 47 47 59 5F 44 53 5F 5F 5F 5F |!...PIGGY_DS____
 10: 5F 5F 5F 5F 5F 5F 5F 5F 5F 5F 5F 5F 5F 5F 5F 5F |________________
 20: 5F 5F 5F 5F 00 00 00 00 00 00 00 00 22 01 00 00 |____........"...
 30: 00 00 00 00 00 00 00 00 00 00 00 00 00 00 00 00 |................
 40: 00 00 00 00 00 00 00 00 00 00 00 00 00 00 00 00 |................
 50: 00 00 00 00 00 00 00 00 00 00 00 00 00 00 00 00 |................

Packet Number : 30          9:08:32 PM
Length : 64 bytes
802.3: ================ IEEE 802.3 Datalink Layer ================
      Station: 02-80-C8-00-00-05----> BEAKER
      Length: 38
  ipx: ================ Internetwork Packet Exchange ================
      Checksum: 0xFFFF
      Length: 37
      Hop Count: 0
      Packet Type: 17(NCP)
      Network: 00 00 03 00      ---> 00 00 35 59
```

```
    Node:    02-80-C8-00-00-05 ---> 00-50-49-47-47-59
    Socket:  0x4003          ---> NCP
 ncp: ============== NetWare Core Protocol ==============
    NCP Request: Logout
    Request Type: 0x2222 (Request)
    Sequence Number: 5
    Connection Number Low: 1
    Task Number: 2
    Connection Number High: 0
    Function Code: 25

22  Packet Number : 23        8:56:10 PM
Length : 64 bytes
802.3: ============== IEEE 802.3 Datalink Layer ==============
    Station: PIGGY---> 02-80-C8-00-00-05
    Length: 38
 ipx: ============== Internetwork Packet Exchange ==============
    Checksum: 0xFFFF
    Length: 38
    Hop Count:  0
    Packet Type: 17(NCP)
    Network: 00 00 34 69      ---> 00 00 03 00
    Node:    00-50-49-47-47-59 ---> 02-80-C8-00-00-05
    Socket:  NCP             ---> 0x4003
 ncp: ============== NetWare Core Protocol ==============
    NCP Reply: Logout
    Reply Type: 0x3333 (Reply)
    Sequence Number: 5
    Connection Number Low: 1
    Task Number: 1
    Connection Number High: 0
    Completion Code: 0 (Success)

    Node:    02-80-C8-00-00-05 ---> 42-45-41-4B-45-52
    Socket:  0x4003          ---> 0x0001
 ncp: ============== NetWare Core Protocol ==============
    NCP Request: Logout
    Request Type: 0x2222 (Request)
    Sequence Number: 5
    Connection Number Low: 2
    Task Number: 2
    Connection Number High: 0
    Function Code: 25

Packet Number : 31        9:08:32 PM
Length : 64 bytes
802.3: ============== IEEE 802.3 Datalink Layer ==============
    Station: BEAKER---> PIGGY2
    Length: 38
 ipx: ============== Internetwork Packet Exchange ==============
    Checksum: 0xFFFF
    Length: 37
    Hop Count:  1
    Packet Type: 17(NCP)
    Network: 00 00 35 59      ---> 00 00 34 69
    Node:    42-45-41-4B-45-52 ---> 50-49-47-47-59-32
    Socket:  0x40A9          ---> NCP
 ncp: ============== NetWare Core Protocol ==============
    NCP Request: Logout
    Request Type: 0x2222 (Request)
    Sequence Number: 4
    Connection Number Low: 2
    Task Number: 2
    Connection Number High: 0
    Function Code: 25

Packet Number : 32        9:08:32 PM
Length : 64 bytes
802.3: ============== IEEE 802.3 Datalink Layer ==============
    Station: PIGGY2---> BEAKER
    Length: 38
 ipx: ============== Internetwork Packet Exchange ==============
    Checksum: 0xFFFF
    Length: 38
    Hop Count:  0
    Packet Type: 17(NCP)
    Network: 00 00 34 69      ---> 00 00 35 59
    Node:    50-49-47-47-59-32 ---> 42-45-41-4B-45-52
    Socket:  NCP             ---> 0x40A9
 ncp: ============== NetWare Core Protocol ==============
    NCP Reply: Logout
    Reply Type: 0x3333 (Reply)
    Sequence Number: 4
    Connection Number Low: 2
    Task Number: 1
    Connection Number High: 0
    Completion Code: 0 (Success)
```

Connection Status: 0x00

23 Packet Number : 24 8:56:10 PM
Length : 64 bytes
802.3: ═══════ IEEE 802.3 Datalink Layer ═══════
Station: 02-80-C8-00-00-05----> PIGGY
Length: 42
ipx: ═══════ Internetwork Packet Exchange ═══════
Checksum: 0xFFFF
Length: 41
Hop Count: 0
Packet Type: 17(NCP)
Network: 00 00 03 00 ---> 00 00 34 69
Node: 02-80-C8-00-00-05 ---> 00-50-49-47-47-59
Socket: 0x4003 ---> NCP
ncp: ═══════ NetWare Core Protocol ═══════
NCP Request: Get Directory Path
Request Type: 0x2222 (Request)
Sequence Number: 6
Connection Number Low: 1
Task Number: 2
Connection Number High: 0
Function Code: 22
Subfunction Length: 2 bytes
Subfunction Code: 1
Target Directory Handle: 0x01

Connection Status: 0x00

Packet Number : 33 9:08:32 PM
Length : 64 bytes
802.3: ═══════ IEEE 802.3 Datalink Layer ═══════
Station: BEAKER----> 02-80-C8-00-00-05
Length: 38
ipx: ═══════ Internetwork Packet Exchange ═══════
Checksum: 0xFFFF
Length: 38
Hop Count: 1
Packet Type: 17(NCP)
Network: 00 00 35 59 ---> 00 00 03 00
Node: 42-45-41-4B-45-52 ---> 02-80-C8-00-00-05
Socket: 0x0001 ---> 0x4003
ncp: ═══════ NetWare Core Protocol ═══════
NCP Reply: Logout
Reply Type: 0x3333 (Reply)
Sequence Number: 5
Connection Number Low: 2
Task Number: 1
Connection Number High: 0
Completion Code: 0 (Success)
Connection Status: 0x00

Packet Number : 34 9:08:32 PM
Length : 64 bytes
802.3: ═══════ IEEE 802.3 Datalink Layer ═══════
Station: 02-80-C8-00-00-05----> BEAKER
Length: 42
ipx: ═══════ Internetwork Packet Exchange ═══════
Checksum: 0xFFFF
Length: 41
Hop Count: 0
Packet Type: 17(NCP)
Network: 00 00 03 00 ---> 00 00 35 59
Node: 02-80-C8-00-00-05 ---> 42-45-41-4B-45-52
Socket: 0x4003 ---> 0x0001
ncp: ═══════ NetWare Core Protocol ═══════
NCP Request: Get Directory Path
Request Type: 0x2222 (Request)
Sequence Number: 6
Connection Number Low: 2
Task Number: 2
Connection Number High: 0
Function Code: 22
Subfunction Length: 2 bytes
Subfunction Code: 1
Target Directory Handle: 0x01

Packet Number : 35 9:08:32 PM
Length : 64 bytes
802.3: ═══════ IEEE 802.3 Datalink Layer ═══════
Station: BEAKER----> PIGGY2

```
24
Packet Number : 25        8:56:10 PM
Length : 66 bytes
802.3: ============ IEEE 802.3 Datalink Layer ============
      Station: PIGGY----> 02-80-C8-00-00-05
      Length: 48
 ipx: ============ Internetwork Packet Exchange ============
      Checksum: 0xFFFF
      Length: 48
      Hop Count: 0
      Packet Type: 17(NCP)
      Network: 00 00 34 69      ---> 00 00 03 00
      Node:   00-50-49-47-47-59 ---> 02-80-C8-00-00-05
      Socket: NCP               ---> 0x4003
 ncp: ============ NetWare Core Protocol ============
      NCP Reply: Get Directory Path
      Reply Type: 0x3333 (Reply)
      Sequence Number: 6
      Connection Number Low: 1
      Task Number: 1
      Connection Number High: 0
      Completion Code: 0 (Success)
      Connection Status: 0x00
      Directory Path: Length: 9
                  Value : SYS:LOGIN

      Length: 42
 ipx: ============ Internetwork Packet Exchange ============
      Checksum: 0xFFFF
      Length: 41
      Hop Count: 1
      Packet Type: 17(NCP)
      Network: 00 00 35 59      ---> 00 00 34 69
      Node:   42-45-41-4B-45-52 ---> 50-49-47-47-59-32
      Socket: 0x40A9            ---> NCP
 ncp: ============ NetWare Core Protocol ============
      NCP Request: Get Directory Path
      Request Type: 0x2222 (Request)
      Sequence Number: 5
      Connection Number Low: 2
      Task Number: 2
      Connection Number High: 0
      Function Code: 22
      Subfunction Length: 2 bytes
      Subfunction Code: 1
      Target Directory Handle: 0x01

Packet Number : 36        9:08:32 PM
Length : 66 bytes
802.3: ============ IEEE 802.3 Datalink Layer ============
      Station: PIGGY2----> BEAKER
      Length: 48
 ipx: ============ Internetwork Packet Exchange ============
      Checksum: 0xFFFF
      Length: 48
      Hop Count: 0
      Packet Type: 17(NCP)
      Network: 00 00 34 69      ---> 00 00 35 59
      Node:   50-49-47-47-59-32 ---> 42-45-41-4B-45-52
      Socket: NCP               ---> 0x40A9
 ncp: ============ NetWare Core Protocol ============
      NCP Reply: Get Directory Path
      Reply Type: 0x3333 (Reply)
      Sequence Number: 5
      Connection Number Low: 2
      Task Number: 1
      Connection Number High: 0
      Completion Code: 0 (Success)
      Connection Status: 0x00
      Directory Path: Length: 9
                  Value : SYS:LOGIN

Packet Number : 37        9:08:32 PM
Length : 66 bytes
802.3: ============ IEEE 802.3 Datalink Layer ============
      Station: BEAKER----> 02-80-C8-00-00-05
      Length: 48
 ipx: ============ Internetwork Packet Exchange ============
      Checksum: 0xFFFF
      Length: 48
```

29

```
Packet Number : 30          8:56:11 PM
Length : 64 bytes
802.3: ================ IEEE 802.3 Datalink Layer ================
     Station: 02-80-C8-00-00-05----> PIGGY
     Length: 42
 ipx: ================ Internetwork Packet Exchange ================
     Checksum: 0xFFFF
     Length: 41
     Hop Count: 0
     Packet Type: 17(NCP)
     Network: 00 00 03 00        ---> 00 00 34 69
     Node:    02-80-C8-00-00-05 ---> 00-50-49-47-47-59
     Socket:  0x4003            ---> NCP
 ncp: ================ NetWare Core Protocol ================
     NCP Request: Deallocate Directory Handle
     Request Type: 0x2222 (Request)
     Sequence Number: 9
     Connection Number Low: 1
     Task Number: 2
     Connection Number High: 0
     Function Code: 22
     Subfunction Length: 2 bytes
     Subfunction Code: 20
     Directory Handle: 0x01
```

```
     Hop Count: 1
     Packet Type: 17(NCP)
     Network: 00 00 35 59        ---> 00 00 03 00
     Node:    42-45-41-4B-45-52 ---> 02-80-C8-00-00-05
     Socket:  0x0001            ---> 0x4003
 ncp: ================ NetWare Core Protocol ================
     NCP Reply: Get Directory Path
     Reply Type: 0x3333 (Reply)
     Sequence Number: 6
     Connection Number Low: 2
     Task Number: 1
     Connection Number High: 0
     Completion Code: 0 (Success)
     Connection Status: 0x00
     Directory Path: Length: 9
                Value : SYS:LOGIN

Packet Number : 46          9:08:32 PM
Length : 64 bytes
802.3: ================ IEEE 802.3 Datalink Layer ================
     Station: 02-80-C8-00-00-05----> BEAKER
     Length: 42
 ipx: ================ Internetwork Packet Exchange ================
     Checksum: 0xFFFF
     Length: 41
     Hop Count: 0
     Packet Type: 17(NCP)
     Network: 00 00 03 00        ---> 00 00 35 59
     Node:    02-80-C8-00-00-05 ---> 42-45-41-4B-45-52
     Socket:  0x4003            ---> 0x0001
 ncp: ================ NetWare Core Protocol ================
     NCP Request: Deallocate Directory Handle
     Request Type: 0x2222 (Request)
     Sequence Number: 9
     Connection Number Low: 2
     Task Number: 2
     Connection Number High: 0
     Function Code: 22
     Subfunction Length: 2 bytes
     Subfunction Code: 20
     Directory Handle: 0x01

Packet Number : 47          9:08:32 PM
Length : 64 bytes
802.3: ================ IEEE 802.3 Datalink Layer ================
     Station: BEAKER----> PIGGY2
     Length: 42
 ipx: ================ Internetwork Packet Exchange ================
     Checksum: 0xFFFF
     Length: 41
     Hop Count: 1
     Packet Type: 17(NCP)
     Network: 00 00 35 59        ---> 00 00 34 69
     Node:    42-45-41-4B-45-52 ---> 50-49-47-47-59-32
```

```
Packet Number : 31          8:56:11 PM
Length : 64 bytes
802.3: ================ IEEE 802.3 Datalink Layer ================
    Station: PIGGY----> 02-80-C8-00-00-05
    Length: 38
 ipx: ================ Internetwork Packet Exchange ================
    Checksum: 0xFFFF
    Length: 38
    Hop Count:  0
    Packet Type: 17(NCP)
    Network: 00 00 34 69        ---> 00 00 03 00
    Node:    00-50-49-47-47-59 ---> 02-80-C8-00-00-05
    Socket:  NCP               ---> 0x4003
ncp: ================ NetWare Core Protocol ================
    NCP Reply: Deallocate Directory Handle
    Reply Type: 0x3333 (Reply)
    Sequence Number: 9
    Connection Number Low: 1
    Task Number: 1
    Connection Number High: 0
    Completion Code: 0 (Success)
    Connection Status: 0x00
```

```
    Socket:  0x40A9            ---> NCP
ncp: ================ NetWare Core Protocol ================
    NCP Request: Deallocate Directory Handle
    Request Type: 0x2222 (Request)
    Sequence Number: 8
    Connection Number Low: 2
    Task Number: 2
    Connection Number High: 0
    Function Code: 22
    Subfunction Length: 2 bytes
    Subfunction Code: 20
    Directory Handle: 0x01

Packet Number : 48          9:08:32 PM
Length : 64 bytes
802.3: ================ IEEE 802.3 Datalink Layer ================
    Station: PIGGY2----> BEAKER
    Length: 38
 ipx: ================ Internetwork Packet Exchange ================
    Checksum: 0xFFFF
    Length: 38
    Hop Count:  0
    Packet Type: 17(NCP)
    Network: 00 00 34 69        ---> 00 00 35 59
    Node:    50-49-47-47-59-32 ---> 42-45-41-4B-45-52
    Socket:  NCP               ---> 0x40A9
ncp: ================ NetWare Core Protocol ================
    NCP Reply: Deallocate Directory Handle
    Reply Type: 0x3333 (Reply)
    Sequence Number: 8
    Connection Number Low: 2
    Task Number: 1
    Connection Number High: 0
    Completion Code: 0 (Success)
    Connection Status: 0x00

Packet Number : 49          9:08:32 PM
Length : 64 bytes
802.3: ================ IEEE 802.3 Datalink Layer ================
    Station: BEAKER----> 02-80-C8-00-00-05
    Length: 38
 ipx: ================ Internetwork Packet Exchange ================
    Checksum: 0xFFFF
    Length: 38
    Hop Count:  1
    Packet Type: 17(NCP)
    Network: 00 00 35 59        ---> 00 00 03 00
    Node:    42-45-41-4B-45-52 ---> 02-80-C8-00-00-05
    Socket:  0x0001            ---> 0x4003
ncp: ================ NetWare Core Protocol ================
    NCP Reply: Deallocate Directory Handle
    Reply Type: 0x3333 (Reply)
    Sequence Number: 9
    Connection Number Low: 2
```

```
31  Packet Number : 32        8:56:11 PM
    Length : 64 bytes
    802.3: ================ IEEE 802.3 Datalink Layer ================
        Station: 02-80-C8-00-00-05----> PIGGY
        Length: 40
    ipx: =============== Internetwork Packet Exchange ===============
        Checksum: 0xFFFF
        Length: 40
        Hop Count: 0
        Packet Type: 17(NCP)
        Network: 00 00 03 00      ---> 00 00 34 69
        Node:    02-80-C8-00-00-05 ---> 00-50-49-47-47-59
        Socket:  0x4003           ---> NCP
    ncp: ================ NetWare Core Protocol ================
        NCP Request: Get Log Key
        Request Type: 0x2222 (Request)
        Sequence Number: 10
        Connection Number Low: 1
        Task Number: 2
        Connection Number High: 0
        Function Code: 23
        Subfunction Length: 1 bytes
        Subfunction Code: 23

32  Packet Number : 33        8:56:11 PM
```

```
        Task Number: 1
        Connection Number High: 0
        Completion Code: 0 (Success)
        Connection Status: 0x00

    Packet Number : 50        9:08:32 PM
    Length : 64 bytes
    802.3: ================ IEEE 802.3 Datalink Layer ================
        Station: 02-80-C8-00-00-05----> BEAKER
        Length: 40
    ipx: =============== Internetwork Packet Exchange ===============
        Checksum: 0xFFFF
        Length: 40
        Hop Count: 0
        Packet Type: 17(NCP)
        Network: 00 00 03 00      ---> 00 00 35 59
        Node:    02-80-C8-00-00-05 ---> 42-45-41-4B-45-52
        Socket:  0x4003           ---> 0x0001
    ncp: ================ NetWare Core Protocol ================
        NCP Request: Get Log Key
        Request Type: 0x2222 (Request)
        Sequence Number: 10
        Connection Number Low: 2
        Task Number: 2
        Connection Number High: 0
        Function Code: 23
        Subfunction Length: 1 bytes
        Subfunction Code: 23

    Packet Number : 51        9:08:32 PM
    Length : 64 bytes
    802.3: ================ IEEE 802.3 Datalink Layer ================
        Station: BEAKER----> PIGGY2
        Length: 40
    ipx: =============== Internetwork Packet Exchange ===============
        Checksum: 0xFFFF
        Length: 40
        Hop Count: 1
        Packet Type: 17(NCP)
        Network: 00 00 35 59      ---> 00 00 34 69
        Node:    42-45-41-4B-45-52 ---> 50-49-47-47-59-32
        Socket:  0x40A9           ---> NCP
    ncp: ================ NetWare Core Protocol ================
        NCP Request: Get Log Key
        Request Type: 0x2222 (Request)
        Sequence Number: 9
        Connection Number Low: 2
        Task Number: 2
        Connection Number High: 0
        Function Code: 23
        Subfunction Length: 1 bytes
        Subfunction Code: 23

    Packet Number : 52        9:08:32 PM
```

```
Length : 64 bytes
802.3: ================ IEEE 802.3 Datalink Layer ================
    Station: PIGGY----> 02-80-C8-00-00-05
    Length: 46
  ipx: ================ Internetwork Packet Exchange ================
    Checksum: 0xFFFF
    Length: 46
    Hop Count: 0
    Packet Type: 17(NCP)
    Network: 00 00 34 69       ---> 00 00 03 00
    Node:    00-50-49-47-47-59 ---> 02-80-C8-00-00-05
    Socket:  NCP               ---> 0x4003
ncp: ================ NetWare Core Protocol ================
    NCP Reply: Get Log Key
    Reply Type: 0x3333 (Reply)
    Sequence Number: 10
    Connection Number Low: 1
    Task Number: 1
    Connection Number High: 0
    Completion Code: 0 (Success)
    Connection Status: 0x00
    Key: 0x82 0x0A 0x57 0x14 0xAE 0x28 0xAF 0x50

33 Packet Number : 34        8:56:11 PM
Length : 66 bytes
802.3: ================ IEEE 802.3 Datalink Layer ================
    Station: 02-80-C8-00-00-05----> PIGGY
    Length: 48
  ipx: ================ Internetwork Packet Exchange ================
    Checksum: 0xFFFF
```

```
Length : 64 bytes
802.3: ================ IEEE 802.3 Datalink Layer ================
    Station: PIGGY2----> BEAKER
    Length: 46
  ipx: ================ Internetwork Packet Exchange ================
    Checksum: 0xFFFF
    Length: 46
    Hop Count: 0
    Packet Type: 17(NCP)
    Network: 00 00 34 69       ---> 00 00 35 59
    Node:    50-49-47-47-59-32 ---> 42-45-41-4B-45-52
    Socket:  NCP               ---> 0x40A9
ncp: ================ NetWare Core Protocol ================
    NCP Reply: Get Log Key
    Reply Type: 0x3333 (Reply)
    Sequence Number: 9
    Connection Number Low: 2
    Task Number: 1
    Connection Number High: 0
    Completion Code: 0 (Success)
    Connection Status: 0x00
    Key: 0xDB 0x94 0xB6 0x28 0x6C 0x50 0x2B 0xED

Packet Number : 53        9:08:32 PM
Length : 64 bytes
802.3: ================ IEEE 802.3 Datalink Layer ================
    Station: BEAKER----> 02-80-C8-00-00-05
    Length: 46
  ipx: ================ Internetwork Packet Exchange ================
    Checksum: 0xFFFF
    Length: 46
    Hop Count: 1
    Packet Type: 17(NCP)
    Network: 00 00 35 59       ---> 00 00 03 00
    Node:    42-45-41-4B-45-52 ---> 02-80-C8-00-00-05
    Socket:  0x0001            ---> 0x4003
ncp: ================ NetWare Core Protocol ================
    NCP Reply: Get Log Key
    Reply Type: 0x3333 (Reply)
    Sequence Number: 10
    Connection Number Low: 2
    Task Number: 1
    Connection Number High: 0
    Completion Code: 0 (Success)
    Connection Status: 0x00
    Key: 0xDB 0x94 0xB6 0x28 0x6C 0x50 0x2B 0xED

Packet Number : 54        9:08:32 PM
Length : 66 bytes
802.3: ================ IEEE 802.3 Datalink Layer ================
    Station: 02-80-C8-00-00-05----> BEAKER
    Length: 48
  ipx: ================ Internetwork Packet Exchange ================
    Checksum: 0xFFFF
```

```
      Length: 48
      Hop Count: 0
      Packet Type: 17(NCP)
      Network: 00 00 03 00      ---> 00 00 34 69
      Node:   02-80-C8-00-00-05 ---> 00-50-49-47-47-59
      Socket: 0x4003          ---> NCP
   ncp: ============== NetWare Core Protocol ==============
      NCP Request: Get Bindery Object ID
      Request Type: 0x2222 (Request)
      Sequence Number: 11
      Connection Number Low: 1
      Task Number: 2
      Connection Number High: 0
      Function Code: 23
      Subfunction Length: 9 bytes
      Subfunction Code: 53
      Object Type: 1 (User)
      Object Name: Length: 5
               Value : admin

34 Packet Number : 35        8:56:11 PM
   Length : 110 bytes
   802.3: ============== IEEE 802.3 Datalink Layer ==============
        Station: PIGGY----> 02-80-C8-00-00-05
        Length: 92
   ipx: ============== Internetwork Packet Exchange ==============
        Checksum: 0xFFFF

      Length: 48
      Hop Count: 0
      Packet Type: 17(NCP)
      Network: 00 00 03 00      ---> 00 00 35 59
      Node:   02-80-C8-00-00-05 ---> 42-45-41-4B-45-52
      Socket: 0x4003          ---> 0x0001
   ncp: ============== NetWare Core Protocol ==============
      NCP Request: Get Bindery Object ID
      Request Type: 0x2222 (Request)
      Sequence Number: 11
      Connection Number Low: 2
      Task Number: 2
      Connection Number High: 0
      Function Code: 23
      Subfunction Length: 9 bytes
      Subfunction Code: 53
      Object Type: 1 (User)
      Object Name: Length: 5
               Value : admin

Packet Number : 55        9:08:32 PM
Length : 66 bytes
802.3: ============== IEEE 802.3 Datalink Layer ==============
     Station: BEAKER----> PIGGY2
     Length: 48
 ipx: ============== Internetwork Packet Exchange ==============
     Checksum: 0xFFFF
     Length: 48
     Hop Count: 1
     Packet Type: 17(NCP)
     Network: 00 00 35 59      ---> 00 00 34 69
     Node:   42-45-41-4B-45-52 ---> 50-49-47-47-59-32
     Socket: 0x40A9          ---> NCP
 ncp: ============== NetWare Core Protocol ==============
     NCP Request: Get Bindery Object ID
     Request Type: 0x2222 (Request)
     Sequence Number: 10
     Connection Number Low: 2
     Task Number: 2
     Connection Number High: 0
     Function Code: 23
     Subfunction Length: 9 bytes
     Subfunction Code: 53
     Object Type: 1 (User)
     Object Name: Length: 5
              Value : admin

Packet Number : 56        9:08:32 PM
Length : 110 bytes
802.3: ============== IEEE 802.3 Datalink Layer ==============
     Station: PIGGY2----> BEAKER
     Length: 92
 ipx: ============== Internetwork Packet Exchange ==============
     Checksum: 0xFFFF
```

```
    Length: 92
    Hop Count: 0
    Packet Type: 17(NCP)
    Network: 00 00 34 69        ---> 00 00 03 00
    Node:   00-50-49-47-47-59 ---> 02-80-C8-00-00-05
    Socket: NCP                ---> 0x4003
ncp: ================ NetWare Core Protocol ================
    NCP Reply: Get Bindery Object ID
    Reply Type: 0x3333 (Reply)
    Sequence Number: 11
    Connection Number Low: 1
    Task Number: 1
    Connection Number High: 0
    Completion Code: 0 (Success)
    Connection Status: 0x00
    Object ID: 0x9E000001
    Object Type: 1 (User)
    Object Name: ADMIN

Packet Number : 36        8:56:11 PM
Length : 74 bytes
802.3: ================ IEEE 802.3 Datalink Layer ================
    Station: 02-80-C8-00-00-05---> PIGGY
    Length: 56
ipx: ================ Internetwork Packet Exchange ================
    Checksum: 0xFFFF
    Length: 56
    Hop Count: 0
```

```
    Length: 92
    Hop Count: 0
    Packet Type: 17(NCP)
    Network: 00 00 34 69        ---> 00 00 35 59
    Node:   50-49-47-47-59-32 ---> 42-45-41-4B-45-52
    Socket: NCP                ---> 0x40A9
ncp: ================ NetWare Core Protocol ================
    NCP Reply: Get Bindery Object ID
    Reply Type: 0x3333 (Reply)
    Sequence Number: 10
    Connection Number Low: 2
    Task Number: 1
    Connection Number High: 0
    Completion Code: 0 (Success)
    Connection Status: 0x00
    Object ID: 0x9E000001
    Object Type: 1 (User)
    Object Name: ADMIN

Packet Number : 57        9:08:32 PM
Length : 110 bytes
802.3: ================ IEEE 802.3 Datalink Layer ================
    Station: BEAKER---> 02-80-C8-00-00-05
    Length: 92
ipx: ================ Internetwork Packet Exchange ================
    Checksum: 0xFFFF
    Length: 92
    Hop Count: 1
    Packet Type: 17(NCP)
    Network: 00 00 35 59        ---> 00 00 03 00
    Node:   42-45-41-4B-45-52 ---> 02-80-C8-00-00-05
    Socket: 0x0001             ---> 0x4003
ncp: ================ NetWare Core Protocol ================
    NCP Reply: Get Bindery Object ID
    Reply Type: 0x3333 (Reply)
    Sequence Number: 11
    Connection Number Low: 2
    Task Number: 1
    Connection Number High: 0
    Completion Code: 0 (Success)
    Connection Status: 0x00
    Object ID: 0x9E000001
    Object Type: 1 (User)
    Object Name: ADMIN

Packet Number : 58        9:08:32 PM
Length : 74 bytes
802.3: ================ IEEE 802.3 Datalink Layer ================
    Station: 02-80-C8-00-00-05----> BEAKER
    Length: 56
ipx: ================ Internetwork Packet Exchange ================
    Checksum: 0xFFFF
    Length: 56
    Hop Count: 0
```

```
   Packet Type: 17(NCP)
   Network: 00 00 03 00       ---> 00 00 34 69
   Node:    02-80-C8-00-00-05 ---> 00-50-49-47-47-59
   Socket:  0x4003            ---> NCP
 ncp: ============== NetWare Core Protocol ==============
   NCP Request: Keyed Login
   Request Type: 0x2222 (Request)
   Sequence Number: 12
   Connection Number Low: 1
   Task Number: 2
   Connection Number High: 0
   Function Code: 23
   Subfunction Length: 17 bytes
   Subfunction Code: 24
   Key: 0xE1 0x6B 0xF0 0xDD 0x15 0x44 0xD1 0xAF
   Object Type: 1 (User)
   Object Name: Length: 5
          Value : admin

36 Packet Number : 37       8:56:11 PM
Length : 64 bytes
802.3: ============== IEEE 802.3 Datalink Layer ==============
   Station: PIGGY----> 02-80-C8-00-00-05
   Length: 38
 ipx: ============== Internetwork Packet Exchange ==============
   Checksum: 0xFFFF
```

```
   Packet Type: 17(NCP)
   Network: 00 00 03 00       ---> 00 00 35 59
   Node:    02-80-C8-00-00-05 ---> 42-45-41-4B-45-52
   Socket:  0x4003            ---> 0x0001
 ncp: ============== NetWare Core Protocol ==============
   NCP Request: Keyed Login
   Request Type: 0x2222 (Request)
   Sequence Number: 12
   Connection Number Low: 2
   Task Number: 2
   Connection Number High: 0
   Function Code: 23
   Subfunction Length: 17 bytes
   Subfunction Code: 24
   Key: 0xB3 0xA8 0xF6 0x58 0xB1 0x79 0x59 0x66
   Object Type: 1 (User)
   Object Name: Length: 5
          Value : admin

Packet Number : 59       9:08:32 PM
Length : 74 bytes
802.3: ============== IEEE 802.3 Datalink Layer ==============
   Station: BEAKER----> PIGGY2
   Length: 56
 ipx: ============== Internetwork Packet Exchange ==============
   Checksum: 0xFFFF
   Length: 56
   Hop Count: 1
   Packet Type: 17(NCP)
   Network: 00 00 35 59       ---> 00 00 34 69
   Node:    42-45-41-4B-45-52 ---> 50-49-47-47-59-32
   Socket:  0x40A9            ---> NCP
 ncp: ============== NetWare Core Protocol ==============
   NCP Request: Keyed Login
   Request Type: 0x2222 (Request)
   Sequence Number: 11
   Connection Number Low: 2
   Task Number: 2
   Connection Number High: 0
   Function Code: 23
   Subfunction Length: 17 bytes
   Subfunction Code: 24
   Key: 0xB3 0xA8 0xF6 0x58 0xB1 0x79 0x59 0x66
   Object Type: 1 (User)
   Object Name: Length: 5
          Value : admin

Packet Number : 60       9:08:32 PM
Length : 64 bytes
802.3: ============== IEEE 802.3 Datalink Layer ==============
   Station: PIGGY2----> BEAKER
   Length: 38
 ipx: ============== Internetwork Packet Exchange ==============
   Checksum: 0xFFFF
```

```
    Length: 38
    Hop Count: 0
    Packet Type: 17(NCP)
    Network: 00 00 34 69      ---> 00 00 03 00
    Node:    00-50-49-47-47-59 ---> 02-80-C8-00-00-05
    Socket:  NCP              ---> 0x4003
ncp: ================ NetWare Core Protocol ================
    NCP Reply: Keyed Login
    Reply Type: 0x3333 (Reply)
    Sequence Number: 12
    Connection Number Low: 1
    Task Number: 1
    Connection Number High: 0
    Completion Code: 0 (Success)
    Connection Status: 0x00
```

37

```
Packet Number : 38      8:56:11 PM
Length : 64 bytes
802.3: ================ IEEE 802.3 Datalink Layer ================
    Station: 02-80-C8-00-00-05----> PIGGY
    Length: 44
ipx: ================ Internetwork Packet Exchange ================
    Checksum: 0xFFFF
    Length: 44
    Hop Count: 0
    Packet Type: 17(NCP)
    Network: 00 00 03 00      ---> 00 00 34 69
    Node:    02-80-C8-00-00-05 ---> 00-50-49-47-47-59
    Socket:  0x4003           ---> NCP
ncp: ================ NetWare Core Protocol ================
    NCP Request: Get Station Logged Info
```

```
    Length: 38
    Hop Count: 0
    Packet Type: 17(NCP)
    Network: 00 00 34 69      ---> 00 00 35 59
    Node:    50-49-47-47-59-32 ---> 42-45-41-4B-45-52
    Socket:  NCP              ---> 0x40A9
ncp: ================ NetWare Core Protocol ================
    NCP Reply: Keyed Login
    Reply Type: 0x3333 (Reply)
    Sequence Number: 11
    Connection Number Low: 2
    Task Number: 1
    Connection Number High: 0
    Completion Code: 0 (Success)
    Connection Status: 0x00

Packet Number : 61      9:08:32 PM
Length : 64 bytes
802.3: ================ IEEE 802.3 Datalink Layer ================
    Station: BEAKER----> 02-80-C8-00-00-05
    Length: 38
ipx: ================ Internetwork Packet Exchange ================
    Checksum: 0xFFFF
    Length: 38
    Hop Count: 1
    Packet Type: 17(NCP)
    Network: 00 00 35 59      ---> 00 00 03 00
    Node:    42-45-41-4B-45-52 ---> 02-80-C8-00-00-05
    Socket:  0x0001           ---> 0x4003
ncp: ================ NetWare Core Protocol ================
    NCP Reply: Keyed Login
    Reply Type: 0x3333 (Reply)
    Sequence Number: 12
    Connection Number Low: 2
    Task Number: 1
    Connection Number High: 0
    Completion Code: 0 (Success)
    Connection Status: 0x00

Packet Number : 62      9:08:32 PM
Length : 64 bytes
802.3: ================ IEEE 802.3 Datalink Layer ================
    Station: 02-80-C8-00-00-05----> BEAKER
    Length: 44
ipx: ================ Internetwork Packet Exchange ================
    Checksum: 0xFFFF
    Length: 44
    Hop Count: 0
    Packet Type: 17(NCP)
    Network: 00 00 03 00      ---> 00 00 35 59
    Node:    02-80-C8-00-00-05 ---> 42-45-41-4B-45-52
    Socket:  0x4003           ---> 0x0001
ncp: ================ NetWare Core Protocol ================
    NCP Request: Get Station Logged Info
```

Request Type: 0x2222 (Request)
Sequence Number: 13
Connection Number Low: 1
Task Number: 2
Connection Number High: 0
Function Code: 23
Subfunction Struct Length: 1280 bytes
Subfunction Code: 28
Target Connection: 1

38 Packet Number : 39 8:56:11 PM
Length : 118 bytes
802.3: ===================== IEEE 802.3 Datalink Layer =====================
Station: PIGGY----> 02-80-C8-00-00-05
Length: 100
ipx: ===================== Internetwork Packet Exchange =====================
Checksum: 0xFFFF
Length: 100
Hop Count: 0
Packet Type: 17(NCP)
Network: 00 00 34 69 ---> 00 00 03 00
Node: 00-50-49-47-47-59 ---> 02-80-C8-00-00-05
Socket: NCP ---> 0x4003
ncp: ===================== NetWare Core Protocol =====================
NCP Reply: Get Station Logged Info
Reply Type: 0x3333 (Reply)
Sequence Number: 13
Connection Number Low: 1
Task Number: 1

Request Type: 0x2222 (Request)
Sequence Number: 13
Connection Number Low: 2
Task Number: 2
Connection Number High: 0
Function Code: 23
Subfunction Struct Length: 1280 bytes
Subfunction Code: 28
Target Connection: 2

Packet Number : 63 9:08:32 PM
Length : 64 bytes
802.3: ===================== IEEE 802.3 Datalink Layer =====================
Station: BEAKER----> PIGGY2
Length: 44
ipx: ===================== Internetwork Packet Exchange =====================
Checksum: 0xFFFF
Length: 44
Hop Count: 1
Packet Type: 17(NCP)
Network: 00 00 35 59 ---> 00 00 34 69
Node: 42-45-41-4B-45-52 ---> 50-49-47-47-59-32
Socket: 0x40A9 ---> NCP
ncp: ===================== NetWare Core Protocol =====================
NCP Request: Get Station Logged Info
Request Type: 0x2222 (Request)
Sequence Number: 12
Connection Number Low: 2
Task Number: 2
Connection Number High: 0
Function Code: 23
Subfunction Struct Length: 1280 bytes
Subfunction Code: 28
Target Connection: 2

Packet Number : 64 9:08:32 PM
Length : 118 bytes
802.3: ===================== IEEE 802.3 Datalink Layer =====================
Station: PIGGY2----> BEAKER
Length: 100
ipx: ===================== Internetwork Packet Exchange =====================
Checksum: 0xFFFF
Length: 100
Hop Count: 0
Packet Type: 17(NCP)
Network: 00 00 34 69 ---> 00 00 35 59
Node: 50-49-47-47-59-32 ---> 42-45-41-4B-45-52
Socket: NCP ---> 0x40A9
ncp: ===================== NetWare Core Protocol =====================
NCP Reply: Get Station Logged Info
Reply Type: 0x3333 (Reply)
Sequence Number: 12
Connection Number Low: 2
Task Number: 1

```
Connection Number High: 0
Completion Code: 0 (Success)
Connection Status: 0x00
User ID: 0x0100009E
User Type: 1 (User)
User Name: admin
Login Time: Thursday, August 25, 1994  1:06:59 PM
```

39

```
Packet Number : 40          8:56:11 PM
Length : 64 bytes
802.3: ============ IEEE 802.3 Datalink Layer ============
     Station: 02-80-C8-00-00-05----> PIGGY
     Length: 44
  ipx: ============ Internetwork Packet Exchange ============
     Checksum: 0xFFFF
     Length: 44
     Hop Count:  0
     Packet Type: 17(NCP)
     Network: 00 00 03 00        ---> 00 00 34 69
     Node:   02-80-C8-00-00-05 ---> 00-50-49-47-47-59
     Socket:  0x4003            ---> NCP
  ncp: ============ NetWare Core Protocol ============
     NCP Request: Get Internet Address
     Request Type: 0x2222 (Request)
     Sequence Number: 14
     Connection Number Low: 1
     Task Number: 2
```

```
     Connection Number High: 0
     Completion Code: 0 (Success)
     Connection Status: 0x00
     User ID: 0x0100009E
     User Type: 1 (User)
     User Name: admin
     Login Time: Thursday, August 25, 1994  1:19:20 PM

Packet Number : 65          9:08:32 PM
Length : 118 bytes
802.3: ============ IEEE 802.3 Datalink Layer ============
     Station: BEAKER----> 02-80-C8-00-00-05
     Length: 100
  ipx: ============ Internetwork Packet Exchange ============
     Checksum: 0xFFFF
     Length: 100
     Hop Count:  1
     Packet Type: 17(NCP)
     Network: 00 00 35 59        ---> 00 00 03 00
     Node:   42-45-41-4B-45-52 ---> 02-80-C8-00-00-05
     Socket:  0x0001            ---> 0x4003
  ncp: ============ NetWare Core Protocol ============
     NCP Reply: Get Station Logged Info
     Reply Type: 0x3333 (Reply)
     Sequence Number: 13
     Connection Number Low: 2
     Task Number: 1
     Connection Number High: 0
     Completion Code: 0 (Success)
     Connection Status: 0x00
     User ID: 0x0100009E
     User Type: 1 (User)
     User Name: admin
     Login Time: Thursday, August 25, 1994  1:19:20 PM

Packet Number : 66          9:08:32 PM
Length : 64 bytes
802.3: ============ IEEE 802.3 Datalink Layer ============
     Station: 02-80-C8-00-00-05---> BEAKER
     Length: 44
  ipx: ============ Internetwork Packet Exchange ============
     Checksum: 0xFFFF
     Length: 44
     Hop Count:  0
     Packet Type: 17(NCP)
     Network: 00 00 03 00        ---> 00 00 35 59
     Node:   02-80-C8-00-00-05 ---> 42-45-41-4B-45-52
     Socket:  0x4003            ---> 0x0001
  ncp: ============ NetWare Core Protocol ============
     NCP Request: Get Internet Address
     Request Type: 0x2222 (Request)
     Sequence Number: 14
     Connection Number Low: 2
     Task Number: 2
```

```
        Connection Number High: 0
        Function Code: 23
        Subfunction Struct Length: 1280 bytes
        Subfunction Code: 26
        Target Connection: 1

Packet Number : 41          8:56:11 PM
Length : 70 bytes
802.3: ============ IEEE 802.3 Datalink Layer ============
        Station: PIGGY----> 02-80-C8-00-00-05
        Length: 52
  ipx: ============ Internetwork Packet Exchange ============
        Checksum: 0xFFFF
        Length: 51
        Hop Count:  0
        Packet Type: 17(NCP)
        Network: 00 00 34 69        ---> 00 00 03 00
        Node:    00-50-49-47-47-59 ---> 02-80-C8-00-00-05
        Socket:  NCP              ---> 0x4003
  ncp: ============ NetWare Core Protocol ============
        NCP Reply: Get Internet Address
        Reply Type: 0x3333 (Reply)
        Sequence Number: 14
        Connection Number Low: 1
        Task Number: 1
        Connection Number High: 0
        Completion Code: 0 (Success)
        Connection Status: 0x00
        Network Address: 0x00 0x00 0x03 0x00
```

```
        Connection Number High: 0
        Function Code: 23
        Subfunction Struct Length: 1280 bytes
        Subfunction Code: 26
        Target Connection: 2

Packet Number : 67          9:08:32 PM
Length : 64 bytes
802.3: ============ IEEE 802.3 Datalink Layer ============
        Station: BEAKER----> PIGGY2
        Length: 44
  ipx: ============ Internetwork Packet Exchange ============
        Checksum: 0xFFFF
        Length: 44
        Hop Count:  1
        Packet Type: 17(NCP)
        Network: 00 00 35 59        ---> 00 00 34 69
        Node:    42-45-41-4B-45-52 ---> 50-49-47-47-59-32
        Socket:  0x40A9           ---> NCP
  ncp: ============ NetWare Core Protocol ============
        NCP Request: Get Internet Address
        Request Type: 0x2222 (Request)
        Sequence Number: 13
        Connection Number Low: 2
        Task Number: 2
        Connection Number High: 0
        Function Code: 23
        Subfunction Struct Length: 1280 bytes
        Subfunction Code: 26
        Target Connection: 2

Packet Number : 68          9:08:32 PM
Length : 70 bytes
802.3: ============ IEEE 802.3 Datalink Layer ============
        Station: PIGGY2----> BEAKER
        Length: 52
  ipx: ============ Internetwork Packet Exchange ============
        Checksum: 0xFFFF
        Length: 51
        Hop Count:  0
        Packet Type: 17(NCP)
        Network: 00 00 34 69        ---> 00 00 35 59
        Node:    50-49-47-47-59-32 ---> 42-45-41-4B-45-52
        Socket:  NCP              ---> 0x40A9
  ncp: ============ NetWare Core Protocol ============
        NCP Reply: Get Internet Address
        Reply Type: 0x3333 (Reply)
        Sequence Number: 13
        Connection Number Low: 2
        Task Number: 1
        Connection Number High: 0
        Completion Code: 0 (Success)
        Connection Status: 0x00
        Network Address: 0x00 0x00 0x34 0x69
```

```
    Network Node Address: 0x02 0x80 0xC8 0x00 0x00 0x05
    Network Socket: 832
    Connection Type: 2 (NCP)

41  Packet Number : 42        8:56:11 PM
    Length : 82 bytes
    802.3: ============ IEEE 802.3 Datalink Layer ============
        Station: 02-80-C8-00-00-05----> PIGGY
        Length: 64
    ipx: ============ Internetwork Packet Exchange ============
        Checksum: 0xFFFF
        Length: 64
        Hop Count: 0
        Packet Type: 17(NCP)
        Network: 00 00 03 00      ---> 00 00 34 69
        Node:   02-80-C8-00-00-05 ---> 00-50-49-47-47-59
        Socket: 0x4003            ---> NCP
    ncp: ============ NetWare Core Protocol ============
        NCP Request: Read Property Value
        Request Type: 0x2222 (Request)
        Sequence Number: 15
        Connection Number Low: 1
        Task Number: 2
        Connection Number High: 0
        Function Code: 23
        Subfunction Length: 25 bytes
        Subfunction Code: 61

        Network Node Address: 0x50 0x49 0x47 0x47 0x59 0x32
        Network Socket: 43328
        Connection Type: 2 (NCP)

    Packet Number : 69        9:08:32 PM
    Length : 70 bytes
    802.3: ============ IEEE 802.3 Datalink Layer ============
        Station: BEAKER---> 02-80-C8-00-00-05
        Length: 52
    ipx: ============ Internetwork Packet Exchange ============
        Checksum: 0xFFFF
        Length: 51
        Hop Count: 1
        Packet Type: 17(NCP)
        Network: 00 00 35 59      ---> 00 00 03 00
        Node:   42-45-41-4B-45-52 ---> 02-80-C8-00-00-05
        Socket: 0x0001            ---> 0x4003
    ncp: ============ NetWare Core Protocol ============
        NCP Reply: Get Internet Address
        Reply Type: 0x3333 (Reply)
        Sequence Number: 14
        Connection Number Low: 2
        Task Number: 1
        Connection Number High: 0
        Completion Code: 0 (Success)
        Connection Status: 0x00
        Network Address: 0x00 0x00 0x35 0x59
        Network Node Address: 0x42 0x45 0x41 0x4B 0x45 0x52
        Network Socket: 43328
        Connection Type: 2 (NCP)

    Packet Number : 70        9:08:32 PM
    Length : 82 bytes
    802.3: ============ IEEE 802.3 Datalink Layer ============
        Station: 02-80-C8-00-00-05----> BEAKER
        Length: 64
    ipx: ============ Internetwork Packet Exchange ============
        Checksum: 0xFFFF
        Length: 64
        Hop Count: 0
        Packet Type: 17(NCP)
        Network: 00 00 03 00      ---> 00 00 35 59
        Node:   02-80-C8-00-00-05 ---> 42-45-41-4B-45-52
        Socket: 0x4003            ---> 0x0001
    ncp: ============ NetWare Core Protocol ============
        NCP Request: Read Property Value
        Request Type: 0x2222 (Request)
        Sequence Number: 15
        Connection Number Low: 2
        Task Number: 2
        Connection Number High: 0
        Function Code: 23
        Subfunction Length: 25 bytes
        Subfunction Code: 61
```

```
Object Type: 1 (User)
Object Name: Length: 5
        Value : admin
Segment Number: 1
Property Name: Length: 14
        Value : IDENTIFICATION
```

42

```
Packet Number : 43        8:56:11 PM
Length : 64 bytes
802.3: ============ IEEE 802.3 Datalink Layer ============
    Station: PIGGY----> 02-80-C8-00-00-05
    Length: 38
ipx: ============ Internetwork Packet Exchange ============
    Checksum: 0xFFFF
    Length: 38
    Hop Count: 0
    Packet Type: 17(NCP)
    Network: 00 00 34 69       ---> 00 00 03 00
    Node:    00-50-49-47-47-59 ---> 02-80-C8-00-00-05
    Socket:  NCP               ---> 0x4003
ncp: ============ NetWare Core Protocol ============
    NCP Reply: Read Property Value
    Reply Type: 0x3333 (Reply)
    Sequence Number: 15
```

```
Object Type: 1 (User)
Object Name: Length: 5
        Value : admin
Segment Number: 1
Property Name: Length: 14
        Value : IDENTIFICATION

Packet Number : 71        9:08:32 PM
Length : 82 bytes
802.3: ============ IEEE 802.3 Datalink Layer ============
    Station: BEAKER----> PIGGY2
    Length: 64
ipx: ============ Internetwork Packet Exchange ============
    Checksum: 0xFFFF
    Length: 64
    Hop Count: 1
    Packet Type: 17(NCP)
    Network: 00 00 35 59       ---> 00 00 34 69
    Node:    42-45-41-4B-45-52 ---> 50-49-47-47-59-32
    Socket:  0x40A9            ---> NCP
ncp: ============ NetWare Core Protocol ============
    NCP Request: Read Property Value
    Request Type: 0x2222 (Request)
    Sequence Number: 14
    Connection Number Low: 2
    Task Number: 2
    Connection Number High: 0
    Function Code: 23
    Subfunction Length: 25 bytes
    Subfunction Code: 61
    Object Type: 1 (User)
    Object Name: Length: 5
            Value : admin
    Segment Number: 1
    Property Name: Length: 14
            Value : IDENTIFICATION

Packet Number : 72        9:08:32 PM
Length : 64 bytes
802.3: ============ IEEE 802.3 Datalink Layer ============
    Station: PIGGY2----> BEAKER
    Length: 38
ipx: ============ Internetwork Packet Exchange ============
    Checksum: 0xFFFF
    Length: 38
    Hop Count: 0
    Packet Type: 17(NCP)
    Network: 00 00 34 69       ---> 00 00 35 59
    Node:    50-49-47-47-59-32 ---> 42-45-41-4B-45-52
    Socket:  NCP               ---> 0x40A9
ncp: ============ NetWare Core Protocol ============
    NCP Reply: Read Property Value
    Reply Type: 0x3333 (Reply)
    Sequence Number: 14
```

```
Connection Number Low: 1
Task Number: 1
Connection Number High: 0
Completion Code: 251 (No Such Property)
Connection Status: 0x00

43
Packet Number : 44        8:56:11 PM
Length : 84 bytes
802.3: ================ IEEE 802.3 Datalink Layer ================
    Station: 02-80-C8-00-00-05----> PIGGY
    Length: 66
 ipx: ================ Internetwork Packet Exchange ================
    Checksum: 0xFFFF
    Length: 65
    Hop Count:  0
    Packet Type: 17(NCP)
    Network: 00 00 03 00       ---> 00 00 34 69
    Node:    02-80-C8-00-00-05 ---> 00-50-49-47-47-59
    Socket:  0x4003            ---> NCP
 ncp: ================ NetWare Core Protocol ================
    NCP Request: Search for File
    Request Type: 0x2222 (Request)
    Sequence Number: 16
    Connection Number Low: 1
    Task Number: 2
    Connection Number High: 0
    Function Code: 64
    Last Search Index: 65535
    Directory Handle: 0x00
    Search Attributes: 0x06 (Normal, System, Hidden Files)
    File Name: Length: 23

    Connection Number Low: 2
    Task Number: 1
    Connection Number High: 0
    Completion Code: 251 (No Such Property)
    Connection Status: 0x00

Packet Number : 73        9:08:32 PM
Length : 64 bytes
802.3: ================ IEEE 802.3 Datalink Layer ================
    Station: BEAKER----> 02-80-C8-00-00-05
    Length: 38
 ipx: ================ Internetwork Packet Exchange ================
    Checksum: 0xFFFF
    Length: 38
    Hop Count:  1
    Packet Type: 17(NCP)
    Network: 00 00 35 59       ---> 00 00 03 00
    Node:    42-45-41-4B-45-52 ---> 02-80-C8-00-00-05
    Socket:  0x0001            ---> 0x4003
 ncp: ================ NetWare Core Protocol ================
    NCP Reply: Read Property Value
    Reply Type: 0x3333 (Reply)
    Sequence Number: 15
    Connection Number Low: 2
    Task Number: 1
    Connection Number High: 0
    Completion Code: 251 (No Such Property)
    Connection Status: 0x00

Packet Number : 74        9:08:32 PM
Length : 84 bytes
802.3: ================ IEEE 802.3 Datalink Layer ================
    Station: 02-80-C8-00-00-05----> BEAKER
    Length: 66
 ipx: ================ Internetwork Packet Exchange ================
    Checksum: 0xFFFF
    Length: 65
    Hop Count:  0
    Packet Type: 17(NCP)
    Network: 00 00 03 00       ---> 00 00 35 59
    Node:    02-80-C8-00-00-05 ---> 42-45-41-4B-45-52
    Socket:  0x4003            ---> 0x0001
 ncp: ================ NetWare Core Protocol ================
    NCP Request: Search for File
    Request Type: 0x2222 (Request)
    Sequence Number: 16
    Connection Number Low: 2
    Task Number: 2
    Connection Number High: 0
    Function Code: 64
    Last Search Index: 65535
    Directory Handle: 0x00
    Search Attributes: 0x06 (Normal, System, Hidden Files)
    File Name: Length: 23
```

```
Value : SYS:\PUBLIC\NET$LOG.DAT

Value : SYS:\PUBLIC\NET$LOG.DAT

Packet Number : 75        9:08:32 PM
Length : 100 bytes
802.3: ================ IEEE 802.3 Datalink Layer ================
      Station: BEAKER----> PIGGY2
      Length: 82
 ipx: ================ Internetwork Packet Exchange ================
      Checksum: 0xFFFF
      Length: 82
      Hop Count: 1
      Packet Type: 17(NCP)
      Network: 00 00 35 59      ---> 00 00 34 69
      Node:   42-45-41-4B-45-52 ---> 50-49-47-47-59-32
      Socket: 0x40A9            ---> NCP
 ncp: ================ NetWare Core Protocol ================
      NCP Request: Search for File
      Request Type: 0x2222 (Request)
      Sequence Number: 15
      Connection Number Low: 2
      Task Number: 2
      Connection Number High: 0
      Function Code: 64
      Last Search Index: 65535
      Directory Handle: 0x00
      Search Attributes: 0x06 (Normal, System, Hidden Files)
      File Name: Length: 40
           Value : SYS:\IS\EFS\PIGGY\SYS\PUBLIC\NET$LOG.DAT

Packet Number : 76        9:08:32 PM
Length : 84 bytes
802.3: ================ IEEE 802.3 Datalink Layer ================
      Station: 02-80-C8-00-00-05----> BEAKER
      Length: 66
 ipx: ================ Internetwork Packet Exchange ================
      Checksum: 0xFFFF
      Length: 65
      Hop Count: 0
      Packet Type: 17(NCP)
      Network: 00 00 03 00      ---> 00 00 35 59
      Node:   02-80-C8-00-00-05 ---> 42-45-41-4B-45-52
      Socket: 0x4003            ---> 0x0001
 ncp: ================ NetWare Core Protocol ================
      NCP Request: Search for File
      Request Type: 0x2222 (Request)
      Sequence Number: 16
      Connection Number Low: 2
      Task Number: 2
      Connection Number High: 0
      Function Code: 64
      Last Search Index: 65535
      Directory Handle: 0x00
      Search Attributes: 0x06 (Normal, System, Hidden Files)
      File Name: Length: 23
```

```
Value : SYS:\PUBLIC\NET$LOG.DAT

Packet Number : 77        9:08:32 PM
Length : 100 bytes
802.3: ============ IEEE 802.3 Datalink Layer ============
     Station: BEAKER----> PIGGY2
     Length: 82
 ipx: ============ Internetwork Packet Exchange ============
     Checksum: 0xFFFF
     Length: 82
     Hop Count: 1
     Packet Type: 17(NCP)
     Network: 00 00 35 59      ---> 00 00 34 69
     Node:   42-45-41-4B-45-52 ---> 50-49-47-47-59-32
     Socket: 0x40A9            ---> NCP
 ncp: ============ NetWare Core Protocol ============
     NCP Request: Search for File
     Request Type: 0x2222 (Request)
     Sequence Number: 15
     Connection Number Low: 2
     Task Number: 2
     Connection Number High: 0
     Function Code: 64
     Last Search Index: 65535
     Directory Handle: 0x00
     Search Attributes: 0x06 (Normal, System, Hidden Files)
     File Name: Length: 40
             Value : SYS:\IS\EFS\PIGGY\SYS\PUBLIC\NET$LOG.DAT

Packet Number : 78        9:08:32 PM
Length : 64 bytes
802.3: ============ IEEE 802.3 Datalink Layer ============
     Station: PIGGY2---> BEAKER
     Length: 38
 ipx: ============ Internetwork Packet Exchange ============
     Checksum: 0xFFFF
     Length: 38
     Hop Count: 0
     Packet Type: 17(NCP)
     Network: 00 00 34 69      ---> 00 00 35 59
     Node:   50-49-47-47-59-32 ---> 42-45-41-4B-45-52
     Socket: NCP               ---> 0x40A9
 ncp: ============ NetWare Core Protocol ============
     NCP Message: Request Being Processed
     Reply Type: 0x9999 (Request Being Processed)
     Connection Number Low: 2
     Task Number: 2
     Connection Number High: 0

Packet Number : 79        9:08:32 PM
Length : 64 bytes
802.3: ============ IEEE 802.3 Datalink Layer ============
     Station: BEAKER----> 02-80-C8-00-00-05
     Length: 38
```

```
44  Packet Number : 45        8:56:11 PM
    Length : 64 bytes
    802.3: ================ IEEE 802.3 Datalink Layer ================
         Station: PIGGY----> 02-80-C8-00-00-05
         Length: 38
     ipx: ================ Internetwork Packet Exchange ================
         Checksum: 0xFFFF
         Length: 38
         Hop Count: 0
         Packet Type: 17(NCP)
         Network: 00 00 34 69       ---> 00 00 03 00
         Node:   00-50-49-47-47-59 ---> 02-80-C8-00-00-05
         Socket: NCP              ---> 0x4003
     ncp: ================ NetWare Core Protocol ================
         NCP Reply: Search for File
         Reply Type: 0x3333 (Reply)
         Sequence Number: 16
         Connection Number Low: 1
         Task Number: 1
         Connection Number High: 0
         Completion Code: 255 (Failure)
         Connection Status: 0x00

     ipx: ================ Internetwork Packet Exchange ================
         Checksum: 0xFFFF
         Length: 38
         Hop Count: 1
         Packet Type: 17(NCP)
         Network: 00 00 35 59       ---> 00 00 03 00
         Node:   42-45-41-4B-45-52 ---> 02-80-C8-00-00-05
         Socket: 0x0001           ---> 0x4003
     ncp: ================ NetWare Core Protocol ================
         NCP Message: Request Being Processed
         Reply Type: 0x9999 (Request Being Processed)
         Connection Number Low: 2
         Task Number: 2
         Connection Number High: 0

    Packet Number : 80        9:08:32 PM
    Length : 64 bytes
    802.3: ================ IEEE 802.3 Datalink Layer ================
         Station: PIGGY2----> BEAKER
         Length: 38
     ipx: ================ Internetwork Packet Exchange ================
         Checksum: 0xFFFF
         Length: 38
         Hop Count: 0
         Packet Type: 17(NCP)
         Network: 00 00 34 69       ---> 00 00 35 59
         Node:   50-49-47-47-59-32 ---> 42-45-41-4B-45-52
         Socket: NCP              ---> 0x40A9
     ncp: ================ NetWare Core Protocol ================
         NCP Reply: Search for File
         Reply Type: 0x3333 (Reply)
         Sequence Number: 15
         Connection Number Low: 2
         Task Number: 1
         Connection Number High: 0
         Completion Code: 156 (Invalid Path)
         Connection Status: 0x00

    Packet Number : 81        9:08:32 PM
    Length : 64 bytes
    802.3: ================ IEEE 802.3 Datalink Layer ================
         Station: BEAKER----> 02-80-C8-00-00-05
         Length: 38
     ipx: ================ Internetwork Packet Exchange ================
         Checksum: 0xFFFF
         Length: 38
         Hop Count: 1
         Packet Type: 17(NCP)
         Network: 00 00 35 59       ---> 00 00 03 00
         Node:   42-45-41-4B-45-52 ---> 02-80-C8-00-00-05
         Socket: 0x0001           ---> 0x4003
     ncp: ================ NetWare Core Protocol ================
         NCP Reply: Search for File
         Reply Type: 0x3333 (Reply)
```

Sequence Number: 16
Connection Number Low: 2
Task Number: 1
Connection Number High: 0
Completion Code: 156 (Invalid Path)
Connection Status: 0x00

49 Packet Number : 50 8:56:11 PM
Length : 84 bytes
802.3: ══════ IEEE 802.3 Datalink Layer ══════
Station: 02-80-C8-00-00-05----> PIGGY
Length: 66
ipx: ══════ Internetwork Packet Exchange ══════
Checksum: 0xFFFF
Length: 66
Hop Count: 0
Packet Type: 17(NCP)
Network: 00 00 03 00 ---> 00 00 34 69
Node: 02-80-C8-00-00-05 ---> 00-50-49-47-47-59
Socket: 0x4003 ---> NCP
ncp: ══════ NetWare Core Protocol ══════
NCP Request: Search for File
Request Type: 0x2222 (Request)
Sequence Number: 19
Connection Number Low: 1
Task Number: 2
Connection Number High: 0
Function Code: 64
Last Search Index: 65535
Directory Handle: 0x00
Search Attributes: 0x06 (Normal, System, Hidden Files)
File Name: Length: 24
Value : SYS:\MAIL\9E000001\LOGIN Packet Number : 90 9:08:32 PM
Length : 84 bytes
802.3: ══════ IEEE 802.3 Datalink Layer ══════
Station: 02-80-C8-00-00-05----> BEAKER
Length: 66
ipx: ══════ Internetwork Packet Exchange ══════
Checksum: 0xFFFF
Length: 66
Hop Count: 0
Packet Type: 17(NCP)
Network: 00 00 03 00 ---> 00 00 35 59
Node: 02-80-C8-00-00-05 ---> 42-45-41-4B-45-52
Socket: 0x4003 ---> 0x0001
ncp: ══════ NetWare Core Protocol ══════
NCP Request: Search for File
Request Type: 0x2222 (Request)
Sequence Number: 19
Connection Number Low: 2
Task Number: 2
Connection Number High: 0
Function Code: 64
Last Search Index: 65535
Directory Handle: 0x00
Search Attributes: 0x06 (Normal, System, Hidden Files)
File Name: Length: 24
Value : SYS:\MAIL\9E000001\LOGIN Packet Number : 91 9:08:32 PM
Length : 102 bytes
802.3: ══════ IEEE 802.3 Datalink Layer ══════
Station: BEAKER----> PIGGY2
Length: 84
ipx: ══════ Internetwork Packet Exchange ══════
Checksum: 0xFFFF
Length: 83
Hop Count: 1
Packet Type: 17(NCP)
Network: 00 00 35 59 ---> 00 00 34 69
Node: 42-45-41-4B-45-52 ---> 50-49-47-47-59-32
Socket: 0x40A9 ---> NCP
ncp: ══════ NetWare Core Protocol ══════
NCP Request: Search for File
Request Type: 0x2222 (Request)
Sequence Number: 18
Connection Number Low: 2
Task Number: 2
Connection Number High: 0

```
Function Code: 64
Last Search Index: 65535
Directory Handle: 0x00
Search Attributes: 0x06 (Normal, System, Hidden Files)
File Name: Length: 41
        Value : SYS:\IS\EFS\PIGGY\SYS\MAIL\9E000001\LOGIN

79   Packet Number : 80        8:56:11 PM
Length : 70 bytes
802.3: ============ IEEE 802.3 Datalink Layer ============
     Station: 02-80-C8-00-00-05 ----> PIGGY
     Length: 52
 ipx: ============ Internetwork Packet Exchange ============
     Checksum: 0xFFFF
     Length: 52
     Hop Count:  0
     Packet Type: 17(NCP)
     Network: 00 00 03 00        ---> 00 00 34 69
     Node:    02-80-C8-00-00-05  ---> 00-50-49-47-47-59
     Socket:  0x4003             ---> NCP
 ncp: ============ NetWare Core Protocol ============
     NCP Request: Scan Bindery Object
     Request Type: 0x2222 (Request)
     Sequence Number: 30
     Connection Number Low: 1
     Task Number: 2
     Connection Number High: 0
     Function Code: 23
     Subfunction Length: 13 bytes
     Subfunction Code: 55
     Last Object Seen: 4294967295
     Search Object Type: 65535 (All)
     Search Object Name: Length: 5
                Value : PIGGY

Packet Number : 122       9:08:32 PM
Length : 70 bytes
802.3: ============ IEEE 802.3 Datalink Layer ============
     Station: 02-80-C8-00-00-05----> BEAKER
     Length: 52
 ipx: ============ Internetwork Packet Exchange ============
     Checksum: 0xFFFF
     Length: 52
     Hop Count:  0
     Packet Type: 17(NCP)
     Network: 00 00 03 00        ---> 00 00 35 59
     Node:    02-80-C8-00-00-05 ---> 42-45-41-4B-45-52
     Socket:  0x4003             ---> 0x0001
 ncp: ============ NetWare Core Protocol ============
     NCP Request: Scan Bindery Object
     Request Type: 0x2222 (Request)
     Sequence Number: 27
     Connection Number Low: 2
     Task Number: 2
     Connection Number High: 0
     Function Code: 23
     Subfunction Length: 13 bytes
     Subfunction Code: 55
     Last Object Seen: 4294967295
     Search Object Type: 65535 (All)
     Search Object Name: Length: 5
                Value : PIGGY

Packet Number : 123       9:08:32 PM
Length : 70 bytes
802.3: ============ IEEE 802.3 Datalink Layer ============
     Station: BEAKER----> PIGGY2
     Length: 52
 ipx: ============ Internetwork Packet Exchange ============
     Checksum: 0xFFFF
     Length: 52
     Hop Count:  1
     Packet Type: 17(NCP)
     Network: 00 00 35 59        ---> 00 00 34 69
     Node:    42-45-41-4B-45-52 ---> 50-49-47-47-59-32
     Socket:  0x40A9             ---> NCP
 ncp: ============ NetWare Core Protocol ============
     NCP Request: Scan Bindery Object
     Request Type: 0x2222 (Request)
     Sequence Number: 26
     Connection Number Low: 2
     Task Number: 2
```

```
Packet Number : 81        8:56:11 PM
Length : 114 bytes
802.3: ============ IEEE 802.3 Datalink Layer ============
    Station: PIGGY ----> 02-80-C8-00-00-05
    Length: 96
ipx: ============ Internetwork Packet Exchange ============
    Checksum: 0xFFFF
    Length: 95
    Hop Count: 0
    Packet Type: 17(NCP)
    Network: 00 00 34 69        ---> 00 00 03 00
    Node:    00-50-49-47-47-59 ---> 02-80-C8-00-00-05
    Socket:  NCP                ---> 0x4003
ncp: ============ NetWare Core Protocol ============
    NCP Reply: Scan Bindery Object
    Reply Type: 0x3333 (Reply)
    Sequence Number: 30
    Connection Number Low: 1
    Task Number: 1
    Connection Number High: 0
    Completion Code: 0 (Success)
    Connection Status: 0x00
    Object ID: 0x9A000001
    Object Type: 4 (File Server)
    Object Name: PIGGY
    Object Flag: 0x00 (Static)
    Security: 64 (Anyone read, File Server write)
    Object has Properties: 255 (Yes)

    Connection Number High: 0
    Function Code: 23
    Subfunction Length: 13 bytes
    Subfunction Code: 55
    Last Object Seen: 4294967295
    Search Object Type: 65535 (All)
    Search Object Name: Length: 5
                        Value : PIGGY

Packet Number : 124        9:08:32 PM
Length : 114 bytes
802.3: ============ IEEE 802.3 Datalink Layer ============
    Station: PIGGY2---> BEAKER
    Length: 96
ipx: ============ Internetwork Packet Exchange ============
    Checksum: 0xFFFF
    Length: 95
    Hop Count: 0
    Packet Type: 17(NCP)
    Network: 00 00 34 69        ---> 00 00 35 59
    Node:    50-49-47-47-59-32 ---> 42-45-41-4B-45-52
    Socket:  NCP                ---> 0x40A9
ncp: ============ NetWare Core Protocol ============
    NCP Reply: Scan Bindery Object
    Reply Type: 0x3333 (Reply)
    Sequence Number: 26
    Connection Number Low: 2
    Task Number: 1
    Connection Number High: 0
    Completion Code: 0 (Success)
    Connection Status: 0x00
    Object ID: 0x9A000001
    Object Type: 4 (File Server)
    Object Name: PIGGY
    Object Flag: 0x00 (Static)
    Security: 64 (Anyone read, File Server write)
    Object has Properties: 255 (Yes)

Packet Number : 125        9:08:32 PM
Length : 114 bytes
802.3: ============ IEEE 802.3 Datalink Layer ============
    Station: BEAKER---> 02-80-C8-00-00-05
    Length: 96
ipx: ============ Internetwork Packet Exchange ============
    Checksum: 0xFFFF
    Length: 95
    Hop Count: 1
    Packet Type: 17(NCP)
    Network: 00 00 35 59        ---> 00 00 03 00
    Node:    42-45-41-4B-45-52 ---> 02-80-C8-00-00-05
    Socket:  0x0001             ---> 0x4003
ncp: ============ NetWare Core Protocol ============
    NCP Reply: Scan Bindery Object
    Reply Type: 0x3333 (Reply)
```

```
83  Packet Number : 84        8:56:11 PM
    Length : 64 bytes
    802.3: ============= IEEE 802.3 Datalink Layer =============
          Station: 02-80-C8-00-00-05 ----> PIGGY
          Length: 42
     ipx: ============= Internetwork Packet Exchange =============
          Checksum: 0xFFFF
          Length: 41
          Hop Count: 0
          Packet Type: 17(NCP)
          Network: 00 00 03 00        ---> 00 00 34 69
          Node:   02-80-C8-00-00-05 ---> 00-50-49-47-47-59
          Socket: 0x4003            ---> NCP
     ncp: ============= NetWare Core Protocol =============
          NCP Request: Deallocate Directory Handle
          Request Type: 0x2222 (Request)
          Sequence Number: 32
          Connection Number Low: 1
          Task Number: 2
          Connection Number High: 0
          Function Code: 22
          Subfunction Length: 2 bytes
          Subfunction Code: 20
          Directory Handle: 0x01

          Sequence Number: 27
          Connection Number Low: 2
          Task Number: 1
          Connection Number High: 0
          Completion Code: 0 (Success)
          Connection Status: 0x00
          Object ID: 0x9A000001
          Object Type: 4 (File Server)
          Object Name: PIGGY
          Object Flag: 0x00 (Static)
          Security: 64 (Anyone read, File Server write)
          Object has Properties: 255 (Yes)

    Packet Number : 130       9:08:32 PM
    Length : 64 bytes
    802.3: ============= IEEE 802.3 Datalink Layer =============
          Station: 02-80-C8-00-00-05----> BEAKER
          Length: 42
     ipx: ============= Internetwork Packet Exchange =============
          Checksum: 0xFFFF
          Length: 41
          Hop Count: 0
          Packet Type: 17(NCP)
          Network: 00 00 03 00        ---> 00 00 35 59
          Node:   02-80-C8-00-00-05 ---> 42-45-41-4B-45-52
          Socket: 0x4003            ---> 0x0001
     ncp: ============= NetWare Core Protocol =============
          NCP Request: Deallocate Directory Handle
          Request Type: 0x2222 (Request)
          Sequence Number: 29
          Connection Number Low: 2
          Task Number: 2
          Connection Number High: 0
          Function Code: 22
          Subfunction Length: 2 bytes
          Subfunction Code: 20
          Directory Handle: 0x01

    Packet Number : 131       9:08:32 PM
    Length : 64 bytes
    802.3: ============= IEEE 802.3 Datalink Layer =============
          Station: BEAKER----> PIGGY2
          Length: 42
     ipx: ============= Internetwork Packet Exchange =============
          Checksum: 0xFFFF
          Length: 41
          Hop Count: 1
          Packet Type: 17(NCP)
          Network: 00 00 35 59        ---> 00 00 34 69
          Node:   42-45-41-4B-45-52 ---> 50-49-47-47-59-32
          Socket: 0x40A9            ---> NCP
     ncp: ============= NetWare Core Protocol =============
          NCP Request: Deallocate Directory Handle
          Request Type: 0x2222 (Request)
```

84

```
Packet Number : 85        8:56:11 PM
Length : 64 bytes
802.3: ============ IEEE 802.3 Datalink Layer ============
    Station: PIGGY ----> 02-80-C8-00-00-05
    Length: 38
 ipx: ============ Internetwork Packet Exchange ============
    Checksum: 0xFFFF
    Length: 38
    Hop Count: 0
    Packet Type: 17(NCP)
    Network: 00 00 34 69        ---> 00 00 03 00
    Node:    00-50-49-47-47-59 ---> 02-80-C8-00-00-05
    Socket:  NCP                ---> 0x4003
ncp: ============ NetWare Core Protocol ============
    NCP Reply: Deallocate Directory Handle
    Reply Type: 0x3333 (Reply)
    Sequence Number: 32
    Connection Number Low: 1
    Task Number: 1
    Connection Number High: 0
    Completion Code: 0 (Success)
    Connection Status: 0x00
```

```
    Sequence Number: 28
    Connection Number Low: 2
    Task Number: 2
    Connection Number High: 0
    Function Code: 22
    Subfunction Length: 2 bytes
    Subfunction Code: 20
    Directory Handle: 0x01

Packet Number : 132        9:08:32 PM
Length : 64 bytes
802.3: ============ IEEE 802.3 Datalink Layer ============
    Station: PIGGY2----> BEAKER
    Length: 38
 ipx: ============ Internetwork Packet Exchange ============
    Checksum: 0xFFFF
    Length: 38
    Hop Count: 0
    Packet Type: 17(NCP)
    Network: 00 00 34 69        ---> 00 00 35 59
    Node:    50-49-47-47-59-32 ---> 42-45-41-4B-45-52
    Socket:  NCP                ---> 0x40A9
ncp: ============ NetWare Core Protocol ============
    NCP Reply: Deallocate Directory Handle
    Reply Type: 0x3333 (Reply)
    Sequence Number: 28
    Connection Number Low: 2
    Task Number: 1
    Connection Number High: 0
    Completion Code: 0 (Success)
    Connection Status: 0x00

Packet Number : 133        9:08:32 PM
Length : 64 bytes
802.3: ============ IEEE 802.3 Datalink Layer ============
    Station: BEAKER---> 02-80-C8-00-00-05
    Length: 38
 ipx: ============ Internetwork Packet Exchange ============
    Checksum: 0xFFFF
    Length: 38
    Hop Count: 1
    Packet Type: 17(NCP)
    Network: 00 00 35 59        ---> 00 00 03 00
    Node:    42-45-41-4B-45-52 ---> 02-80-C8-00-00-05
    Socket:  0x0001             ---> 0x4003
ncp: ============ NetWare Core Protocol ============
    NCP Reply: Deallocate Directory Handle
    Reply Type: 0x3333 (Reply)
    Sequence Number: 29
    Connection Number Low: 2
    Task Number: 1
    Connection Number High: 0
    Completion Code: 0 (Success)
    Connection Status: 0x00
```

```
Packet Number : 86        8:56:11 PM
Length : 66 bytes
802.3: ================ IEEE 802.3 Datalink Layer ================
    Station: 02-80-C8-00-00-05 ----> PIGGY
    Length: 48
 ipx: ================ Internetwork Packet Exchange ================
    Checksum: 0xFFFF
    Length: 47
    Hop Count: 0
    Packet Type: 17(NCP)
    Network: 00 00 03 00      ---> 00 00 34 69
    Node:    02-80-C8-00-00-05 ---> 00-50-49-47-47-59
    Socket:  0x4003            ---> NCP
 ncp: ================ NetWare Core Protocol ================
    NCP Request: Alloc Permanent Dir Handle
    Request Type: 0x2222 (Request)
    Sequence Number: 33
    Connection Number Low: 1
    Task Number: 2
    Connection Number High: 0
    Function Code: 22
    Subfunction Length: 8 bytes
    Subfunction Code: 18
    Source Directory Handle: 0x00
    Handle Name: 0xC6
    Directory Path: Length: 4
              Value : SYS:
```

```
Packet Number : 134       9:08:32 PM
Length : 66 bytes
802.3: ================ IEEE 802.3 Datalink Layer ================
    Station: 02-80-C8-00-00-05----> BEAKER
    Length: 48
 ipx: ================ Internetwork Packet Exchange ================
    Checksum: 0xFFFF
    Length: 47
    Hop Count: 0
    Packet Type: 17(NCP)
    Network: 00 00 03 00      ---> 00 00 35 59
    Node:    02-80-C8-00-00-05 ---> 42-45-41-4B-45-52
    Socket:  0x4003            ---> 0x0001
 ncp: ================ NetWare Core Protocol ================
    NCP Request: Alloc Permanent Dir Handle
    Request Type: 0x2222 (Request)
    Sequence Number: 30
    Connection Number Low: 2
    Task Number: 2
    Connection Number High: 0
    Function Code: 22
    Subfunction Length: 8 bytes
    Subfunction Code: 18
    Source Directory Handle: 0x00
    Handle Name: 0xC6
    Directory Path: Length: 4
              Value : SYS:

Packet Number : 135       9:08:32 PM
Length : 82 bytes
802.3: ================ IEEE 802.3 Datalink Layer ================
    Station: BEAKER----> PIGGY2
    Length: 64
 ipx: ================ Internetwork Packet Exchange ================
    Checksum: 0xFFFF
    Length: 64
    Hop Count: 1
    Packet Type: 17(NCP)
    Network: 00 00 35 59      ---> 00 00 34 69
    Node:    42-45-41-4B-45-52 ---> 50-49-47-47-59-32
    Socket:  0x40A9            ---> NCP
 ncp: ================ NetWare Core Protocol ================
    NCP Request: Alloc Permanent Dir Handle
    Request Type: 0x2222 (Request)
    Sequence Number: 29
    Connection Number Low: 2
    Task Number: 2
    Connection Number High: 0
    Function Code: 22
    Subfunction Length: 25 bytes
    Subfunction Code: 18
    Source Directory Handle: 0x00
    Handle Name: 0xC6
    Directory Path: Length: 21
```

```
86  Packet Number : 87        8:56:11 PM
    Length : 64 bytes
    802.3: ============ IEEE 802.3 Datalink Layer ============
         Station: PIGGY ----> 02-80-C8-00-00-05
         Length: 40
     ipx: ============ Internetwork Packet Exchange ============
         Checksum: 0xFFFF
         Length: 40
         Hop Count: 0
         Packet Type: 17(NCP)
         Network: 00 00 34 69        ---> 00 00 03 00
         Node:   00-50-49-47-47-59 ---> 02-80-C8-00-00-05
         Socket: NCP                ---> 0x4003
    ncp: ============ NetWare Core Protocol ============
         NCP Reply: Alloc Permanent Dir Handle
         Reply Type: 0x3333 (Reply)
         Sequence Number: 33
         Connection Number Low: 1
         Task Number: 1
         Connection Number High: 0
         Completion Code: 0 (Success)
         Connection Status: 0x00
         New Directory Handle: 0x02
         Access Rights Mask: 0xFF (Modify Flags/Rename Files, Search, Parental Rights,
                       Delete, Create, Open, Write, Read)
```

```
                    Value : SYS:\IS\EFS\PIGGY\SYS

Packet Number : 136       9:08:32 PM
Length : 64 bytes
802.3: ============ IEEE 802.3 Datalink Layer ============
     Station: PIGGY2----> BEAKER
     Length: 40
 ipx: ============ Internetwork Packet Exchange ============
     Checksum: 0xFFFF
     Length: 40
     Hop Count: 0
     Packet Type: 17(NCP)
     Network: 00 00 34 69        ---> 00 00 35 59
     Node:   50-49-47-47-59-32 ---> 42-45-41-4B-45-52
     Socket: NCP                ---> 0x40A9
 ncp: ============ NetWare Core Protocol ============
     NCP Reply: Alloc Permanent Dir Handle
     Reply Type: 0x3333 (Reply)
     Sequence Number: 29
     Connection Number Low: 2
     Task Number: 1
     Connection Number High: 0
     Completion Code: 0 (Success)
     Connection Status: 0x00
     New Directory Handle: 0x02
     Access Rights Mask: 0xFF (Modify Flags/Rename Files, Search, Parental Rights,
                   Delete, Create, Open, Write, Read)

Packet Number : 137       9:08:32 PM
Length : 64 bytes
802.3: ============ IEEE 802.3 Datalink Layer ============
     Station: BEAKER----> 02-80-C8-00-00-05
     Length: 40
 ipx: ============ Internetwork Packet Exchange ============
     Checksum: 0xFFFF
     Length: 40
     Hop Count: 1
     Packet Type: 17(NCP)
     Network: 00 00 35 59        ---> 00 00 03 00
     Node:   42-45-41-4B-45-52 ---> 02-80-C8-00-00-05
     Socket: 0x0001             ---> 0x4003
 ncp: ============ NetWare Core Protocol ============
     NCP Reply: Alloc Permanent Dir Handle
     Reply Type: 0x3333 (Reply)
     Sequence Number: 30
     Connection Number Low: 2
     Task Number: 1
     Connection Number High: 0
     Completion Code: 0 (Success)
     Connection Status: 0x00
     New Directory Handle: 0x02
     Access Rights Mask: 0xFF (Modify Flags/Rename Files, Search, Parental Rights,
                   Delete, Create, Open, Write, Read)
```

```
87   Packet Number : 88        8:56:11 PM
     Length : 66 bytes
     802.3: ================ IEEE 802.3 Datalink Layer ================
          Station: 02-80-C8-00-00-05 ----> PIGGY
          Length: 48
      ipx: ================ Internetwork Packet Exchange ================
          Checksum: 0xFFFF
          Length: 47
          Hop Count: 0
          Packet Type: 17(NCP)
          Network: 00 00 03 00         ---> 00 00 34 69
          Node:    02-80-C8-00-00-05 ---> 00-50-49-47-47-59
          Socket:  0x4003              ---> NCP
      ncp: ================ NetWare Core Protocol ================
          NCP Request: Alloc Permanent Dir Handle
          Request Type: 0x2222 (Request)
          Sequence Number: 34
          Connection Number Low: 1
          Task Number: 2
          Connection Number High: 0
          Function Code: 22
          Subfunction Length: 8 bytes
          Subfunction Code: 18
          Source Directory Handle: 0x00
          Handle Name: 0x46
          Directory Path: Length: 4
                    Value : SYS:

     Packet Number : 138       9:08:32 PM
     Length : 66 bytes
     802.3: ================ IEEE 802.3 Datalink Layer ================
          Station: 02-80-C8-00-00-05----> BEAKER
          Length: 48
      ipx: ================ Internetwork Packet Exchange ================
          Checksum: 0xFFFF
          Length: 47
          Hop Count: 0
          Packet Type: 17(NCP)
          Network: 00 00 03 00         ---> 00 00 35 59
          Node:    02-80-C8-00-00-05 ---> 42-45-41-4B-45-52
          Socket:  0x4003              ---> 0x0001
      ncp: ================ NetWare Core Protocol ================
          NCP Request: Alloc Permanent Dir Handle
          Request Type: 0x2222 (Request)
          Sequence Number: 31
          Connection Number Low: 2
          Task Number: 2
          Connection Number High: 0
          Function Code: 22
          Subfunction Length: 8 bytes
          Subfunction Code: 18
          Source Directory Handle: 0x00
          Handle Name: 0x46
          Directory Path: Length: 4
                    Value : SYS:

     Packet Number : 139       9:08:32 PM
     Length : 82 bytes
     802.3: ================ IEEE 802.3 Datalink Layer ================
          Station: BEAKER----> PIGGY2
          Length: 64
      ipx: ================ Internetwork Packet Exchange ================
          Checksum: 0xFFFF
          Length: 64
          Hop Count: 1
          Packet Type: 17(NCP)
          Network: 00 00 35 59         ---> 00 00 34 69
          Node:    42-45-41-4B-45-52 ---> 50-49-47-47-59-32
          Socket:  0x40A9              ---> NCP
      ncp: ================ NetWare Core Protocol ================
          NCP Request: Alloc Permanent Dir Handle
          Request Type: 0x2222 (Request)
          Sequence Number: 30
          Connection Number Low: 2
          Task Number: 2
          Connection Number High: 0
          Function Code: 22
          Subfunction Length: 25 bytes
          Subfunction Code: 18
          Source Directory Handle: 0x00
          Handle Name: 0x46
          Directory Path: Length: 21
```

```
88   Packet Number : 89        8:56:11 PM
     Length : 64 bytes
     802.3: ============== IEEE 802.3 Datalink Layer ==============
          Station: PIGGY ----> 02-80-C8-00-00-05
          Length: 40
      ipx: ============== Internetwork Packet Exchange ==============
          Checksum: 0xFFFF
          Length: 40
          Hop Count: 0
          Packet Type: 17(NCP)
          Network: 00 00 34 69      ---> 00 00 03 00
          Node:    00-50-49-47-47-59 ---> 02-80-C8-00-00-05
          Socket:  NCP              ---> 0x4003
     ncp: ============== NetWare Core Protocol ==============
          NCP Reply: Alloc Permanent Dir Handle
          Reply Type: 0x3333 (Reply)
          Sequence Number: 34
          Connection Number Low: 1
          Task Number: 1
          Connection Number High: 0
          Completion Code: 0 (Success)
          Connection Status: 0x00
          New Directory Handle: 0x03
          Access Rights Mask: 0xFF (Modify Flags/Rename Files, Search, Parental Rights,
                    Delete, Create, Open, Write, Read)

                    Value : SYS:\IS\EFS\PIGGY\SYS

     Packet Number : 140       9:08:32 PM
     Length : 64 bytes
     802.3: ============== IEEE 802.3 Datalink Layer ==============
          Station: PIGGY2----> BEAKER
          Length: 40
      ipx: ============== Internetwork Packet Exchange ==============
          Checksum: 0xFFFF
          Length: 40
          Hop Count: 0
          Packet Type: 17(NCP)
          Network: 00 00 34 69      ---> 00 00 35 59
          Node:    50-49-47-47-59-32 ---> 42-45-41-4B-45-52
          Socket:  NCP              ---> 0x40A9
     ncp: ============== NetWare Core Protocol ==============
          NCP Reply: Alloc Permanent Dir Handle
          Reply Type: 0x3333 (Reply)
          Sequence Number: 30
          Connection Number Low: 2
          Task Number: 1
          Connection Number High: 0
          Completion Code: 0 (Success)
          Connection Status: 0x00
          New Directory Handle: 0x03
          Access Rights Mask: 0xFF (Modify Flags/Rename Files, Search, Parental Rights,
                    Delete, Create, Open, Write, Read)

     Packet Number : 141       9:08:32 PM
     Length : 64 bytes
     802.3: ============== IEEE 802.3 Datalink Layer ==============
          Station: BEAKER----> 02-80-C8-00-00-05
          Length: 40
      ipx: ============== Internetwork Packet Exchange ==============
          Checksum: 0xFFFF
          Length: 40
          Hop Count: 1
          Packet Type: 17(NCP)
          Network: 00 00 35 59      ---> 00 00 03 00
          Node:    42-45-41-4B-45-52 ---> 02-80-C8-00-00-05
          Socket:  0x0001           ---> 0x4003
     ncp: ============== NetWare Core Protocol ==============
          NCP Reply: Alloc Permanent Dir Handle
          Reply Type: 0x3333 (Reply)
          Sequence Number: 31
          Connection Number Low: 2
          Task Number: 1
          Connection Number High: 0
          Completion Code: 0 (Success)
          Connection Status: 0x00
          New Directory Handle: 0x03
          Access Rights Mask: 0xFF (Modify Flags/Rename Files, Search, Parental Rights,
                    Delete, Create, Open, Write, Read)
```

```
89  Packet Number : 90        8:56:11 PM
    Length : 64 bytes
    802.3: ================ IEEE 802.3 Datalink Layer ================
         Station: 02-80-C8-00-00-05 ----> PIGGY
         Length: 42
     ipx: ============== Internetwork Packet Exchange ==============
         Checksum: 0xFFFF
         Length: 41
         Hop Count: 0
         Packet Type: 17(NCP)
         Network: 00 00 03 00       ---> 00 00 34 69
         Node:    02-80-C8-00-00-05 ---> 00-50-49-47-47-59
         Socket:  0x4003            ---> NCP
     ncp: ================ NetWare Core Protocol ================
         NCP Request: Get Directory Path
         Request Type: 0x2222 (Request)
         Sequence Number: 35
         Connection Number Low: 1
         Task Number: 2
         Connection Number High: 0
         Function Code: 22
         Subfunction Length: 2 bytes
         Subfunction Code: 1
         Target Directory Handle: 0x02

90  Packet Number : 91        8:56:11 PM
    Length : 64 bytes
    802.3: ================ IEEE 802.3 Datalink Layer ================
         Station: PIGGY ----> 02-80-C8-00-00-05

    Packet Number : 142       9:08:32 PM
    Length : 64 bytes
    802.3: ================ IEEE 802.3 Datalink Layer ================
         Station: 02-80-C8-00-00-05----> BEAKER
         Length: 42
     ipx: ============== Internetwork Packet Exchange ==============
         Checksum: 0xFFFF
         Length: 41
         Hop Count: 0
         Packet Type: 17(NCP)
         Network: 00 00 03 00       ---> 00 00 35 59
         Node:    02-80-C8-00-00-05 ---> 42-45-41-4B-45-52
         Socket:  0x4003            ---> 0x0001
     ncp: ================ NetWare Core Protocol ================
         NCP Request: Get Directory Path
         Request Type: 0x2222 (Request)
         Sequence Number: 32
         .Connection Number Low: 2
         Task Number: 2
         Connection Number High: 0
         Function Code: 22
         Subfunction Length: 2 bytes
         Subfunction Code: 1
         Target Directory Handle: 0x02

    Packet Number : 143       9:08:32 PM
    Length : 64 bytes
    802.3: ================ IEEE 802.3 Datalink Layer ================
         Station: BEAKER----> PIGGY2
         Length: 42
     ipx: ============== Internetwork Packet Exchange ==============
         Checksum: 0xFFFF
         Length: 41
         Hop Count: 1
         Packet Type: 17(NCP)
         Network: 00 00 35 59       ---> 00 00 34 69
         Node:    42-45-41-4B-45-52 ---> 50-49-47-47-59-32
         Socket:  0x40A9            ---> NCP
     ncp: ================ NetWare Core Protocol ================
         NCP Request: Get Directory Path
         Request Type: 0x2222 (Request)
         Sequence Number: 31
         Connection Number Low: 2
         Task Number: 2
         Connection Number High: 0
         Function Code: 22
         Subfunction Length: 2 bytes
         Subfunction Code: 1
         Target Directory Handle: 0x02

    Packet Number : 144       9:08:32 PM
    Length : 78 bytes
    802.3: ================ IEEE 802.3 Datalink Layer ================
         Station: PIGGY2----> BEAKER
```

```
        Length: 44
    ipx: ============ Internetwork Packet Exchange ============
        Checksum: 0xFFFF
        Length: 43
        Hop Count: 0
        Packet Type: 17(NCP)
        Network: 00 00 34 69        ---> 00 00 03 00
        Node:    00-50-49-47-47-59 ---> 02-80-C8-00-00-05
        Socket:  NCP               ---> 0x4003
    ncp: ============ NetWare Core Protocol ============
        NCP Reply: Get Directory Path
        Reply Type: 0x3333 (Reply)
        Sequence Number: 35
        Connection Number Low: 1
        Task Number: 1
        Connection Number High: 0
        Completion Code: 0 (Success)
        Connection Status: 0x00
        Directory Path: Length: 4
                Value : SYS:

113  Packet Number : 114        8:56:11 PM
     Length : 66 bytes
     802.3: ============ IEEE 802.3 Datalink Layer ============
        Station: 02-80-C8-00-00-05----> PIGGY
        Length: 48
      ipx: ============ Internetwork Packet Exchange ============
        Checksum: 0xFFFF
        Length: 47
```

```
        Length: 60
    ipx: ============ Internetwork Packet Exchange ============
        Checksum: 0xFFFF
        Length: 59
        Hop Count: 0
        Packet Type: 17(NCP)
        Network: 00 00 34 69        ---> 00 00 35 59
        Node:    50-49-47-47-59-32 ---> 42-45-41-4B-45-52
        Socket:  NCP               ---> 0x40A9
    ncp: ============ NetWare Core Protocol ============
        NCP Reply: Get Directory Path
        Reply Type: 0x3333 (Reply)
        Sequence Number: 31
        Connection Number Low: 2
        Task Number: 1
        Connection Number High: 0
        Completion Code: 0 (Success)
        Connection Status: 0x00
        Directory Path: Length: 20
                Value : SYS:IS/EFS/PIGGY/SYS

Packet Number : 145        9:08:32 PM
Length : 64 bytes
802.3: ============ IEEE 802.3 Datalink Layer ============
        Station: BEAKER----> 02-80-C8-00-00-05
        Length: 44
    ipx: ============ Internetwork Packet Exchange ============
        Checksum: 0xFFFF
        Length: 43
        Hop Count: 1
        Packet Type: 17(NCP)
        Network: 00 00 35 59        ---> 00 00 03 00
        Node:    42-45-41-4B-45-52 ---> 02-80-C8-00-00-05
        Socket:  0x0001            ---> 0x4003
    ncp: ============ NetWare Core Protocol ============
        NCP Reply: Get Directory Path
        Reply Type: 0x3333 (Reply)
        Sequence Number: 32
        Connection Number Low: 2
        Task Number: 1
        Connection Number High: 0
        Completion Code: 0 (Success)
        Connection Status: 0x00
        Directory Path: Length: 4
                Value : SYS:

Packet Number : 190        9:08:33 PM
Length : 66 bytes
802.3: ============ IEEE 802.3 Datalink Layer ============
        Station: 02-80-C8-00-00-05----> BEAKER
        Length: 48
    ipx: ============ Internetwork Packet Exchange ============
        Checksum: 0xFFFF
        Length: 47
```

```
Hop Count: 0
Packet Type: 17(NCP)
Network: 00 00 03 00      ---> 00 00 34 69
Node:   02-80-C8-00-00-05 ---> 00-50-49-47-47-59
Socket: 0x4003            ---> NCP
ncp: ================ NetWare Core Protocol ================
  NCP Request: Get Effective Dir Rights
  Request Type: 0x2222 (Request)
  Sequence Number: 47
  Connection Number Low: 1
  Task Number: 2
  Connection Number High: 0
  Function Code: 22
  Subfunction Length: 8 bytes
  Subfunction Code: 3
  Directory Handle: 0x02
  Directory Path: Length: 5
         Value : ADMIN

114   Packet Number : 115        8:56:11 PM
Length : 64 bytes
802.3: ================ IEEE 802.3 Datalink Layer ================
    Station: PIGGY----> 02-80-C8-00-00-05
    Length: 38
 ipx: ================ Internetwork Packet Exchange ================
    Checksum: 0xFFFF
    Length: 38
```

```
Hop Count: 0
Packet Type: 17(NCP)
Network: 00 00 03 00      ---> 00 00 35 59
Node:   02-80-C8-00-00-05 ---> 42-45-41-4B-45-52
Socket: 0x4003            ---> 0x0001
ncp: ================ NetWare Core Protocol ================
  NCP Request: Get Effective Dir Rights
  Request Type: 0x2222 (Request)
  Sequence Number: 44
  Connection Number Low: 2
  Task Number: 2
  Connection Number High: 0
  Function Code: 22
  Subfunction Length: 8 bytes
  Subfunction Code: 3
  Directory Handle: 0x02
  Directory Path: Length: 5
         Value : ADMIN

Packet Number : 191        9:08:33 PM
Length : 66 bytes
802.3: ================ IEEE 802.3 Datalink Layer ================
    Station: BEAKER----> PIGGY2
    Length: 48
 ipx: ================ Internetwork Packet Exchange ================
    Checksum: 0xFFFF
    Length: 47
    Hop Count: 1
    Packet Type: 17(NCP)
    Network: 00 00 35 59      ---> 00 00 34 69
    Node:   42-45-41-4B-45-52 ---> 50-49-47-47-59-32
    Socket: 0x40A9            ---> NCP
 ncp: ================ NetWare Core Protocol ================
    NCP Request: Get Effective Dir Rights
    Request Type: 0x2222 (Request)
    Sequence Number: 43
    Connection Number Low: 2
    Task Number: 2
    Connection Number High: 0
    Function Code: 22
    Subfunction Length: 8 bytes
    Subfunction Code: 3
    Directory Handle: 0x02
    Directory Path: Length: 5
           Value : ADMIN

Packet Number : 192        9:08:33 PM
Length : 64 bytes
802.3: ================ IEEE 802.3 Datalink Layer ================
    Station: PIGGY2----> BEAKER
    Length: 38
 ipx: ================ Internetwork Packet Exchange ================
    Checksum: 0xFFFF
    Length: 38
```

```
Hop Count: 0
Packet Type: 17(NCP)
Network: 00 00 34 69        ---> 00 00 03 00
Node:    00-50-49-47-47-59 ---> 02-80-C8-00-00-05
Socket:  NCP                ---> 0x4003
ncp: ================ NetWare Core Protocol ================
   NCP Reply: Get Effective Dir Rights
   Reply Type: 0x3333 (Reply)
   Sequence Number: 47
   Connection Number Low: 1
   Task Number: 1
   Connection Number High: 0
   Completion Code: 156 (Invalid Path)
   Connection Status: 0x00

197 Packet Number : 198        8:56:12 PM
Length : 64 bytes
802.3: ================ IEEE 802.3 Datalink Layer ================
   Station: 02-80-C8-00-00-05----> PIGGY
   Length: 38
ipx: ================ Internetwork Packet Exchange ================
   Checksum: 0xFFFF
   Length: 37
   Hop Count: 0
   Packet Type: 17(NCP)
   Network: 00 00 03 00        ---> 00 00 34 69
   Node:    02-80-C8-00-00-05 ---> 00-50-49-47-47-59
   Socket:  0x4003             ---> NCP
ncp: ================ NetWare Core Protocol ================
   NCP Request: Get File Server Date and Time
   Request Type: 0x2222 (Request)

Hop Count: 0
Packet Type: 17(NCP)
Network: 00 00 34 69        ---> 00 00 35 59
Node:    50-49-47-47-59-32 ---> 42-45-41-4B-45-52
Socket:  NCP                ---> 0x40A9
ncp: ================ NetWare Core Protocol ================
   NCP Reply: Get Effective Dir Rights
   Reply Type: 0x3333 (Reply)
   Sequence Number: 43
   Connection Number Low: 2
   Task Number: 1
   Connection Number High: 0
   Completion Code: 156 (Invalid Path)
   Connection Status: 0x00

Packet Number : 193        9:08:33 PM
Length : 64 bytes
802.3: ================ IEEE 802.3 Datalink Layer ================
   Station: BEAKER----> 02-80-C8-00-00-05
   Length: 38
ipx: ================ Internetwork Packet Exchange ================
   Checksum: 0xFFFF
   Length: 38
   Hop Count: 1
   Packet Type: 17(NCP)
   Network: 00 00 35 59        ---> 00 00 03 00
   Node:    42-45-41-4B-45-52 ---> 02-80-C8-00-00-05
   Socket:  0x0001             ---> 0x4003
ncp: ================ NetWare Core Protocol ================
   NCP Reply: Get Effective Dir Rights
   Reply Type: 0x3333 (Reply)
   Sequence Number: 44
   Connection Number Low: 2
   Task Number: 1
   Connection Number High: 0
   Completion Code: 156 (Invalid Path)
   Connection Status: 0x00

Packet Number : 350        9:08:33 PM
Length : 64 bytes
802.3: ================ IEEE 802.3 Datalink Layer ================
   Station: 02-80-C8-00-00-05----> BEAKER
   Length: 38
ipx: ================ Internetwork Packet Exchange ================
   Checksum: 0xFFFF
   Length: 37
   Hop Count: 0
   Packet Type: 17(NCP)
   Network: 00 00 03 00        ---> 00 00 35 59
   Node:    02-80-C8-00-00-05 ---> 42-45-41-4B-45-52
   Socket:  0x4003             ---> 0x0001
ncp: ================ NetWare Core Protocol ================
   NCP Request: Get File Server Date and Time
   Request Type: 0x2222 (Request)
```

Sequence Number: 89
Connection Number Low: 1
Task Number: 2
Connection Number High: 0
Function Code: 20

198 Packet Number : 199 8:56:12 PM
Length : 64 bytes
802.3: ============ IEEE 802.3 Datalink Layer ============
Station: PIGGY----> 02-80-C8-00-00-05
Length: 46
ipx: ============ Internetwork Packet Exchange ============
Checksum: 0xFFFF
Length: 45
Hop Count: 0
Packet Type: 17(NCP)
Network: 00 00 34 69 ---> 00 00 03 00
Node: 00-50-49-47-47-59 ---> 02-80-C8-00-00-05
Socket: NCP ---> 0x4003
ncp: ============ NetWare Core Protocol ============
NCP Reply: Get File Server Date and Time
Reply Type: 0x3333 (Reply)
Sequence Number: 89
Connection Number Low: 1
Task Number: 1
Connection Number High: 0
Completion Code: 0 (Success)
Connection Status: 0x00
Date/Time: Thursday, August 25, 1994 1:07:00 PM Sequence Number: 84
Connection Number Low: 2
Task Number: 2
Connection Number High: 0
Function Code: 20

Packet Number : 351 9:08:33 PM
Length : 64 bytes
802.3: ============ IEEE 802.3 Datalink Layer ============
Station: BEAKER----> PIGGY2
Length: 38
ipx: ============ Internetwork Packet Exchange ============
Checksum: 0xFFFF
Length: 37
Hop Count: 1
Packet Type: 17(NCP)
Network: 00 00 35 59 ---> 00 00 34 69
Node: 42-45-41-4B-45-52 ---> 50-49-47-47-59-32
Socket: 0x40A9 ---> NCP
ncp: ============ NetWare Core Protocol ============
NCP Request: Get File Server Date and Time
Request Type: 0x2222 (Request)
Sequence Number: 83
Connection Number Low: 2
Task Number: 2
Connection Number High: 0
Function Code: 20

Packet Number : 352 9:08:33 PM
Length : 64 bytes
802.3: ============ IEEE 802.3 Datalink Layer ============
Station: PIGGY2----> BEAKER
Length: 46
ipx: ============ Internetwork Packet Exchange ============
Checksum: 0xFFFF
Length: 45
Hop Count: 0
Packet Type: 17(NCP)
Network: 00 00 34 69 ---> 00 00 35 59
Node: 50-49-47-47-59-32 ---> 42-45-41-4B-45-52
Socket: NCP ---> 0x40A9
ncp: ============ NetWare Core Protocol ============
NCP Reply: Get File Server Date and Time
Reply Type: 0x3333 (Reply)
Sequence Number: 83
Connection Number Low: 2
Task Number: 1
Connection Number High: 0
Completion Code: 0 (Success)
Connection Status: 0x00
Date/Time: Thursday, August 25, 1994 1:19:22 PM Packet Number : 353 9:08:33 PM
Length : 64 bytes

```
199   Packet Number : 200        8:56:12 PM
Length : 212 bytes
802.3: ============= IEEE 802.3 Datalink Layer =============
    Station: 02-80-C8-00-00-05----> PIGGY
    Length: 194
  ipx: ============= Internetwork Packet Exchange =============
    Checksum: 0xFFFF
    Length: 194
    Hop Count: 0
    Packet Type: 17(NCP)
    Network: 00 00 03 00       ---> 00 00 34 69
    Node:  02-80-C8-00-00-05 ---> 00-50-49-47-47-59
    Socket: 0x4003          ---> NCP
  ncp: ============= NetWare Core Protocol =============
    NCP Request: Write Property Value
    Request Type: 0x2222 (Request)
    Sequence Number: 90
    Connection Number Low: 1
    Task Number: 2
    Connection Number High: 0
    Function Code: 23
    Subfunction Length: 155 bytes
    Subfunction Code: 62
    Object Type: 1 (User)
    Object Name: Length: 5
           Value : admin
    Segment Number: 1
    More Flag: 0 (No)
    Property Name: Length: 15
           Value : MISC_LOGIN_INFO
    Property Value:  0: 5E 08 19 0D 07 00 04 1D  |^.......|
               8: 1C FB 7A 0D 6D 39 0A 00  |..z.m9..|
```

```
802.3: ============= IEEE 802.3 Datalink Layer =============
    Station: BEAKER----> 02-80-C8-00-00-05
    Length: 46
  ipx: ============= Internetwork Packet Exchange =============
    Checksum: 0xFFFF
    Length: 45
    Hop Count: 1
    Packet Type: 17(NCP)
    Network: 00 00 35 59       ---> 00 00 03 00
    Node:  42-45-41-4B-45-52 ---> 02-80-C8-00-00-05
    Socket: 0x0001          ---> 0x4003
  ncp: ============= NetWare Core Protocol =============
    NCP Reply: Get File Server Date and Time
    Reply Type: 0x3333 (Reply)
    Sequence Number: 84
    Connection Number Low: 2
    Task Number: 1
    Connection Number High: 0
    Completion Code: 0 (Success)
    Connection Status: 0x00
    Date/Time: Thursday, August 25, 1994  1:19:22 PM

Packet Number : 354        9:08:33 PM
Length : 212 bytes
802.3: ============= IEEE 802.3 Datalink Layer =============
    Station: 02-80-C8-00-00-05----> BEAKER
    Length: 194
  ipx: ============= Internetwork Packet Exchange =============
    Checksum: 0xFFFF
    Length: 194
    Hop Count: 0
    Packet Type: 17(NCP)
    Network: 00 00 03 00       ---> 00 00 35 59
    Node:  02-80-C8-00-00-05 ---> 42-45-41-4B-45-52
    Socket: 0x4003          ---> 0x0001
  ncp: ============= NetWare Core Protocol =============
    NCP Request: Write Property Value
    Request Type: 0x2222 (Request)
    Sequence Number: 85
    Connection Number Low: 2
    Task Number: 2
    Connection Number High: 0
    Function Code: 23
    Subfunction Length: 155 bytes
    Subfunction Code: 62
    Object Type: 1 (User)
    Object Name: Length: 5
           Value : admin
    Segment Number: 1
    More Flag: 0 (No)
    Property Name: Length: 15
           Value : MISC_LOGIN_INFO
    Property Value:  0: 5E 08 19 0D 13 16 04 1D  |^.......|
               8: 1C FB 7A 0D 6D 39 0A 00  |..z.m9..|
```

```
10: EA 83 00 0E E9 73 E9 73 |.....s.s|
18: 01 00 9A 2C 5C 06 81 1C |...,\...|
20: 58 FB 74 0C C9 4A 00 00 |X.t..J..|
28: 34 FB E9 73 0A 00 10 00 |4..s....|
30: 00 00 E9 73 AC A5 AC A5 |...s....|
38: 5C 06 E9 73 60 FB EA 83 |\..s`...|
40: 01 88 00 0E 41 1E 02 00 |....A...|
48: 0F 00 10 00 00 00 E9 73 |.......s|
50: 50 43 E9 73 00 00 00 00 |PC.s....|
58: 08 00 01 00 7C FB 79 0E |....|.y.|
60: 3D 34 98 2C 7C FB 25 0F |=4.,|.%.|
68: 05 00 00 00 00 00 90 F8 |........|
70: E9 73 9E 00 00 01 1E 11 |.s......|
78: 04 00 0B 00 8D 0B 21 31 |......!1|
```

```
10: EA 83 00 0E E9 73 E9 73 |.....s.s|
18: 01 00 9A 2C 5C 06 81 1C |...,\...|
20: 58 FB 74 0C C9 4A 00 00 |X.t..J..|
28: 34 FB E9 73 0A 00 10 00 |4..s....|
30: 00 00 E9 73 AC A5 AC A5 |...s....|
38: 5C 06 E9 73 60 FB EA 83 |\..s`...|
40: 01 88 00 0E 41 1E 02 00 |....A...|
48: 0F 00 10 00 00 00 E9 73 |.......s|
50: 50 43 E9 73 00 00 00 00 |PC.s....|
58: 08 00 01 00 7C FB 79 0E |....|.y.|
60: 3D 34 98 2C 7C FB 25 0F |=4.,|.%.|
68: 05 00 00 00 00 00 90 F8 |........|
70: E9 73 9E 00 00 01 1E 11 |.s......|
78: 04 00 0B 00 8D 0B 21 31 |......!1|
```

```
Packet Number : 355       9:08:33 PM
Length : 212 bytes
802.3: ================ IEEE 802.3 Datalink Layer ================
     Station: BEAKER----> PIGGY2
     Length: 194
 ipx: ================ Internetwork Packet Exchange ================
     Checksum: 0xFFFF
     Length: 194
     Hop Count: 1
     Packet Type: 17(NCP)
     Network: 00 00 35 59       ---> 00 00 34 69
     Node:   42-45-41-4B-45-52 ---> 50-49-47-47-59-32
     Socket: 0x40A9            ---> NCP
 ncp: ================ NetWare Core Protocol ================
     NCP Request: Write Property Value
     Request Type: 0x2222 (Request)
     Sequence Number: 84
     Connection Number Low: 2
     Task Number: 2
     Connection Number High: 0
     Function Code: 23
     Subfunction Length: 155 bytes
     Subfunction Code: 62
     Object Type: 1 (User)
     Object Name: Length: 5
               Value : admin
     Segment Number: 1
     More Flag: 0 (No)
     Property Name: Length: 15
               Value : MISC_LOGIN_INFO
     Property Value:  0: 5E 08 19 0D 13 16 04 1D |^.......|
                      8: 1C FB 7A 0D 6D 39 0A 00 |..z.m9..|
                     10: EA 83 00 0E E9 73 E9 73 |.....s.s|
                     18: 01 00 9A 2C 5C 06 81 1C |...,\...|
                     20: 58 FB 74 0C C9 4A 00 00 |X.t..J..|
                     28: 34 FB E9 73 0A 00 10 00 |4..s....|
                     30: 00 00 E9 73 AC A5 AC A5 |...s....|
                     38: 5C 06 E9 73 60 FB EA 83 |\..s`...|
                     40: 01 88 00 0E 41 1E 02 00 |....A...|
```

```
48: 0F 00 10 00 00 00 E9 73 |.......s|
50: 50 43 E9 73 00 00 00 00 |PC.s....|
58: 08 00 01 00 7C FB 79 0E |....|.y.|
60: 3D 34 98 2C 7C FB 25 0F |=4.,|.%.|
68: 05 00 00 00 00 00 90 F8 |........|
70: E9 73 9E 00 00 01 1E 11 |.s......|
78: 04 00 0B 00 8D 0B 21 31 |......!1|
```

200

```
Packet Number : 201        8:56:12 PM
Length : 64 bytes
802.3: ============ IEEE 802.3 Datalink Layer ============
    Station: PIGGY----> 02-80-C8-00-00-05
    Length: 38
ipx: ============ Internetwork Packet Exchange ============
    Checksum: 0xFFFF
    Length: 38
    Hop Count: 0
    Packet Type: 17(NCP)
    Network: 00 00 34 69       ---> 00 00 03 00
    Node:    00-50-49-47-47-59 ---> 02-80-C8-00-00-05
    Socket:  NCP               ---> 0x4003
ncp: ============ NetWare Core Protocol ============
    NCP Reply: Write Property Value
    Reply Type: 0x3333 (Reply)
    Sequence Number: 90
    Connection Number Low: 1
    Task Number: 1
    Connection Number High: 0
    Completion Code: 251 (No Such Property)
    Connection Status: 0x00
```

```
Packet Number : 356        9:08:33 PM
Length : 64 bytes
802.3: ============ IEEE 802.3 Datalink Layer ============
    Station: PIGGY2----> BEAKER
    Length: 38
ipx: ============ Internetwork Packet Exchange ============
    Checksum: 0xFFFF
    Length: 38
    Hop Count: 0
    Packet Type: 17(NCP)
    Network: 00 00 34 69       ---> 00 00 35 59
    Node:    50-49-47-47-59-32 ---> 42-45-41-4B-45-52
    Socket:  NCP               ---> 0x40A9
ncp: ============ NetWare Core Protocol ============
    NCP Reply: Write Property Value
    Reply Type: 0x3333 (Reply)
    Sequence Number: 84
    Connection Number Low: 2
    Task Number: 1
    Connection Number High: 0
    Completion Code: 251 (No Such Property)
    Connection Status: 0x00
```

```
Packet Number : 357        9:08:33 PM
Length : 64 bytes
802.3: ============ IEEE 802.3 Datalink Layer ============
    Station: BEAKER----> 02-80-C8-00-00-05
    Length: 38
ipx: ============ Internetwork Packet Exchange ============
    Checksum: 0xFFFF
    Length: 38
    Hop Count: 1
    Packet Type: 17(NCP)
    Network: 00 00 35 59       ---> 00 00 03 00
    Node:    42-45-41-4B-45-52 ---> 02-80-C8-00-00-05
    Socket:  0x0001            ---> 0x4003
ncp: ============ NetWare Core Protocol ============
    NCP Reply: Write Property Value
    Reply Type: 0x3333 (Reply)
    Sequence Number: 85
    Connection Number Low: 2
    Task Number: 1
    Connection Number High: 0
    Completion Code: 251 (No Such Property)
    Connection Status: 0x00
```

```
205 Packet Number : 206        8:56:12 PM
Length : 64 bytes
802.3: ============ IEEE 802.3 Datalink Layer ============
      Station: 02-80-C8-00-00-05----> PIGGY
      Length: 38
  ipx: ============ Internetwork Packet Exchange ============
      Checksum: 0xFFFF
      Length: 37
      Hop Count: 0
      Packet Type: 17(NCP)
      Network: 00 00 03 00      ---> 00 00 34 69
      Node:    02-80-C8-00-00-05 ---> 00-50-49-47-47-59
      Socket:  0x4003           ---> NCP
  ncp: ============ NetWare Core Protocol ============
      NCP Request: End Of Job
      Request Type: 0x2222 (Request)
      Sequence Number: 93
      Connection Number Low: 1
      Task Number: 2
      Connection Number High: 0
      Function Code: 24
```

```
206 Packet Number : 207        8:56:12 PM
Length : 64 bytes
802.3: ============ IEEE 802.3 Datalink Layer ============
      Station: PIGGY----> 02-80-C8-00-00-05
      Length: 38
  ipx: ============ Internetwork Packet Exchange ============
      Checksum: 0xFFFF
      Length: 38
      Hop Count: 0
      Packet Type: 17(NCP)
```

```
Packet Number : 366        9:08:33 PM
Length : 64 bytes
802.3: ============ IEEE 802.3 Datalink Layer ============
      Station: 02-80-C8-00-00-05----> BEAKER
      Length: 38
  ipx: ============ Internetwork Packet Exchange ============
      Checksum: 0xFFFF
      Length: 37
      Hop Count: 0
      Packet Type: 17(NCP)
      Network: 00 00 03 00      ---> 00 00 35 59
      Node:    02-80-C8-00-00-05 ---> 42-45-41-4B-45-52
      Socket:  0x4003           ---> 0x0001
  ncp: ============ NetWare Core Protocol ============
      NCP Request: End Of Job
      Request Type: 0x2222 (Request)
      Sequence Number: 88
      Connection Number Low: 2
      Task Number: 2
      Connection Number High: 0
      Function Code: 24
```

```
Packet Number : 367        9:08:33 PM
Length : 64 bytes
802.3: ============ IEEE 802.3 Datalink Layer ============
      Station: BEAKER----> PIGGY2
      Length: 38
  ipx: ============ Internetwork Packet Exchange ============
      Checksum: 0xFFFF
      Length: 37
      Hop Count: 1
      Packet Type: 17(NCP)
      Network: 00 00 35 59      ---> 00 00 34 69
      Node:    42-45-41-4B-45-52 ---> 50-49-47-47-59-32
      Socket:  0x40A9           ---> NCP
  ncp: ============ NetWare Core Protocol ============
      NCP Request: End Of Job
      Request Type: 0x2222 (Request)
      Sequence Number: 87
      Connection Number Low: 2
      Task Number: 2
      Connection Number High: 0
      Function Code: 24
```

```
Packet Number : 368        9:08:33 PM
Length : 64 bytes
802.3: ============ IEEE 802.3 Datalink Layer ============
      Station: PIGGY2----> BEAKER
      Length: 38
  ipx: ============ Internetwork Packet Exchange ============
      Checksum: 0xFFFF
      Length: 38
      Hop Count: 0
      Packet Type: 17(NCP)
```

```
    Network: 00 00 34 69        ---> 00 00 03 00
    Node:    00-50-49-47-47-59 ---> 02-80-C8-00-00-05
    Socket:  NCP               ---> 0x4003
ncp: ============ NetWare Core Protocol ============
    NCP Reply: End Of Job
    Reply Type: 0x3333 (Reply)
    Sequence Number: 93
    Connection Number Low: 1
    Task Number: 1
    Connection Number High: 0
    Completion Code: 0 (Success)
    Connection Status: 0x00

    Network: 00 00 34 69        ---> 00 00 35 59
    Node:    50-49-47-47-59-32 ---> 42-45-41-4B-45-52
    Socket:  NCP               ---> 0x40A9
ncp: ============ NetWare Core Protocol ============
    NCP Reply: End Of Job
    Reply Type: 0x3333 (Reply)
    Sequence Number: 87
    Connection Number Low: 2
    Task Number: 1
    Connection Number High: 0
    Completion Code: 0 (Success)
    Connection Status: 0x00

Packet Number : 369        9:08:33 PM
Length : 64 bytes
802.3: ============ IEEE 802.3 Datalink Layer ============
    Station: BEAKER----> 02-80-C8-00-00-05
    Length: 38
ipx: ============ Internetwork Packet Exchange ============
    Checksum: 0xFFFF
    Length: 38
    Hop Count: 1
    Packet Type: 17(NCP)
    Network: 00 00 35 59        ---> 00 00 03 00
    Node:    42-45-41-4B-45-52 ---> 02-80-C8-00-00-05
    Socket:  0x0001            ---> 0x4003
ncp: ============ NetWare Core Protocol ============
    NCP Reply: End Of Job
    Reply Type: 0x3333 (Reply)
    Sequence Number: 88
    Connection Number Low: 2
    Task Number: 1
    Connection Number High: 0
    Completion Code: 0 (Success)
    Connection Status: 0x00
```

What is claimed is:

1. A hierarchical storage system for protecting a protected set of files stored on a plurality of file servers of a computer network of computer nodes, each file server having a direct-access mass storage device (DASD) storing the files, the contents of the files read and altered by an external process running on computers of the network, the system comprising:

a storage manager configured to snapshot recently-altered files (a) from the file servers' DASD's to a DASD of an integrity server, (b) and then from the integrity server's DASD to removable mass storage media, the integrity server's DASD being of a size much less than a sum of the sizes of the file servers' DASD's, wherein a retention time of a file version in the integrity server's DASD depends on characteristics of the external process' access to the corresponding file, and wherein each file is copied to said removable media within a short time after being altered on a file server's DASD to produce a new current version; and a retrieval manager providing to the external process access to the file copies as a stand-in for the files of an unavailable file server, said retrieval manager configured to be activated when unavailability of one of the file servers is detected, and to copy current versions of files not then resident on the integrity server's DASD from said removable media to the integrity server's DASD.

2. The system of claim 1 wherein:

said retrieval manager is configured to copy a current version of a file from said removable media to the integrity server's DASD when said file is demanded by a client of said unavailable server.

3. The system of claim 1 wherein:

said retrieval manager, in response to demands from said external process for files on an access path, automatically and without human intervention performs one of two steps for each directory traversed in said access path:

if a directory corresponding to the traversed directory does not already exist on the integrity server's DASD, creating a directory corresponding to the traversed directory on the integrity server's DASD, and servicing the file demand using the created directory; and if a directory corresponding to the traversed directory does already exist on the DASD, servicing the file demand using the existing corresponding directory.

4. The system of claim 1 wherein:

in addition to a file server's files that are altered by the external process, the protected set also may include any other files newly created by the external process.

5. A method for use in servicing file demands to a hierarchical file system on a direct access storage device (DASD), comprising the computer-implemented steps of:

providing on non-direct access storage media a copy of the files of the file system;

for each directory traversed in response to a file demand on a demanded file access path, automatically and without human intervention:

if a directory corresponding to the traversed directory does not already exist on the DASD, creating a directory corresponding to the traversed directory on the DASD, and servicing the file demand using the created directory; and if a directory corresponding to the traversed directory does already exist on the DASD, servicing the file demand using the existing corresponding directory.

6. The method of claim 5, wherein:

a newly-created directory is populated with only those entries required to traverse the demanded pathname.

* * * * *